US012645898B2

(12) United States Patent
Xu et al.

(10) Patent No.: US 12,645,898 B2
(45) Date of Patent: Jun. 2, 2026

(54) TERMINAL MANAGEMENT METHOD AND APPARATUS

(71) Applicant: HUAWEI TECHNOLOGIES CO., LTD., Shenzhen (CN)

(72) Inventors: Yishan Xu, Shanghai (CN); Hualin Zhu, Shanghai (CN); Haoren Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/750,099

(22) Filed: Jun. 21, 2024

(65) Prior Publication Data

US 2024/0338540 A1 Oct. 10, 2024

Related U.S. Application Data

(63) Continuation of application No. PCT/CN2022/140510, filed on Dec. 20, 2022.

(30) Foreign Application Priority Data

Dec. 21, 2021 (CN) .......................... 202111574462.0

(51) Int. Cl.
*G06K 7/10* (2006.01)
*H04W 4/90* (2018.01)
*H04W 8/22* (2009.01)

(52) U.S. Cl.
CPC .......... *G06K 7/10366* (2013.01); *H04W 4/90* (2018.02); *H04W 8/22* (2013.01)

(58) Field of Classification Search
CPC ....... G06K 7/10366; H04W 4/90; H04W 8/22
USPC ......................................................... 235/451
See application file for complete search history.

(56) References Cited

U.S. PATENT DOCUMENTS

| | | | |
|---|---|---|---|
| 11,172,335 B2 | 11/2021 | Ma | |
| 2016/0110984 A1* | 4/2016 | Seol ........................ | G08B 21/02 |
| | | | 340/539.13 |
| 2021/0037535 A1* | 2/2021 | Stephens ............... | H04W 72/54 |
| 2022/0084050 A1* | 3/2022 | Toumori ........... | G06Q 30/0201 |
| 2022/0191684 A1* | 6/2022 | Sitaram ................. | H04W 8/005 |

FOREIGN PATENT DOCUMENTS

| | | |
|---|---|---|
| CN | 102646203 A | 8/2012 |
| CN | 109379724 A | 2/2019 |

* cited by examiner

*Primary Examiner* — Ahshik Kim
(74) *Attorney, Agent, or Firm* — Maier & Maier, PLLC

(57) ABSTRACT

A terminal management method and an apparatus, to implement management of terminals. The method includes: receiving, by a first device, a first instruction used to perform a first operation on one or more terminals, and determining, according to a management rule, whether performance of the first operation is allowed, and/or determining a target terminal to be subjected to the first operation. The solution is applicable to the field of communication technologies, the internet of things, artificial intelligence, the internet of vehicles, smart homes, or the like.

17 Claims, 14 Drawing Sheets

Step 301: Select command

Step 302: Query command

Step 303: Random number

Step 304: Acknowledgment command

Step 305: EPC code

Step 306: Request random number command

Step 307: Handle

Step 308: Read/write instruction (handle)

Step 309: Data (handle)

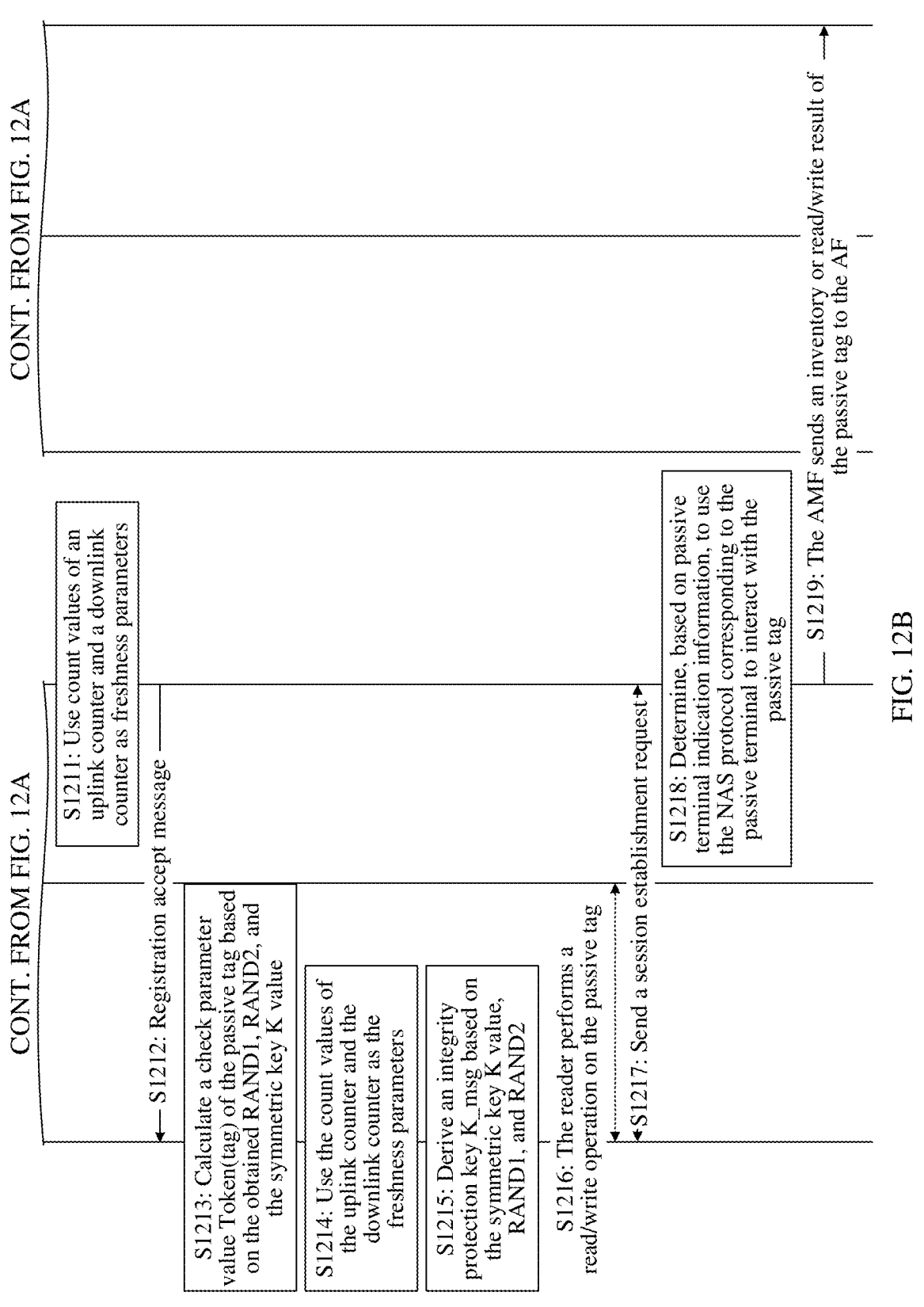

CONT. FROM FIG. 12A

CONT. FROM FIG. 12A

S1211: Use count values of an uplink counter and a downlink counter as freshness parameters S1212: Registration accept message S1213: Calculate a check parameter value Token(tag) of the passive tag based on the obtained RAND1, RAND2, and the symmetric key K value S1214: Use the count values of the uplink counter and the downlink counter as the freshness parameters S1215: Derive an integrity protection key K_msg based on the symmetric key K value, RAND1, and RAND2

S1216: The reader performs a read/write operation on the passive tag

S1217: Send a session establishment request

S1218: Determine, based on passive terminal indication information, to use the NAS protocol corresponding to the passive terminal to interact with the passive tag S1219: The AMF sends an inventory or read/write result of the passive tag to the AF

FIG. 12B

TERMINAL MANAGEMENT METHOD AND APPARATUS

CROSS-REFERENCE TO RELATED APPLICATIONS

This application is a continuation of International Application No. PCT/CN2022/140510, filed on Dec. 20, 2022, which claims priority to Chinese Patent Application No. 202111574462.0, filed on Dec. 21, 2021. The disclosures of the aforementioned applications are hereby incorporated by reference in their entireties.

TECHNICAL FIELD

Embodiments relate to the field of communication technologies, and to a terminal management method and an apparatus.

BACKGROUND

With evolution and development of communication technologies, terminals are used by an increasing number of users (such as enterprises and individuals). Short-range and non-contact communication between devices can be implemented by using the terminals.

There are different types of terminals, including a radio frequency identification (RFID) terminal, an ultra-wideband (UWB) terminal, a Bluetooth device, and the like, and different users may have different operation requirements for the terminals. How to implement refined management of terminals by users becomes an urgent problem to be resolved.

SUMMARY

Embodiments provide a terminal management method and an apparatus, to implement refined management of terminals.

To achieve the foregoing objectives, the following solutions are used in embodiments.

According to a first aspect, an embodiment provides a terminal management method.

The method includes: obtaining, by a first device, a first instruction used to perform a first operation on one or more terminals, and determining, according to a management rule, whether performance of the first operation is allowed, and/or determining a target terminal to be subjected to the first operation. Based on the first aspect, after obtaining the instruction to perform the first operation, the first device performs terminal management according to the management rule, for example, determines whether execution of the instruction is allowed and/or determines the target terminal to be subjected to the operation. In this way, operation requesters perform corresponding operations on the terminal in an orderly manner under the management rule, thereby preventing an operation requester from continuously occupying a network resource or performing an operation beyond permissions.

It should be understood that determining whether to perform the first operation in the embodiments may be replaced by determining whether to send an operation result of performing the first operation to the operation requester. The operation result may include information from one or more terminals requested by the operation requester, or include information from the target terminal. The target terminal may be included in the one or more terminals requested by the operation requester.

In a possible implementation, the management rule includes one or more of the following: an allowed operation type, a forbidden operation type, a time period in which an operation is allowed, a time period in which an operation is forbidden, location information in which an operation is allowed, location information in which an operation is forbidden, a threshold of a quantity of single-operation terminals, a threshold of a quantity of cumulative-operation terminals, a threshold of a quantity of terminals subjected to an operation, a threshold of a cumulative count of operations, an operation frequency threshold, identifier information of a terminal allowed to be operated, identifier information of a terminal forbidden to be operated, or a quantity of readers allowed to perform an operation on a terminal. Based on this possible implementation, the management rule is set flexibly and effectively.

In a possible implementation, the management rule includes information about an allowed operation requester and/or information about a forbidden operation requester. The information about the operation requester includes one or more of the following: name information of the operation requester, identifier information of the operation requester, data network name information corresponding to the operation requester, address information of a server corresponding to the operation requester, port information of the server corresponding to the operation requester, or identifier information of a terminal corresponding to the operation requester. Based on this possible implementation, it may be further defined that performance of operations requested by which operation requesters is allowed. In this way, corresponding operations are performed on the terminal in an orderly manner under the management rule, thereby preventing an operation requester from continuously occupying a network resource or performing an operation beyond permissions.

In a possible implementation, the determining, by the first device according to a management rule, whether performance of the first operation is allowed includes: determining, by the first device based on the information about the allowed operation requester and/or the information about the forbidden operation requester, whether the performance of the first operation is allowed. The determining, by the first device based on the information about the allowed operation requester and/or the information about the forbidden operation requester, whether the performance of the first operation is allowed includes: when information about an operation requester of the first operation matches the information about the forbidden operation requester, determining, by the first device, that the performance of the first operation is not allowed; or when information about an operation requester of the first operation does not match the information about the allowed operation requester, determining, by the first device, that the performance of the first operation is not allowed; or when information about an operation requester of the first operation matches the information about the allowed operation requester, determining, by the first device, that the performance of the first operation is allowed; or when information about an operation requester of the first operation does not match the information about the forbidden operation requester, determining, by the first device, that the performance of the first operation is allowed. In this way, corresponding operations are performed on the terminal in an orderly manner under the management rule, thereby preventing an operation requester from continuously occupying a network resource or performing an operation beyond permissions.

In a possible implementation, the determining, by the first device according to a management rule, whether performance of the first operation is allowed includes: when a first condition is met, determining, by the first device according to the management rule, that the performance of the first operation is not allowed, where the first condition is one or more of the following conditions: an operation type of the first operation belongs to the operation type of the forbidden operation; or a time of performing the first operation falls within the time period in which an operation is forbidden; or location information of performing the first operation indicated by the first instruction belongs to the location information in which an operation is forbidden; or a quantity of terminals subjected to the first operation and indicated by the first instruction is greater than or equal to the threshold of the quantity of single-operation terminals; or a quantity of cumulative-operation terminals is greater than or equal to the threshold of the quantity of cumulative-operation terminals; or a quantity of terminals subjected to an operation is greater than or equal to the threshold of the quantity of terminals subjected to an operation; or a cumulative count of operations is greater than or equal to the threshold of the cumulative count of operations; or a statistical value of operation frequency is greater than or equal to the operation frequency threshold; or the one or more terminals are included in the terminal identified by the identifier information of the terminal forbidden to be operated; or the one or more terminals are not included in the terminal identified by the identifier information of the terminal allowed to be operated. Based on the possible implementation, when information related to the performance of the first operation does not comply with the management rule, it is determined that the performance of the first operation is not allowed, making the operation rule-based.

In a possible implementation, the determining, by the first device according to a management rule, whether performance of the first operation is allowed includes: when a second condition is met, determining, by the first device according to the management rule, that the performance of the first operation is allowed, where the second condition is one or more of the following conditions: an operation type of the first operation belongs to the operation type of the allowed operation; or a time of performing the first operation falls within the time period in which an operation is allowed; or location information of performing the first operation indicated by the first instruction belongs to the location information in which an operation is allowed; or a quantity of terminals subjected to the first operation and indicated by the first instruction is less than or equal to the threshold of the quantity of single-operation terminals; or a quantity of cumulative-operation terminals is less than or equal to the threshold of the quantity of cumulative-operation terminals; or a quantity of terminals subjected to an operation is less than or equal to the threshold of the quantity of terminals subjected to an operation; or a cumulative count of operations is less than or equal to the threshold of the cumulative count of operations; or a statistical value of operation frequency is less than or equal to the operation frequency threshold; or the one or more terminals are included in the terminal identified by the identifier information of the terminal allowed to be operated; or the one or more terminals are not included in the terminal identified by the identifier information of the terminal forbidden to be operated. Based on the possible implementation, when information related to the performance of the first operation complies with the management rule, it is determined that the performance of the first operation is allowed, making the operation rule-based.

In a possible implementation, the method further includes: when the target terminal is different from the one or more terminals, modifying, by the first device, the first instruction into a second instruction, where the second instruction is used to perform the first operation on the target terminal; or when the target terminal is different from the one or more terminals, determining, by the first device according to the management rule, that the performance of the first operation is not allowed. Based on this possible implementation, when the terminal subjected to the first operation is not the terminal requested by the operation requester, an operation request may be changed or the first operation may not be performed. This flexibly and effectively provides a feasible solution for the following application scenario: The terminal subjected to the first operation is not the terminal requested by the operation requester.

In a possible implementation, when the first device determines that the performance of the first operation is allowed, the method further includes: when the first device is the reader, performing, by the first device, the first operation; or when the first device is a mobility management device, sending, by the first device, the first instruction or the second instruction to the reader; or when the first device is a session management device, notifying, by the first device, a user plane device to send the first instruction or the second instruction to the reader, where the second instruction is used to perform the first operation on the target terminal. In this way, an entity for performing the method in this embodiment is designed flexibly and effectively, and an application scenario is expanded.

In a possible implementation, when the first device determines that the performance of the first operation is not allowed, the method further includes: sending, by the first device, a response message, where the response message includes at least one of an operation failure indication, a failure cause, and information about an operation requester. Based on this possible implementation, an execution failure result may be indicated to another network element, so that the another network element adjusts a policy and provides another implementation solution based on the execution failure result, thereby improving reliability of performing an operation on the terminal.

In a possible implementation, the method further includes: obtaining, by the first device, statistical data based on an operation result and/or the management rule, where the statistical data includes one or more of the following information: the operation type of the first operation, the quantity of terminals subjected to the first operation, the quantity of cumulative-operation terminals, the quantity of terminals subjected to an operation, the statistical value of the operation frequency, the cumulative count of operations, the time of performing the first operation, a duration of performing the first operation, or the location information of performing the first operation. Based on this possible implementation, statistics may be collected on an execution result, and the statistical data may be reported to another network element, so that the another network element performs policy adjustment and the like based on the statistical data, thereby improving reliability of performing an operation on the terminal.

In a possible implementation, the method further includes: sending, by the first device, the statistical data to a core network device, where the core network device includes one or more of the following devices: a mobility management device, a session management device, a policy control device, a user plane device, and a charging device. Based on this, the statistical data may be sent to network elements that need statistical data, so that these network elements perform other operations based on the statistical data, making the entire communication system work cooperatively, and improving communication reliability.

In a possible implementation, the first device is a reader, a user plane device, a control plane device, a device having an IoT terminal management or tag management function, or a server. An entity for performing the method in this embodiment is designed flexibly and effectively, and an application scenario is expanded. The device having the IoT terminal management or tag management function may be, for example, an IoT terminal management function (IDMF) or a tag management function (TMF). The name of the device having the IoT terminal management or tag management function is not limited in this embodiment.

In a possible implementation, the management rule is preconfigured on the first device, or the management rule is obtained by the first device from a second device. Based on this, the management rule can be obtained or configured flexibly and effectively, thereby simplifying a system design.

In a possible implementation, the first operation includes one or more of the following: an inventory operation, a read operation, a write operation, a locating operation, and a revocation operation. Based on this, the operation type in this embodiment can be designed flexibly and effectively, and an application scenario can be expanded.

In a possible implementation, the first instruction includes one or more of identifier information or location information of the one or more terminals, the information about the operation requester of the first operation, information about the reader, and the operation type of the first operation. Based on this, the information included in the first instruction can be designed flexibly and effectively, so that the first instruction instructs to perform the first operation on the one or more terminals, thereby simplifying a system design.

In a possible implementation, the obtaining, by a first device, a first instruction includes: obtaining, by the first device, the first instruction from the server; or receiving, by the first device, the first instruction from a third device, where the first instruction is received by the third device from the server. In this way, a plurality of manners of obtaining the first instruction are provided flexibly and effectively, and an application scenario and an application scope are expanded.

According to a second aspect, an embodiment provides a terminal management method. The method includes: obtaining, by a server, first information used to determine a third device that receives a first instruction, where the first information is used to determine the third device that receives the first instruction; and sending, by the server to the third device based on the first information, the first instruction used to perform a first operation on one or more terminals. Based on this, after learning a device that can execute the first instruction, the server sends the instruction for performing the operation to the device, thereby simplifying a system design.

In a possible implementation, the third device is a reader, or a user plane device, or a control plane device, and the control plane device includes a mobility management device or a network exposure device. The sending, by the server based on the first information, the first instruction to the third device includes: determining, by the server based on the first information, that the third device or one or more readers served by the third device are located in a target area, and sending, by the server, the first instruction to the third device. Based on this, a device that receives the first instruction is designed flexibly and effectively, and an application scenario is expanded.

In a possible implementation, the first information includes address information of the third device, where the address information of the third device is used to establish a user plane connection between the third device and the server; and the sending, by the server based on the first information, the first instruction to the third device includes: sending, by the server, the first instruction to the third device through the user plane connection between the third device and the server.

In a possible implementation, the first information includes identifier information of the third device; and the sending, by the server based on the first information, the first instruction to the third device includes: sending, by the server, the first instruction to the third device based on the identifier information of the third device through a control plane channel. Based on this, the first instruction can be sent to the third device through a control plane, thereby simplifying a system design.

In a possible implementation, the obtaining, by a server, first information includes: obtaining, by the server, the first information from a fourth device, where the fourth device includes the third device, a core network device, or the reader. Based on this, the server can receive related information of the third device from another network element, thereby simplifying a system design.

In a possible implementation, the method further includes: sending, by the server, a subscription request, where the subscription request is used to request to obtain information about one or more devices, and the one or more devices include the third device; and receiving, by the server, a subscription response, where the subscription response includes the information about the one or more devices. The subscription request includes one or more of the following information: information about a mobility management device in an operation-allowed area, information about a network exposure device in the operation-allowed area, information about a reader in the operation-allowed area, information about a user plane device in the operation-allowed area, and information about an operation requester. Based on this, the related information of the third device can be obtained through a subscription procedure, which is compatible with an existing subscription procedure, and no new obtaining procedure needs to be added, thereby simplifying a system design and reducing signaling overheads caused by obtaining the related information of the third device.

In a possible implementation, the first information includes one or more of the following information: location information of the third device, the address information of the third device, port information of the third device, the identifier information of the third device, information about a mapping relationship between the third device and the one or more readers served by the third device, location information of the one or more readers served by the third device, address information of the one or more readers served by the third device, port information of the one or more readers served by the third device, and identifier information of the one or more readers served by the third device. Based on this, the first information can be designed flexibly and effectively to achieve the purpose of using the first information to indicate the third device.

According to a third aspect, an embodiment further provides a connection establishment method. The method includes: obtaining, by a core network device, address information of a user plane device; and sending, by the core network device, the address information to a first reader, so that the first reader establishes a first connection to the user plane device based on the address information; sending, by the core network device, address information to a second reader, so that the second reader establishes a second connection to the user plane device based on the address information; and instructing, by the core network device, the user plane device to establish a third connection to a server, and instructing, by the core network device, the user plane device to associate the first connection with the third connection, and the second connection with the third connection.

Based on the third aspect, the core network device can send, to the user plane device through the third connection between the core network device and the user plane device, an instruction instructing to perform an operation on a terminal, so that the user plane network element notifies, through the first connection and the second connection, a corresponding reader to perform an operation on the terminal, thereby simplifying a system design. In addition, the core network device and the user plane device only need to communicate one instruction, without communicating a plurality of instructions, thereby reducing signaling overheads.

In a possible implementation, the core network device obtains address information during a session establishment procedure of the first reader, and sends the address information to the first reader. The core network device obtains address information during a session establishment procedure of the second reader, and sends the address information to the second reader. Based on this, the address information of the user plane device can be obtained and sent to the reader during the session establishment procedure, so that the reader establishes a connection to the user plane device, which is compatible with the session establishment procedure, thereby reducing signaling overheads.

In a possible implementation, the method further includes: instructing, by the core network device, the user plane device to manage the first connection and the second connection. For example, the user plane device is instructed to associate or correspond the first connection and the second connection with or to the third connection, so as to facilitate management.

According to a fourth aspect, an embodiment further provides a connection establishment method. The method includes: establishing, by a user plane device, a first connection to a first reader, and establishing a second connection to a second reader; associating, by the user plane device, the first connection with a third connection, and the second connection with the third connection, where the third connection is a connection established between the user plane device and a server.

Based on the fourth aspect, a core network device establishes the third connection to the user plane device, and the user plane device establishes different connections to different readers, so that the user plane network element receives, through the third connection, an instruction sent by the core network device, and notifies, through the first connection and the second connection, the corresponding readers to perform an operation on the terminal, thereby simplifying a system design. In addition, the core network device and the user plane device only need to communicate one instruction, without communicating a plurality of instructions, thereby reducing signaling overheads.

In a possible implementation, the associating, by the user plane device, the first connection with the third connection, and the second connection with the third connection includes: associating, by the user plane device, the first connection with the third connection, and the second connection with the third connection based on an indication of the core network device. The user plane device establishes the third connection based on the instruction of the core network device.

According to a fifth aspect, an embodiment further provides a method for communicating a NAS message. The method includes: using, by a terminal, a NAS protocol corresponding to a passive terminal to send a NAS message to a core network device, and sending, by the terminal to the core network device, passive terminal indication information indicating the core network device to use the NAS protocol corresponding to the passive terminal to interact with the terminal.

Based on the fifth aspect, after using the NAS protocol corresponding to the passive terminal to send the NAS message, the terminal indicates the core network device to use the NAS protocol corresponding to the passive terminal, so that after receiving the NAS message, the core network device identifies that the received NAS message is the NAS message sent by the passive terminal, and the NAS protocol corresponding to the passive terminal is used to check the received NAS message, to avoid the problem that an error occurs in a check by the core network device according to the active terminal NAS protocol (which may be referred to as an existing NAS protocol) due to the pruned NAS message sent by the passive terminal to the core network device, affecting terminal communication.

In a possible implementation, the sending, by the terminal, the passive terminal indication information to the core network device includes: sending, by the terminal, the passive terminal indication information to the core network device via an access network device; or the passive terminal indication information being included in the NAS message. The passive terminal indication information is sent flexibly and effectively, and an application scenario is expanded.

In a possible implementation, the NAS message is a registration request message, the registration request message carries first information, the first information includes one or more of a first security parameter value, a first check parameter value, and an identifier of the terminal, and the first information is used for a first network device to perform security authentication on the terminal; or the first information is used for a first network device to derive a first encryption key or a first integrity protection key. Based on this, network authentication is further performed during network registration, and a plurality of functions are implemented by using one NAS message, thereby simplifying a system design and reducing signaling overheads.

In a possible implementation, the first network device is the core network device, an authentication server, a unified data management network element, an AAA server, or an enterprise authentication device. The first network device is designed effectively and flexibly to expand an application scope.

In a possible implementation, the method further includes: receiving, by the terminal, a registration accept message, where the registration accept message carries second information, the second information includes one or more of a second security parameter value and a second check parameter value, and the second information is used for the terminal to perform security authentication, or the second information is used for the terminal to derive a second encryption key or a second integrity protection key. Based on this, network authentication is further performed during network registration, and a plurality of functions are implemented by using one NAS message, thereby simplifying a system design and reducing signaling overheads.

According to a sixth aspect, an embodiment further provides a method for communicating a NAS message. The method includes: receiving, by a core network device, a NAS message from a terminal; identifying, by the core network device, that the NAS message is a NAS message sent by a passive terminal; and using, by the core network device, a NAS protocol corresponding to the passive terminal to interact with the terminal.

Based on the sixth aspect, the core network device receives the NAS message, and can identify whether the received NAS message is the NAS message sent by the passive terminal. If the received NAS message is the NAS message sent by the passive terminal, the NAS protocol corresponding to the passive terminal is used to check the received NAS message, to avoid the problem that an error occurs in a check by the core network device according to the active terminal NAS protocol (which may be referred to as an existing NAS protocol) due to the pruned NAS message sent by the passive terminal to the core network device, affecting terminal communication.

In a possible implementation, the identifying, by the core network device, that the NAS message is a NAS message sent by a passive terminal includes: the NAS message carrying passive terminal indication information, and identifying, by the core network device based on the passive terminal indication information carried in the NAS message, that the NAS message is the NAS message sent by the passive terminal; or identifying, by the core network device based on subscription information of the terminal, that the NAS message is the NAS message sent by the passive terminal; or receiving, by the core network device, passive terminal indication information from an access network device, and identifying, based on the passive terminal indication information, that the NAS message is the NAS message sent by the passive terminal. The passive terminal indication information is sent flexibly and effectively, and an application scenario is expanded.

In a possible implementation, the NAS message is a registration request message, the registration request message carries first information, the first information includes one or more of a first security parameter value, a first check parameter value, and an identifier of the terminal, and the first information is used for a first network device to perform security authentication on the terminal; or the first information is used for a first network device to derive a first encryption key or a first integrity protection key. Network authentication is further performed during network registration, and a plurality of functions are implemented by using one NAS message, thereby simplifying a system design and reducing signaling overheads.

In a possible implementation, the method further includes: authenticating, by the core network device, the terminal based on the first information; or deriving, by the core network device, the first encryption key or the first integrity protection key based on the first information; or sending, by the core network device, the first information to the first network device. The first network device is the core network device, an authentication server, a unified data management network element, an AAA server, or an enterprise authentication device. Based on this, the core network device may perform authentication on the terminal, or another device may perform authentication on the terminal, thereby expanding an application scenario.

In a possible implementation, the method further includes: sending, by the core network device, a registration accept message to the terminal, where the registration accept message includes second information, the second information includes at least one of a second security parameter value and a second check parameter value, and the second information is used for the terminal to authenticate a network; or the second information is used for the terminal to derive a second encryption key or a second integrity protection key. Network authentication is further performed during network registration, and a plurality of functions are implemented by using one NAS message, thereby simplifying a system design and reducing signaling overheads.

In a possible implementation, the using, by the core network device, a NAS protocol corresponding to the passive terminal to interact with the terminal includes: ignoring, by the core network device, a format check or a length check on a first information element in the NAS message; and/or ignoring, by the core network device, a presence check on the first information element in the NAS message. Alternatively, in a possible implementation, the first information element is defined in the NAS protocol corresponding to the passive terminal, and the using, by the core network device, a NAS protocol corresponding to the passive terminal to interact with the terminal includes: sending, by the core network device, a NAS message with some or all first information elements ignored to the terminal; or sending, by the core network device, a NAS message including some or all length-pruned first information elements to the terminal; or sending, by the core network device, a NAS message including some or all first information elements configured with fixed values to the terminal. Based on this, it is specified that a check of which information elements can be ignored when the NAS protocol corresponding to the passive terminal is used to exchange the NAS message with the terminal.

In a possible implementation, the first information element includes any one of the following: a security header type, a spare half octet, a registration request message identity, a registration accept message identity, a 5GS registration result, a 5GS registration type, a key set identifier, a terminal identifier, a PDU session identity, a procedure transaction identity, a PDU session establishment request identity, an integrity protection maximum rate, an extended protocol discriminator, a mobility management cause value, a registration reject message identity, a PDU session establishment accept message identity, a session management cause value, a PDU session establishment reject message identity, authorized QoS rules, a selected PDU session type, a session aggregate maximum bit rate, a selected session and service continuity mode, a security mode command message identity, a replayed terminal security capability, a selected security algorithm, a security mode complete message identity, an uplink non-access stratum transport message identity, a downlink non-access stratum transport message identity, an authentication request message identity, ABBA, an authentication response message identity, an authentication result message identity, an authentication failure message identity, and an authentication reject message identity. Based on this, the first information element is designed flexibly and effectively.

According to a seventh aspect, the embodiments provides a communication apparatus. The communication apparatus may be a first device or a chip or a system on chip in a first device, or may be a function module in a first device that is configured to implement the method according to any one of the first aspect or the possible implementations of the first aspect. Alternatively, the communication apparatus may be a server or a chip or a system on chip in a server, or may be a function module in a server that is configured to implement the method according to any one of the second aspect or the possible designs of the second aspect. Alternatively, the communication apparatus is a core network device or a chip or a system on chip in a core network device, or may be a function module in the core network device that is configured to implement the method in any one of the third aspect or the possible implementations of the third aspect. Alternatively, the communication apparatus is a user plane device or a chip or a system on chip in a user plane device, or may be a function module in a user plane device that is configured to implement the method according to any one of the fourth aspect or the possible implementations of the fourth aspect. Alternatively, the communication apparatus may be a terminal or a chip or a system on chip in a terminal, or may be a function module in a terminal that is configured to implement the method in any one of the fifth aspect or the possible implementations of the fifth aspect. Alternatively, the communication apparatus is the core network device or the function module that is configured to implement any one of the sixth aspect or the possible implementations of the sixth aspect.

In a possible implementation, the function implemented by the communication apparatus may be implemented by hardware executing corresponding software. The hardware or the software includes one or more modules corresponding to the functions. For example, the communication apparatus may include a sending unit and a receiving unit. Further, the communication apparatus may include a processing unit.

In another possible implementation, the communication apparatus may include a processor and a communication interface. The processor and the communication interface may support the communication apparatus in performing the method according to any one of the first aspect or the possible implementations of the first aspect or any one of the second aspect or the possible implementations of the second aspect. In another possible implementation, the communication apparatus may further include a memory. The memory is configured to store computer execution instructions and data that are necessary for the communication apparatus. When the communication apparatus runs, the processor executes the computer executable instructions stored in the memory, so that the communication apparatus performs the method according to any one of the first aspect or the possible implementations of the first aspect or any one of the second aspect or the possible designs of the second aspect; or the method according to any one of the third aspect or the possible implementations of the third aspect; or the method according to any one of the fourth aspect or the possible implementations of the fourth aspect; or the method according to any one of the fifth aspect or the possible implementations of the fifth aspect; or the method according to any one of the sixth aspect or the possible implementations of the sixth aspect.

According to an eighth aspect, a non-transitory computer-readable storage medium is provided. The non-transitory computer-readable storage medium may be a readable non-volatile storage medium. The non-transitory computer-readable storage medium stores instructions. When the instructions run on a computer, the computer is enabled to perform the method according to any one of the first aspect or the possible implementations of the first aspect or any one of the second aspect or the possible implementations of the second aspect; or the method according to any one of the third aspect or the possible implementations of the third aspect; or the method according to any one of the fourth aspect or the possible implementations of the fourth aspect; or the method according to any one of the fifth aspect or the possible implementations of the fifth aspect; or the method according to any one of the sixth aspect or the possible implementations of the sixth aspect.

According to a ninth aspect, a computer program product including instructions is provided. When the computer program product runs on a computer, the computer is enabled to perform the method according to any one of the first aspect or the possible implementations of the first aspect or any one of the second aspect or the possible implementations of the second aspect; or the method according to any one of the third aspect or the possible implementations of the third aspect; or the method according to any one of the fourth aspect or the possible implementations of the fourth aspect; or the method according to any one of the fifth aspect or the possible implementations of the fifth aspect; or the method according to any one of the sixth aspect or the possible implementations of the sixth aspect.

According to a tenth aspect, a communication apparatus is provided. The communication apparatus may be a terminal or a chip or a system on chip in a terminal. The communication apparatus includes one or more processors and one or more memories. The one or more memories are coupled to the one or more processors. The one or more memories are configured to store computer program code. The computer program code includes computer instructions. When the one or more processors execute the computer instructions, the terminal is enabled to perform the method according to any one of the first aspect or the possible implementations of the first aspect or any one of the second aspect or the possible implementations of the second aspect; or the method according to any one of the third aspect or the possible implementations of the third aspect; or the method according to any one of the fourth aspect or the possible implementations of the fourth aspect; or the method according to any one of the fifth aspect or the possible implementations of the fifth aspect; or the method according to any one of the sixth aspect or the possible implementations of the sixth aspect.

For effects brought by any one of the implementations of the seventh aspect to the tenth aspect, refer to the effects brought by any one of the foregoing aspects or the possible implementations of the foregoing aspects. Details are not described again.

According to an eleventh aspect, an embodiment provides a communication system. The communication system may include a first device and a server. The first device may perform the method according to any one of the first aspect or the possible implementations of the first aspect, and the server may perform the method according to any one of the second aspect or the possible implementations of the second aspect; or the communication system may include a core network device and a user plane device. The core network device may perform the method according to any one of the third aspect or the possible implementations of the third aspect, and the user plane device may perform the method according to any one of the fourth aspect or the possible implementations of the fourth aspect; or the communication system may include a terminal and a core network device. The terminal may perform the method according to any one of the fifth aspect or the possible implementations of the fifth aspect, and the core network device may perform the method according to any one of the sixth aspect or the possible implementations of the sixth aspect.

BRIEF DESCRIPTION OF DRAWINGS

FIG. 8A and FIG. 8B are a flowchart 2 of a terminal management method according to an embodiment;

FIG. 12A and FIG. 12B are a flowchart 2 of a NAS message transmission method according to an embodiment;

DETAILED DESCRIPTION OF EMBODIMENTS

Figures 1, 2A, 2B:
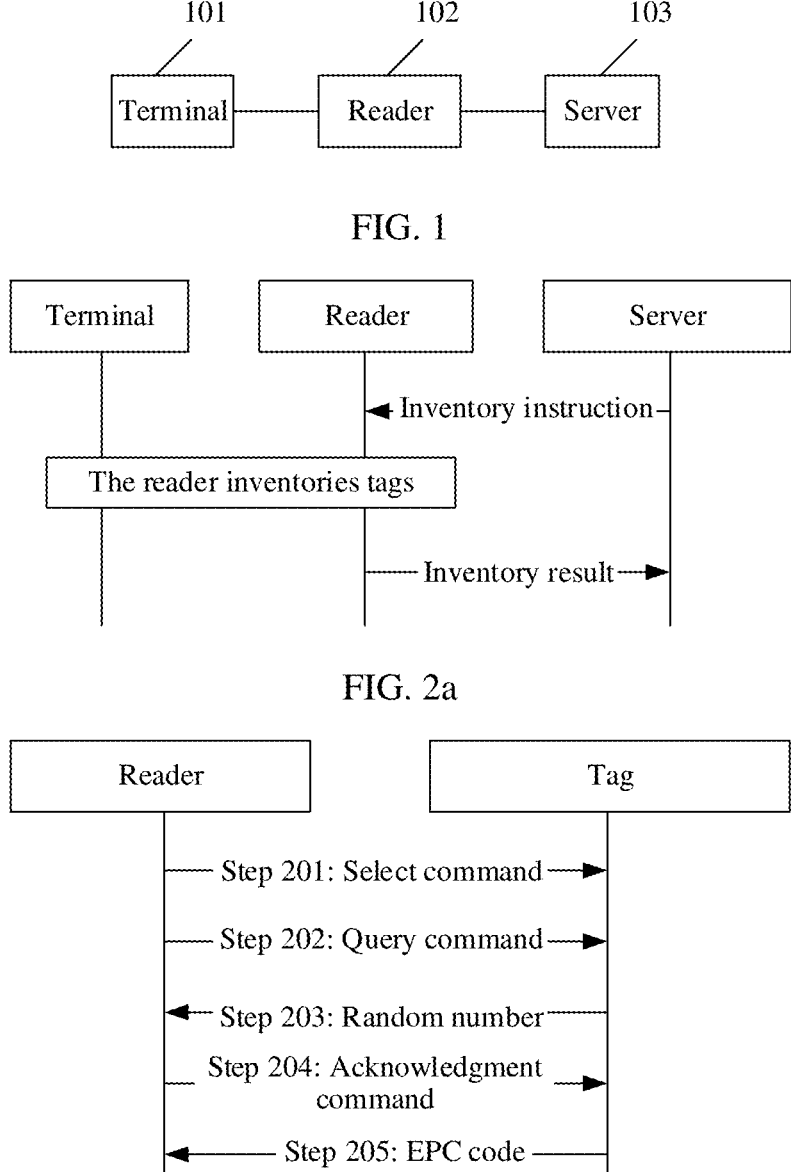
FIG. 1 is a diagram of a P-IoT system.
FIG. 2a is a diagram 1 of an inventory process.
FIG. 2b is a diagram 2 of an inventory process.

The passive internet of things (passive IoT) (which may be referred to as P-IoT) is an important research direction in the internet-of-things field. As shown in FIG. 1, the P-IoT may include a terminal 101, a reader 102, and a server 103. The reader 102 can perform non-contact two-way data communication with the terminal 101 by using a radio frequency technology, so as to read from or write to the terminal. The name of passive internet of things is not limited in this embodiment, and may also be referred to as ambient internet of things (, Ambient IoT or A-IoT).

The terminal 101 may be understood as a passive internet of things terminal (P-IoT terminal). The terminal 101 may be attached to an object to identify a target object, the terminal stores information about the object, and each terminal has a globally unique electronic product code (EPC). A working method of a passive internet of things terminal is as follows: When entering an effective identification range of a reader, the terminal receives a radio frequency signal sent by the reader, harvests energy from an induced current, and sends information stored in a chip (this terminal is a passive terminal). The reader receives and decodes the information, and then sends the decoded information to the server for data processing. It should be understood that the terminal described in this embodiment may be considered as a tag, and the terminal management method described in this embodiment may be understood as a tag management method, a management method for a tag, or the like, which is not limited. The embodiments may be further applied to a semi-passive internet of things or semi-active internet of things technology. A working method of a semi-active terminal or a semi-passive terminal is as follows: The terminal harvests energy from the sun or the like, and sends stored information by using the harvested energy. The semi-active terminal may be a semi-passive tag.

The reader 102 reads information stored in a specified terminal, through a radio frequency signal according to an operation instruction delivered by the server. If the operation is an inventory operation, the reader may inventory information about a terminal within a management range of the reader. If the operation is a read operation, the reader reads data in a storage area of the terminal. Optionally, in some scenarios in which information stored in the terminal needs to be rewritten, the reader may further have a write function. If the operation is a write operation, the reader writes data into the storage area of the terminal. Optionally, in some scenarios in which the terminal needs to be revoked, the reader may further perform a revocation operation on the terminal. Optionally, in some scenarios in which location information of the terminal needs to be obtained, the reader may further perform a locating operation on the terminal. In this embodiment, the reader 102 may also be referred to as an interrogator. The reader 102 may be independently deployed, or may be deployed/integrated in another device, for example, a terminal. In this case, the reader 102 may be considered as a terminal.

The server 103 delivers the operation instruction as required, and obtains a final result of performance on the terminal, where the final result may include, but is not limited to, a read type of a terminal, a quantity of terminals, and whether the read operation is successful. The server 103 may be located in a local network, for example, located in a data network (data network). Alternatively, the server 103 may be located in a third-party application system, and in this case, the server 103 may be understood as an application function (application function, AF).

Main application scenarios of P-IoT include warehouse management, inventory, logistics, and the like. For example, logistics and transportation are taken as an example. A tag may be embedded into or attached to goods. The tag corresponds to related information of the goods. The reader may perform data communication with the tag by using the foregoing method, obtain the related information of the goods from the tag, and report the related information to a central information system, so that management personnel can quickly query the related information of the goods in the central information system, thereby improving the speed and accuracy of goods handover. If there are unexpected situations such as loss of goods, the management personnel can learn and handle them immediately.

For another example, fixed asset management is taken as an example. In some places with large assets or valuable articles such as libraries, art galleries, and museums, a tag may be embedded into or attached to an article. The reader may perform data communication with the tag by using the foregoing method, obtain related information of the article from the tag, and report the related information to a central information system, so that a custodian can be alerted for immediate handling if there are abnormal changes in the storage information of books or valuable articles.

In embodiments, the operation instruction delivered by the server 103 may include one or more of an inventory instruction, a read instruction, a write instruction, a locating instruction, and a revocation instruction. It should be understood that the type of the operation instruction and the name of the operation instruction are not limited in this embodiment. In addition to the inventory instruction, the read instruction, the write instruction, the locating instruction, and the revocation operation, other operation instructions may be further included. In addition, these operation instructions may also have other names, which is not limited.

The operation instruction described in this embodiment may instruct to perform an operation on the terminal. For example, the inventory instruction may instruct to perform an inventory operation on the terminal; the read instruction may instruct to perform a read operation on the terminal; the write instruction may instruct to perform a write operation on the terminal; the revocation instruction may instruct to perform a revocation operation on the terminal; and the locating instruction may be used to perform a locating operation on the terminal. The inventory operation may be an operation of obtaining an identifier (for example, a tag identifier) of the terminal. The inventory may also be understood as stocktaking, and the two are equivalent concepts. The read operation may be an operation of reading information stored in the terminal. The write operation may be an operation of writing information to a memory of the terminal. The revocation operation may be an operation of revoking information about the terminal (for example, the tag identifier of the terminal). A revoked terminal cannot be inventoried or read/written. The locating operation may be an operation of obtaining location information of the terminal. The precision of the location information is not limited in this embodiment. The location information may include one or more of a coordinate value, a longitude and latitude, a closed access group identifier (for example, closed access group identifier, (CAG id)), a group identifier for network selection (for example, group identifier for network selection, (GIN)), a cell identifier, a tracking area identifier, a slice identifier, a network identifier, or a data network name. Alternatively, the location information may be a name such as a country, a province, a city, a district, a county, a subdistrict, a town, a village, a state, or a block. The CAG ID may represent a cell for communicating a non-public network service in a PNI-NPN scenario. In other words, the CAG ID indicates a cell communicating a non-public network service or a cell associated with a non-public network, or one CAG ID may identify one or more users capable of accessing a CAG cell. The GIN may identify a consortium or a group, where the consortium or group includes one or more SNPNs, which may be formed by a PLMN ID+a network identifier (network identifier, NID). It may be understood that any information that can represent a location (or a network) corresponding to the service may be understood as the location information in embodiments.

For the operations on a tag, the following provides a detailed description:

1. For the inventory operation (or referred to as a stocktaking operation) on the tag, the details are described above. In a possible implementation, the inventory operation may further include a full tag inventory operation, that is, obtaining identifiers of tags within the coverage of the interrogator. It may be understood that, this type of operation may use another name to be distinguished from the foregoing inventory operation, for example, may be referred to as a full tag inventory operation or an unlimited inventory operation. Alternatively, when the range of tag identifiers in the foregoing inventory operation is not limited, it may be understood that the inventory operation is to obtain identifiers of tags within the coverage of the interrogator.

2. Read operation, that is, reading data from the tag. The tag may have a storage function, and data may be stored in a storage area of the tag. If an operation requester intends to perform a read operation on the tag, the operation requester sends a read instruction to the interrogator, and the interrogator performs the read operation on the tag according to the instruction, reads data from the storage area of the tag, and sends the data to the server.

3. Write operation, that is, writing data to the tag. The operation requester may send a write instruction to the interrogator. The interrogator performs a write operation on the tag according to the instruction, and writes data to the storage area of the tag.

4. Revocation operation, that is, revoking the tag. The operation requester may send a revocation instruction to the interrogator, where the revocation instruction may include a tag identifier (that is, an identifier of a tag for which revocation is desired). The interrogator performs a revocation operation on the tag according to the revocation instruction. After the operation is completed, the tag is revoked and cannot be subjected to the inventory or another operation.

5. Obtaining tag information. In a possible implementation, the interrogator obtains or receives tag information sent by the tag. The interrogator sends the tag information to the operation requester or a core network device. In a possible implementation, before the interrogator obtains the tag information sent by the tag, the interrogator may receive an operation instruction, and send the operation instruction to the tag. The operation instruction may come from the operation requester, or may come from the core network device, which is not limited in this embodiment. In a possible implementation, the tag information may include identifier information of the tag and/or information stored in the tag.

6. Message exchange operation with the tag. In a possible implementation, the interrogator sends a message from the operation requester (the server or the application function) to the tag. In another possible implementation, the interrogator receives a message sent by the tag, and sends the message from the tag to the operation requester (the server or the application function). In another possible implementation, before receiving the message sent by the tag, the interrogator may exchange a message, for example, a random number, with the tag.

7. Sending a payload to the tag. In a possible implementation, the server or the application function may send a payload to the tag through the interrogator. After receiving the payload from the server or the application function, the interrogator sends the payload to the tag. In another possible implementation, the core network device may send the payload to the tag through the interrogator. After receiving the payload from the core network device, the interrogator sends the payload to the tag. For example, the payload herein may be an instruction sent by the core network device, the server, or the application function to the tag, data written by the core network device, the server, or the application function to the tag, application layer information sent by the core network device, the server, or the application function to the tag, or the like. Alternatively, the payload herein may be other information related to the tag. This is not limited in this embodiment.

With reference to FIG. 2a, the following description is provided by using an example in which the server 103 delivers an inventory instruction.

As shown in FIG. 2a, when the server 103 is to inventory a terminal within a range, the server 103 may send the inventory instruction to the reader 102, where the inventory instruction may include area location information of inventory, identifier information of a terminal to be inventoried, and the like. After receiving the inventory instruction, the reader 102 performs an inventory process (as shown in FIG. 2*b*) based on the identifier information of the terminal in the inventory instruction. After completing the inventory process, the reader 102 sends an inventory result to the server 103.

FIG. 2*b* shows an inventory process of a terminal. As shown in FIG. 2*b*, in step 201, a reader (for example, the reader 102 in FIG. 1) sends a select command to a terminal (for example, the terminal 101 in FIG. 1).

For example, when the reader receives an inventory command sent by a server (or the inventory command may be sent by the server to the reader through middleware), the select command is generated, where the select command includes a range of terminals (for example, some EPC codes within a specific range). After receiving the select command, the terminal determines whether the terminal belongs to the range of terminals indicated by the select command. If the terminal belongs to the indicated range of terminals, the terminal feeds back information after subsequently receiving a query command. If the terminal does not belong to the range of terminals that should be determined, the terminal does not need to feed back information after receiving the query command.

In step 202, the reader sends a query command to a terminal within a specified range.

In step 203, when the terminal finds that the terminal belongs to the range of terminals in the select command, the terminal feeds back a random number to the reader. For example, the terminal may feed back a random number to the reader through contention. For example, the random number may be a 16-bit random number (16-bit random number, RN16).

In step 204, after receiving the random number sent by the terminal, the reader sends an acknowledgment (ACK) command to the terminal, where the command includes the random number received in step 203.

In step 205, after receiving the acknowledgment command sent by the reader and verifying that the random number is correct, the terminal feeds back its EPC code to the reader.

Figure 2C:
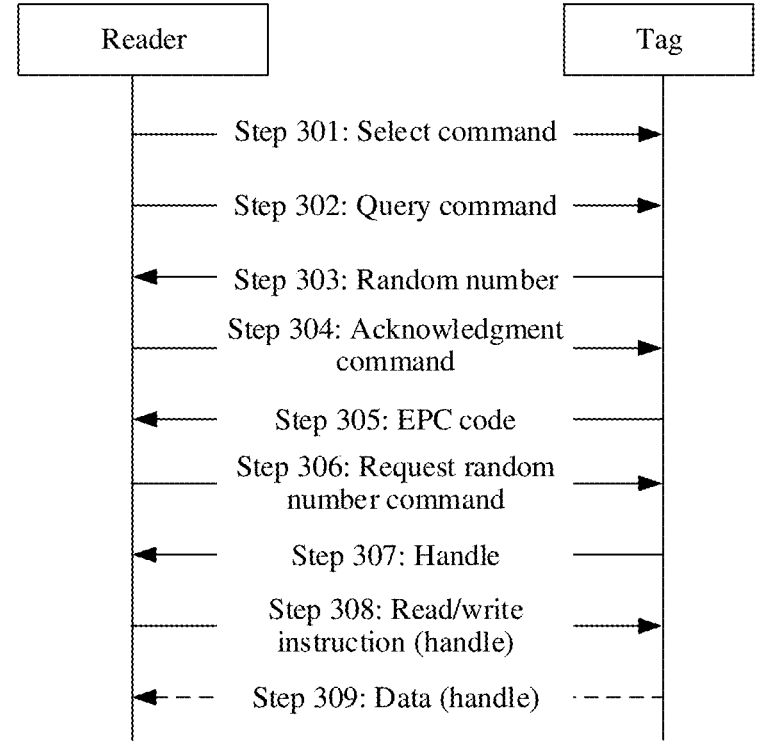
FIG. 2c is a schematic flowchart of inventory and read/write processes.

Further, the server may perform a read/write operation on the terminal based on an inventory result of the terminal. FIG. 2*c* shows a read/write process of a terminal. For steps 301 to 305 in the process, refer to the description of steps 201 to 205 in FIG. 2*b*, which belong to an inventory operation process. Step 302 is different from step 202 in FIG. 2*b* in that a terminal receiving a query command in step 302 is a terminal with a specific EPC code. In addition, the read/write process further includes step 306 to step 309.

In step 306, the reader sends a request random number command (Req_RN) to the terminal. The request random number command includes the random number, for example, RN16, received in step 303.

In step 307, if the terminal verifies that the random number is correct, the terminal sends a handle to the reader. The handle is used to identify identifiers of different readers. In the subsequent read/write process, a read command or a write command includes the handle.

In step 308, the reader sends a read command or a write command to the terminal, where the read command or the write command includes the handle. If the write command is sent, the write command further includes data to be written to a storage area of the terminal.

In step 309, if the read command is sent in step 308, the terminal feeds back data in the storage area of the terminal, including the handle in step 307. If the write command is sent in step 308, this step may not be required.

Currently, enterprises integrate the P-IoT technology with a cellular communication system (or referred to as a cellular network), or integrate the radio frequency identification (RFID) technology with a cellular communication system, to reduce deployment and operation and maintenance costs of the two systems. The cellular communication system may be a 3rd generation partnership project (3GPP) communication system, such as a 4th generation (4G) communication system or a long term evolution (LTE) system, or may be a 5th generation (5G) communication system, a new radio (NR) system, or a next generation communication system, or may be a non-3GPP communication system. In other words, a communication system integrated with the P-IoT technology is not limited in this embodiment.

Figure 3:
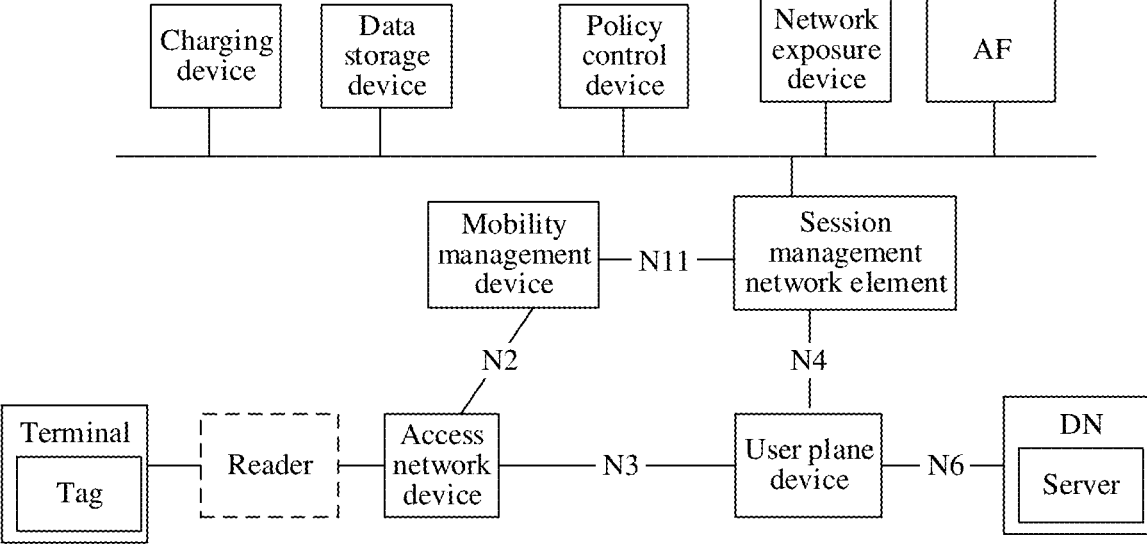
FIG. 3 is a diagram of a communication system according to an embodiment.

FIG. 3 is a diagram of a network architecture of a P-IoT technology and a cellular communication system. The network architecture may include a terminal, a reader, an access network device, a core network device, a data network (DN), and an application function (application function, AF). A server may be deployed in the DN. The core network device may be classified into a control plane device and a user plane device. The control plane device may include at least one of the following devices: a session management device, a network exposure device, a policy control device, a mobility management device, a data storage device, a charging device, a device having an IoT terminal or tag management function, a data management device, and the like.

Communication interfaces between the devices are further indicated in the network architecture shown in FIG. 3. The communication interfaces in embodiments include: N2, a communication interface between the access network device and the mobility management device; N3, a communication interface between the access network device and the user plane device, configured to communicate user data; N4, a communication interface between the session management network element and the user plane device, configured to perform policy configuration or the like on the user plane device; and N6, a communication interface between the DN and the user plane device. Further, the communication interfaces between the devices may have other names, which is not limited in this embodiment.

The terminal in this embodiment may be referred to as user equipment (UE), or may be referred to as a terminal device. The terminal may be a device having a wireless transceiver function, or may be a passive, semi-passive, or semi-active terminal device or tag. When the terminal is a passive, semi-passive, or semi-active terminal or tag, the terminal may harvest energy to receive or send data. Energy can be harvested from radio, solar energy, light energy, wind energy, water energy, heat energy, kinetic energy, and the like. A manner in which the passive or semi-active terminal harvests energy is not limited in this embodiment. The terminal may be deployed on land, including an indoor device, an outdoor device, a handheld device, or a vehicle-mounted device; or may be deployed on water (for example, on a ship); or may be deployed in the air (for example, on a plane, a balloon, or a satellite). The user equipment may also be referred to as a terminal, and may be a mobile phone (mobile phone), a tablet computer (pad), a computer with a wireless transceiver function, a virtual reality (VR) terminal, an augmented reality (AR) terminal, a wireless terminal in industrial control, a wireless terminal in self-driving, a wireless terminal in remote medical (remote medical), a wireless terminal in a smart grid, a wireless terminal in transportation safety, a wireless terminal in a smart city, a wireless terminal in a smart home, and the like. The tag in this embodiment may exist in an independent form, or may be integrated into the foregoing terminal, or may be integrated into a sensor, or the like. In the following description, the term "tag" may be interchanged with the term "terminal", which does not affect the essence of the embodiments.

The access network device may also be a radio access network (AN) device or a radio access network (RAN). A main function of the access network device is to control a user to wirelessly access a mobile communication network. The RAN is a part of a mobile communication system. The RAN implements a radio access technology. Conceptually, the RAN resides in a device (such as a mobile phone, a computer, or any remote controller) and provides connectivity to a core network thereof. The access network device includes, but is not limited to: a (gNodeB, gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission and reception point (TRP), a transmission point (TP), a mobile switching center, and the like. In addition, a wireless fidelity (Wi-Fi) access point (AP) and the like may be further included. The access network device may also be referred to as a RAN apparatus, which is referred to as a RAN in the following description.

The reader interacts with the terminal by using a radio frequency signal or a wireless signal. The reader may also be referred to as an interrogator. The name of the reader is not limited in this embodiment. The reader obtains information stored in a specified terminal, according to an instruction delivered by the server. If the operation is an inventory operation (which may also be referred to as a stocktaking operation), the reader obtains identifier information of the terminal, where the identifier information may be a unique identifier of the terminal, or may be a temporary identifier of the terminal. If the operation is a read operation, the reader reads data in a storage area of the terminal. Optionally, in some scenarios in which information stored in the terminal needs to be rewritten, the reader may further have a write function. If the operation is a write operation, the reader writes data into the storage area of the terminal. In addition, the reader may further perform a revocation operation on the terminal. After be subjected to the revocation operation, the terminal becomes invalid and cannot be subjected to an operation such as an inventory operation, a read operation, or a write operation. If the operation is a locating operation, the reader obtains location information of the terminal. In this application, the reader may be a terminal device, or may be an access network device, a pole site, an eNodeB, a gNodeB, or an integrated access and backhaul (integrated access and backhaul, IAB) node.

The server may be located in the DN, and may provide a service, deliver an operation instruction, and the like for the terminal. The server may be referred to as a P-IoT server. The AF may also provide a service, deliver an operation instruction, and the like for the terminal. The AF may be located in a third-party application system. The server and the AF may be deployed independently or may be co-located and integrated in the same device, which is not limited.

The user plane device can be responsible for data packet forwarding, quality of service (, QoS) control, charging information statistics collection, and the like. The charging information may also be referred to as charging data, a charging message, charging content, or the like. The user plane device may be a user plane function (UPF) entity in a 5G communication system.

The control plane device can be responsible for service process interaction, delivering a data packet forwarding policy, a QoS control policy, and the like to the user plane. The mobility management device can be responsible for user access and mobility management. The session management device is responsible for managing the creation, deletion, and the like of a user protocol data unit (PDU) session, and maintaining a PDU session context and user plane forwarding pipeline information. The network exposure device has the functions of exposing and exhibiting an interface. The policy control device is responsible for formulating a QoS control policy and the like. The charging device is responsible for charging network resources used in a communication process. The data management device may be responsible for managing and storing data and the like in a network. It should be understood that the IoT terminal management or tag management device may be a device having a function of managing an IoT terminal or a tag. In a possible implementation, the device may identify an instruction from an operation requester, and instruct the reader to perform a random access procedure of the IoT terminal or the tag; or the device may obtain information from the IoT terminal or the tag, and feed back the information to the operation requester. In another possible implementation, the device may instruct, based on a request of an operation requester, the core network device to complete an operation on the IoT terminal or the tag. The operation may be, for example, a read operation, a write operation, a locating operation, a stocktaking operation, or a revocation operation.

It should be understood that the mobility management device may be an access and mobility management function (AMF) entity in the 5G communication system, the session management device may be a session management function (SMF) entity in the 5G communication system, the policy control device may be a policy control function (PCF) entity in the 5G communication system, and the network exposure device may be a network exposure function (NEF) entity in the 5G communication system. The data storage device may include one or more of a unified data management (UDM) device, a network repository function (NRF), or a unified data repository (UDR) in the 5G communication system. The charging device may be a charging function (CHF) entity in the 5G communication system.

It may be understood that the foregoing functions may be network elements in a hardware device, may also be software functions running on dedicated hardware, or virtualized functions instantiated on a platform (for example, a cloud platform). One or more services may be obtained through division based on the foregoing functions. Further, a service independent of a network function may exist. In this embodiment, an instance of the function, an instance of the service included in the function, and an instance of the service that is independent of the network function may all be referred to as service instances.

The UPF entity, the SMF entity, the AMF entity, the NEF entity, the PCF entity, and the CHF entity in embodiments may also be referred to as a UPF apparatus, an SMF apparatus, an AMF apparatus, an NEF apparatus, and a CHF entity, respectively, which are referred to as a UPF, an SMF, an AMF, an NEF, and a CHF entity below, respectively. In addition, in actual deployment, the devices shown in FIG. 3 may be deployed independently or may be co-located. For example, the mobility management device and the session management device may be co-located, and the session management device and the user plane device may be co-located. When two devices are co-located, interaction between the two devices provided in embodiments becomes an internal operation of the co-located device or may be omitted.

In a scenario in which the P-IoT technology is integrated with the network architecture of the cellular communication system, because there is currently no device that supports terminal management, when the P-IoT technology is integrated with the network architecture of the 5G communication system, terminals cannot be managed, which is not conducive to the orderly execution of instructions. In addition, when an enterprise does not have permission to perform a terminal operation on another enterprise but still sends a terminal operation instruction, if there is no terminal management, the enterprise without the permission obtains information about the another enterprise, which easily causes security risks. To resolve this problem, in this embodiment, the reader, the user plane device, or the core network device (for example, the mobility management device) may manage a terminal (for example, a tag) based on a management rule.

The integration of the 5G communication system and the P-IoT technology is used as an example to describe an integrated system architecture and a terminal management method below with reference to FIG. 4 to FIG. 6. For a system architecture in which another communication system is integrated with the P-IoT technology and a terminal management method, refer to the description in this embodiment. In addition, for a system architecture in which the RFID technology is integrated with the cellular communication system and a terminal management method, refer to the description in this embodiment. Details are not described subsequently.

Figure 4:
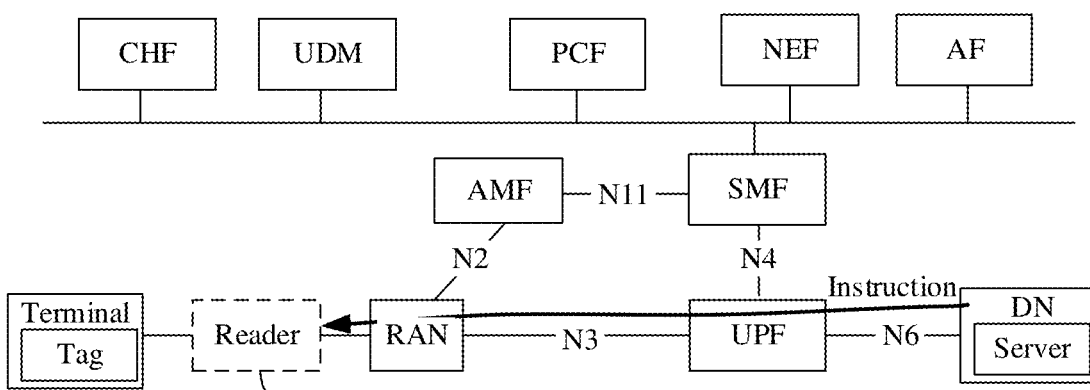
FIG. 4 is a diagram 1 of a terminal management system according to an embodiment.

FIG. 4 is a diagram of a network architecture in which a P-IoT technology is integrated with a cellular according to an embodiment. In the network architecture shown in FIG. 4, a reader may perform terminal management. For example, the reader obtains a management rule from a core network device (for example, an AMF). Optionally, the management rule may be preconfigured on the reader. After the reader receives an instruction delivered by a server, the reader may determine, according to the management rule, whether the instruction can be executed. If the execution of the instruction is allowed, the reader performs a corresponding operation according to the instruction, and collects statistics on an operation result. The reader sends, to the server through a user plane connection, the operation result obtained after the operation is performed. Otherwise, the reader discards the instruction, or feeds back to the server through the user plane connection, indicating that the instruction is invalid or is not successfully executed (failed).

Figure 5:
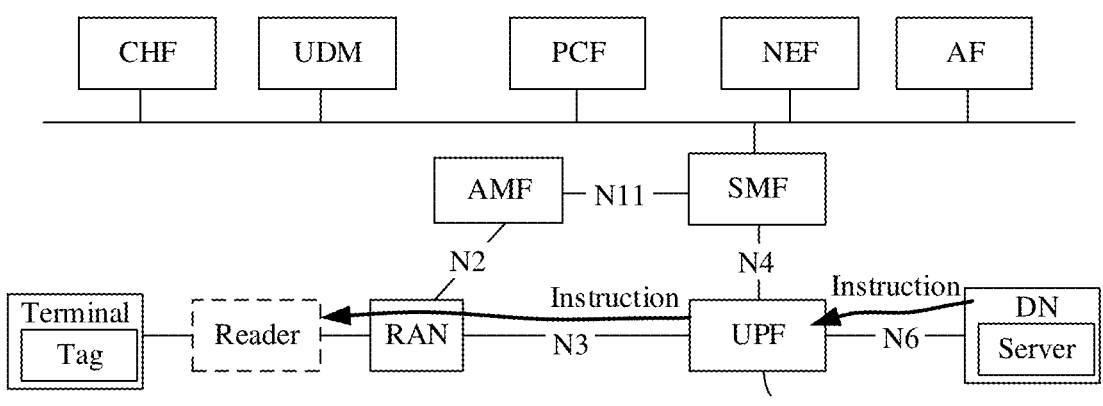
FIG. 5 is a diagram 2 of a terminal management system according to an embodiment.

FIG. 5 is a diagram of a network architecture in which a P-IoT technology is integrated with a cellular according to an embodiment. In the network architecture shown in FIG. 5, a user plane function (UPF) device may perform terminal management. For example, the UPF may obtain a management rule from an SMF, or the management rule may be preconfigured on the UPF. After receiving an instruction delivered by a server, the UPF may determine, according to the management rule, whether the execution of the instruction is allowed. If the execution of the instruction is allowed, the UPF sends the instruction to a reader; otherwise, the UPF discards the instruction or sends a feedback to the server, indicating that the instruction is invalid or is not successfully executed (failed). After the reader completes the execution of the instruction and sends an operation result to the UPF, the UPF may obtain statistical data based on the operation result, send the statistical data to the SMF, and send the operation result to the server.

Figure 6:
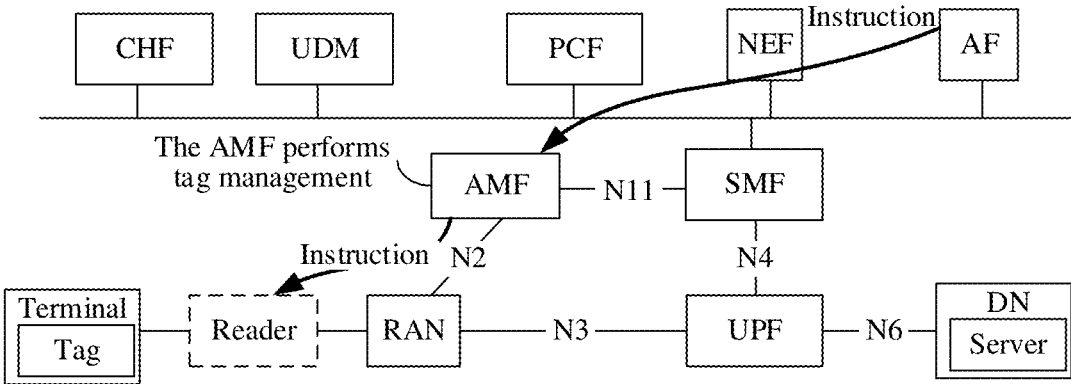
FIG. 6 is a diagram 3 of a terminal management system according to an embodiment.

FIG. 6 is a diagram of a network architecture in which a P-IoT technology is integrated with a cellular according to an embodiment. In the network architecture shown in FIG. 6, an AMF may perform terminal management. For example, the AMF may obtain a management rule from a PCF, or the management rule is preconfigured on the AMF. After receiving an instruction delivered by an AF, the AMF determines, according to the management rule, whether the execution of the instruction is allowed. If the execution of the instruction is allowed, the AMF sends the instruction to a reader; otherwise, the AMF discards the instruction or sends a feedback to a server via an NEF, indicating that the instruction is not successfully executed (failed) or is invalid. After completing the execution of the instruction, the reader sends an operation result to the AMF. The AMF obtains statistical data based on the operation result, sends the operation result to the server via the NEF, and sends statistical data to the SMF.

It should be understood that, in embodiments, a device that manages terminals according to the management rule may be referred to as a first device, and the first device may be the reader, the UPF, or the AMF. Moreover, the first device may alternatively be a device such as the SMF, the NEF, the PCF, or the server, and this is not limited. In this embodiment, only an example in which the first device is the reader, the UPF, or the AMF is used for description. For methods for managing terminals by the other devices, refer to the description in this embodiment.

Optionally, in embodiments, the management rule may be preconfigured on the first device, or may be obtained by the first device from a second device. The second device may be any one of the mobility management device, the session management device, the policy control device, the user plane device, the charging device, the unified data management device, and the unified data repository device.

Further, optionally, after obtaining the statistical data, the first device may send the statistical data to the core network device, so that the core network device performs charging and other operations based on the statistical data. For example, the core network device may include one or more of the following devices: the mobility management device, the session management device, the policy control device, the user plane device, the charging device, the unified data management device, and the unified data repository device. The first device may send the statistical data to one or more of the mobility management device, the session management device, the policy control device, the user plane device, the charging device, the unified data management device, and the unified data repository device.

Optionally, the instruction in embodiments may be referred to as a first instruction or a first operation instruction. This is not limited. In addition, the terminal described in this embodiment may be understood as a tag, and the terminal management described in this embodiment may be understood as tag management.

Optionally, in embodiments, the server may send the first instruction to the first device via a third device. For example, the server may obtain first information used to determine the third device that receives the first instruction, and send the first instruction to the third device based on the first information. The third device forwards the first instruction to a device (for example, the first device) that performs terminal management.

Optionally, the third device is a device that receives an instruction (for example, the first instruction) delivered by the server. The third device may include the reader, the user plane device, or the control plane device. The control plane device may include the mobility management device or the network exposure device. The first device is a device that performs terminal management. The third device and the first device may be the same device, or may be different devices. It should be understood that, if the third device and the first device are co-located or are the same device, after receiving the first instruction, the third device does not perform a forwarding process, but directly performs the terminal management solution shown in this embodiment according to the management rule.

Optionally, in a case in which the server determines, based on the first information, that the third device or one or more readers served by the third device are located in a target area, the server sends the first instruction to the third device.

Optionally, the first information includes address information of the third device, where the address information of the third device is used to establish a user plane connection between the third device and the server; and the sending, by the server, the first instruction to the third device based on the first information includes: sending, by the server, the first instruction to the third device through the user plane connection between the third device and the server, that is, sending the first instruction to the third device through a user plane.

Optionally, the first information includes identifier information of the third device; and the sending, by the server based on the first information, the first instruction to the third device includes: sending, by the server, the first instruction to the third device based on the identifier information of the third device through a control plane channel, that is, sending the first instruction to the third device through a control plane.

For example, in the method shown in FIG. 4, the third device is the reader, the first device is the reader, and the server may send the first instruction to the reader through a user plane connection between the reader and the server. For another example, in the method shown in FIG. 5, the third device is the UPF, the first device is the UPF, and the server may send the first instruction to the UPF through an N6 connection between the server and the UPF. For still another example, in the method shown in FIG. 6, the third device is the NEF, the AMF, or the SMF, and the first device is an AMF. The server may obtain identifier information of the AMF, and send the identifier information of the AMF and the first instruction to the NEF, and the NEF forwards the first instruction to the AMF based on the identifier information of the AMF. Alternatively, the server sends the identifier information of the AMF and the first instruction to the SMF, and the SMF forwards the first instruction to the AMF based on the identifier information of the AMF.

Optionally, the server may obtain, from a fourth device, the first information used to determine the third device that receives the first instruction. The fourth device may include the third device, the core network device (for example, the NEF, the SMF, or the UPF), or the reader. In a possible implementation, the server may obtain the first information from the fourth device through a subscription procedure.

For example, the server may send a subscription request. For example, the server sends a subscription request to the fourth device, where the subscription request may be used to request to obtain information about one or more devices. The one or more devices include the third device. The server receives a subscription response, where the subscription response includes the information about the one or more devices.

It should be understood that the first device in this embodiment may be a device that determines, according to the management rule, whether performance of the operation is allowed, and/or determines a target terminal to be sub-jected to the operation. The second device may be a device that delivers the management rule to the first device. The third device may be a device that receives the instruction (for example, the first instruction) delivered by the server. The fourth device may be a device that collects the first information used to determine the third device and reports the first information to the server. The first device, the second device, the third device, and the fourth device may be the same device, or may be different devices. This is not limited.

It should be understood that determining whether to perform the operation (for example, the first operation) in this embodiment may be replaced by determining whether to send an operation result of performing the operation (for example, the first operation) to the operation requester.

It should be understood that in embodiments, in the network architectures shown in FIG. 3 to FIG. 6, the passive terminal, the semi-active terminal, or the semi-passive terminal may interact with the RAN via the reader; or the passive terminal, the semi-active terminal, or the semi-passive terminal may directly interact with the RAN. For example, when the RAN has a reader function, the passive terminal, the semi-active terminal, or the semi-passive terminal may directly interact with the RAN. This is not limited.

To make the objectives, solutions, and advantages clearer, the following further describes embodiments in detail with reference to the accompanying drawings. It is clear that the described embodiments are merely some rather than all of embodiments.

A network architecture is described in embodiments to describe the solutions in embodiments more clearly, and does not constitute any limitation to the solutions provided in embodiments. A person of ordinary skill in the art may understand that with evolution of network architectures and appearance of new service scenarios, the solutions provided in embodiments are also applicable to a similar problem. A terminal management method is described below by using the P-IoT technology as an example. However, the terminal management method in this embodiment is not limited to the P-IoT technology, and may also be applicable to RFID and other technologies.

With reference to the cellular integrated systems shown in FIG. 4 to FIG. 6, the terminal management method provided in embodiments is described below by using the integration of the P-IoT technology and the 5G communication system as an example. For actions, terms, and the like involved in the following embodiments, reference may be made to each other. Names of messages exchanged between devices, names of parameters in the messages, and the like in embodiments are merely examples, and other names may also be used in specific implementation. This is not limited. In addition, terms "first", "second", and the like in embodiments are used to distinguish between different objects, but are not used to describe a specific order of the objects. Attributes of different objects represented by "first" and "second" are not limited in embodiments. It should be understood that the terminal management method in this embodiment is not limited to the P-IoT technology, and may also be applicable to an RFID technology and the like. This is not limited.

The cellular integrated system shown in FIG. 4 is used as an example. In the cellular integrated system shown in FIG. 4, the reader receives, from the server, a first instruction instructing to perform a first operation on one or more terminals, and then the reader determines, according to a management rule, whether performance of the first operation is allowed, and/or determines a target terminal to be subjected to the first operation. For example, for the method, refer to FIG. 7A and FIG. 7B.

Figure 7A:
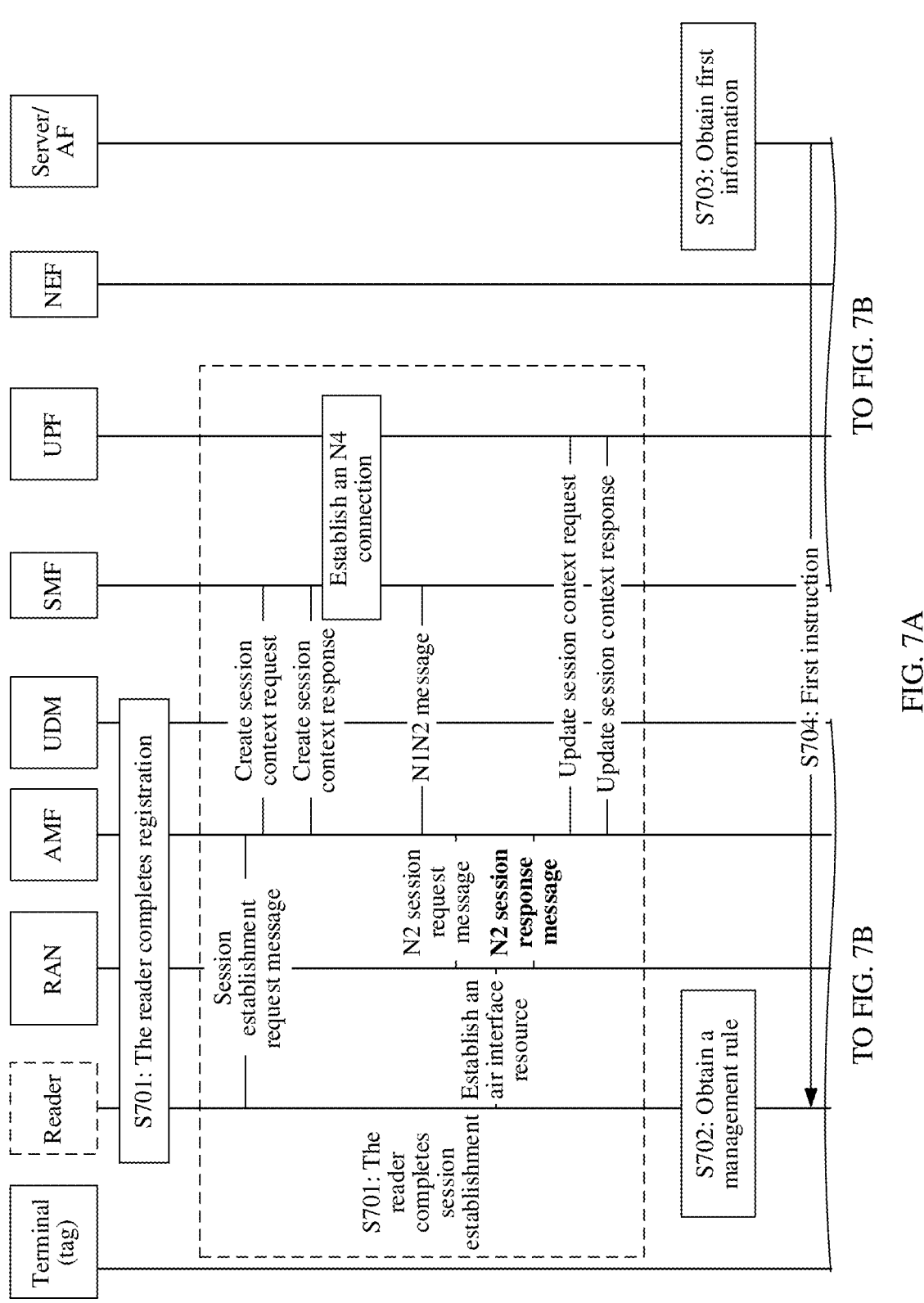
FIG. 7A and FIG. 7B are a flowchart 1 of a terminal management method according to an embodiment.
Figure 7B:
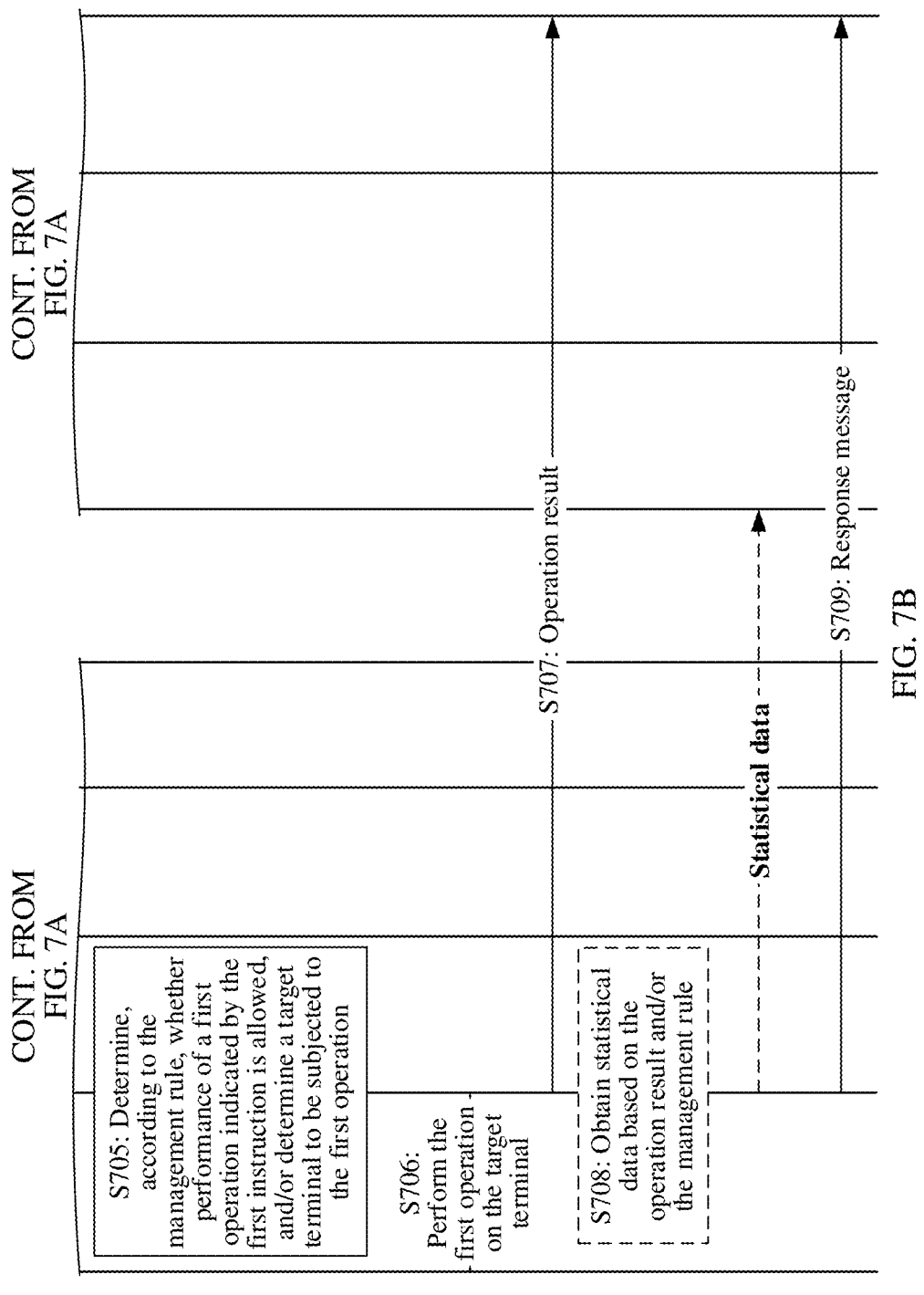

FIG. 7A and FIG. 7B are a flowchart of a terminal management method according to an embodiment. In the method, a reader determines, according to a management rule, whether performance of a first operation is allowed, and/or determines a target terminal to be subjected to the first operation. The embodiment shown in FIG. 7A and FIG. 7B is applicable to the cellular integrated architecture of FIG. 4. As shown in FIG. 7A and FIG. 7B, the method includes the following steps.

S701: Optionally, the reader completes registration and session establishment.

For example, when the reader is a terminal, the reader may perform registration and session establishment procedures. When the reader is an access network device, the reader may skip the registration procedure and the session establishment procedure. Alternatively, when the reader is the access network device, the reader may perform only the session establishment procedure, without performing the registration procedure. A session may be at a granularity of device, that is, data of all terminals within a coverage area of the reader may be communicated over the session.

The reader may be the reader shown in FIG. 4. The reader may be independently deployed, or may be integrated into another device, for example, integrated into a RAN or a terminal. This is not limited. It should be noted that, in this embodiment, in a scenario in which the RAN has a function performed by the reader, an action performed by the reader may be performed by the RAN. For example, when the reader is integrated into the RAN, there is no interaction process between the RAN and the reader. In this case, all messages sent or received by the reader are sent or received by the RAN.

For the registration procedure of the reader, reference may be made to an existing procedure, and details are not described.

The session of the reader may include an air interface connection (or an air interface resource) between the reader and the RAN, and an N3 tunnel (or referred to as an N3 connection) between the RAN and a UPF. The session of the reader may be referred to as a user plane transmission channel or a user plane connection of the reader. There is a mapping relationship between the session of the reader and an N6 tunnel (or referred to as an N6 connection) corresponding to the reader. The N6 tunnel may be a transmission tunnel between a server and the UPF. The session of the reader may be used to communicate an instruction (for example, a first instruction in this embodiment) sent by the server to the reader. For example, the server sends the first instruction to the UPF through the N6 tunnel between server and the UPF. After receiving the first instruction, the UPF sends the first instruction to the RAN through the N3 tunnel corresponding to the N6 tunnel based on the mapping relationship between the session of the reader and the N6 tunnel. The RAN sends the first instruction to the reader. It may be understood that when the reader is the RAN or when the RAN has a reader function, the air interface connection between the RAN and the reader does not need to be established. In this case, the user plane connection established by the RAN may be the N3 connection between the RAN and the UPF.

For example, the session establishment procedure of the reader may include the following: The reader sends a session establishment request message to the AMF, where the session establishment request message includes one or more of an identifier of the reader, a session identifier, a data network name (DNN) requested by the reader, and single network slice selection assistance information (S-NSSAI). The AMF receives the session establishment request message, selects an SMF, and sends a session context creation request to the SMF, where the session context creation request includes one or more of the identifier of the reader, the DNN requested by the reader, and the session identifier. The SMF sends a session context creation response to the AMF. The SMF establishes an N4 connection to the UPF. The SMF sends an NIN2 message to the AMF, where the NIN2 message includes information such as a tunnel endpoint identifier of the UPF. The AMF sends the NIN2 message to the RAN, to indicate the RAN to send uplink data to the UPF based on the tunnel endpoint identifier of the UPF. The AMF sends an N2 session request message to the RAN, where the N2 session request message includes a non-access stratum (NAS) message that needs to be sent to the reader. The RAN establishes the air interface resource (or the air interface connection) with the reader, and the RAN sends the NAS message to the reader, where the NAS message includes a session establishment accept message. The RAN sends an N2 session response message to the AMF, where the N2 session response message includes a RAN-side tunnel endpoint identifier, and the RAN-side tunnel endpoint identifier is used for the UPF to send downlink data to the RAN side. The AMF sends, to the SMF through a session context update request, the RAN-side tunnel endpoint identifier sent by the RAN. The SMF sends the RAN-side tunnel endpoint identifier to the UPF through an N4 session modification procedure. The UPF associates the RAN-side tunnel endpoint identifier information with an N6 interface, where the N6 interface may correspond to the N6 tunnel between the server and the UPF. The SMF sends a session context update response to the AMF.

In a possible implementation, the session establishment procedure may be a PDU session establishment procedure.

S702: The reader obtains a management rule.

In an example, the reader may obtain the management rule from a second device, where the second device may include any one of the AMF, the SMF, a PCF, the UPF, a UDM, a UDR, a NEF, a TMF, and a CHF. For example, the second device is the AMF. The management rule may be preconfigured on the AMF. The AMF may locally obtain the management rule during the registration procedure of the reader or after the reader completes the registration procedure, and send the management rule to the reader. Alternatively, the AMF may obtain the management rule from the second device, and send the obtained management rule to the reader during the registration procedure of the reader or after the reader completes the registration procedure.

For example, the second device is the SMF. The management rule may be preconfigured on the SMF. The SMF may obtain the management rule, and send the management rule to the reader during the session establishment procedure, the session modification procedure, or an N2 procedure (for example, a (creating NGAP UE-TNLA-bindings) procedure).

In another example, the management rule may be preconfigured on the reader, and the reader may locally obtain the management rule.

In this embodiment, the management rule (management rule(s)) may be used to determine whether to execute an operation instruction delivered by the server for the terminal, and/or to select a target terminal (for example, a target tag) for which the operation instruction delivered by the server can be executed. A manager may formulate a management rule based on one or more of a service requirement of an operation requester, subscription information between the operation requester and an operator, open permission, and charging information. The management rule may be preconfigured on a device, for example, preconfigured on the AMF or the SMF. The management rule may be a set of information or a set of related operations.

In an example, the management rule may include one or more of the following: an allowed operation type, a forbidden operation type, a time period in which an operation is allowed, a time period in which an operation is forbidden, location information in which an operation is allowed, location information in which an operation is forbidden, a threshold of a quantity of single-operation terminals, a threshold of a quantity of cumulative-operation terminals, a threshold of a quantity of terminals subjected to an operation, a threshold of a cumulative count of operations, an operation frequency threshold, identifier information of a terminal allowed to be operated, identifier information of a terminal forbidden to be operated, or a quantity of readers allowed to perform an operation on a terminal. In this example, the management rule may not be set at a granularity of an operation requester (for example, an enterprise, a tenant, or a company) as. The management rule is applicable to any operation requester, and may be understood as a general management rule.

It should be understood that, in this embodiment, operation-related information included in the management rule may be referred to as an operation attribute. For example, the allowed operation type, the forbidden operation type, the time period in which an operation is allowed, the time period in which an operation is forbidden, the location information in which an operation is allowed, the location information in which an operation is forbidden, the threshold of the quantity of single-operation terminals, the threshold of the quantity of cumulative-operation terminals, the threshold of the quantity of terminals subjected to an operation, the threshold of the cumulative count of operations, and the operation frequency threshold may be collectively referred to as operation attributes. Information that is related to the terminal subjected to an operation and that is included in the management rule may be referred to as a terminal attribute subjected to an operation. For example, the identifier information of the terminal allowed to be operated, the identifier information of the terminal forbidden to be operated, and the quantity of readers allowed to perform an operation on the terminal may be collectively referred to as terminal attributes.

In this embodiment, the allowed (allowed) operation type may be understood as a type of an operation that the reader is allowed to perform on the terminal (for example, a tag). In contrast, the forbidden operation type may be understood as a type of an operation that the reader is forbidden or not allowed to perform on the terminal. The operation type and the operation are equivalent concepts. The operation type may include one or more of an inventory operation (which may also be referred to as a stocktaking operation), a read operation, a write operation, a locating operation, and a revocation operation. For example, the management rule may include the allowed operation type and does not include the forbidden operation type. In this case, another operation type other than the allowed operation type is by default an operation type that is forbidden or not allowed. Alternatively, the management rule includes the forbidden operation type and does not include the allowed operation type. In this case, another operation type other than the forbidden operation type is by default an operation type that is allowed or not forbidden. Alternatively, the management rule includes the allowed operation type and the forbidden operation type.

For example, it is assumed that the operation type includes the inventory operation, the read operation, the write operation, the locating operation, and the revocation operation. If the allowed operation type is the inventory operation, the forbidden operation type includes the read operation, the write operation, the locating operation, and the revocation operation.

It should be understood that the operation type introduced in this embodiment is used to describe the solution in this embodiment more clearly, and does not constitute a limitation on the solution provided in this embodiment, and another operation type may be included in addition to the operation type described in this embodiment. For example, a person of ordinary skill in the art may know that with evolution of a network architecture and emergence of a new service scenario, the solution provided in this embodiment is also applicable to another new operation type.

In this embodiment, the time period in which an operation is allowed may be understood as a time period in which the reader performs a corresponding operation (for example, an allowed operation) on the terminal (for example, the tag). In contrast, the time period in which an operation is forbidden may be understood as a time period in which the reader is forbidden to perform a corresponding operation (for example, an allowed operation) on the terminal. In a possible implementation, the time period may be represented by a start time and an end time, or the time period may be represented by a start time and a duration, or the time period may be represented by a duration and an end time. In another possible implementation, the time period may be represented by a specific time. For example, a time period after the time is the time period in which an operation is allowed or forbidden; or a time period before the time is the time period in which an operation is allowed or forbidden. A representation manner of the time or the time period is not limited in this embodiment. For example, the management rule may include the time period in which an operation is allowed and does not include the time period in which an operation is forbidden. In this case, another time other than the time period in which an operation is allowed is by default the time period in which an operation is forbidden. Alternatively, the management rule includes the time period in which an operation is forbidden and does not include the time period in which an operation is allowed. In this case, another time period other than the time period in which an operation is forbidden is by default the time period in which an operation is allowed. Alternatively, the management rule includes the time period in which an operation is allowed and the time period in which an operation is forbidden.

For example, it is assumed that the allowed operation is the inventory operation, and a time period in which the inventory operation is allowed may be {start time 9:00, end time 10:00}, or may be {start time 9:00, duration 1 hour}, or may be {end time 10:00, duration 1 hour}. A time period in which the inventory operation is forbidden may be another time in the whole day except the time period in which the operation is allowed. It may be understood that the time period in which the operation is allowed may be another time in the whole day except the time period in which the operation is forbidden.

In this embodiment, the location information in which an operation is allowed may be understood as location information of an area in which performance of the operation is allowed. If there is an area in which the performance of the operation on some or all terminals in the area is allowed, the area is the area in which the performance of the operation is allowed. In contrast, the location information in which an operation is forbidden may be understood as location information of an area in which performance of the operation is forbidden. If there is an area in which the performance of the operation on a terminal in the area is forbidden, the area is the area in which the performance of the operation is forbidden. For example, the management rule may include the location information in which an operation is allowed and does not include the location information in which an operation is forbidden. In this case, another location other than the location information in which an operation is allowed is by default the location information in which an operation is forbidden. Alternatively, the management rule includes the location information in which an operation is forbidden and does not include the location information in which an operation is allowed. In this case, other location information other than the location information in which an operation is forbidden is by default the location information in which an operation is allowed. Alternatively, the management rule includes the location information in which an operation is allowed and the location information in which an operation is forbidden.

In a possible implementation, the area may include one or more cells, or include one or more tracking areas (TA), or include one or more registration areas (registration area, RA), or include one or more networks. The network may include a public network (PLMN) or a non-public network, where the non-public network may further include a stand-alone non-public network (SNPN) and a public network integrated non-public network (PNI-NPN). In a possible implementation, the location information of the area may include one or more of longitude and latitude information of the area, coordinate value information of the area, a cell identifier of a cell corresponding to the area, a tracking area (TA) identifier corresponding to the area, registration area information corresponding to the area, and a network identifier corresponding to the area. The network identifier corresponding to the area may include a PLMN identifier (which may be referred to as a PLMN ID) corresponding to the area, or the network identifier corresponding to the area is determined based on the PLMN ID and a network identifier (network ID, NID) in which the area is located. For example, the network identifier corresponding to the area may include PLMN ID+NID.

For example, the area in which the performance of the operation is allowed is an area A, and location information of the area A may be location information in which an operation is allowed. The location information of the area A is {longitude and latitude 1, longitude and latitude 2, longitude and latitude 3, . . . , longitude and latitude n}, or {coordinate value 1, coordinate value 2, coordinate value 3, . . . , coordinate value n}, or {cell identifier 1, cell identifier 2, . . . , cell identifier n}, or {tracking area identifier 1, tracking area identifier 2, . . . , tracking area identifier n}, or {network identifier 1, network identifier 2, . . . , network identifier m}. A structure or a representation form of the location information is not limited in this embodiment.

In this embodiment, the threshold of the quantity of single-operation terminals may be understood as a maximum quantity of single-operation terminals. The single-operation terminal may be a terminal that is to be subjected to an operation and that is indicated in an instruction sent by the operation requester or a terminal subjected to an operation in a single operation. The terminal subjected to an operation herein may be a terminal (that is, the target terminal) on which performance of an operation is allowed, or a terminal that is to be subjected to an operation and that is indicated in the instruction. In a possible implementation, whether the performance of an operation is allowed or a terminal subjected to an operation is determined based on the threshold of the quantity of single-operation terminals. For example, the threshold of the quantity of single-operation terminals is 500. When the quantity of single-operation terminals refers to the terminal that is to be subjected to an operation and that is indicated in the instruction sent by the operation requester, it may indicate that a maximum quantity of terminals that are to be subjected to an operation and that are indicated in the instruction sent by the operation requester is 500. If the quantity of terminals that are to be subjected to an operation and that are indicated in the instruction sent by the operation requester is less than or equal to 500, it is determined that the performance of an operation is allowed. If the quantity of terminals that are to be subjected to an operation and that are indicated in the instruction sent by the operation requester is greater than 500, for example, is 1000, the terminals to be subjected to an operation may be filtered according to the management rule, so that the quantity of terminals to be subjected to an operation is less than or equal to 500; or it may be determined, according to the management rule, that the execution of the instruction is not allowed. In another possible implementation, whether the performance of an operation is allowed or a terminal subjected to an operation is determined based on the threshold of the quantity of single-operation terminals. For example, the threshold of the quantity of single-operation terminals is 500. When the quantity of single-operation terminals refers to the terminal that is subjected to an operation and that is indicated in the instruction sent by the operation requester, it may indicate that a maximum quantity of terminals subjected to an operation is 500. If the quantity of terminals that are to be subjected to an operation and that are indicated in the instruction sent by the operation requester is less than or equal to 500, it is determined that the performance of an operation is allowed. If the quantity of terminals that are to be subjected to an operation and that are indicated in the instruction sent by the operation requester is greater than 500, for example, is 1000, the terminals to be subjected to an operation may be filtered according to the management rule, so that the quantity of terminals to be subjected to an operation is less than or equal to 500; or an operation may be performed on some terminals in sequence according to the management rule, and until a quantity of terminals subjected to the operation reaches 500, the performance of the operation is stopped for the remaining terminals not subjected to the operation; or it may be determined, according to the management rule, that the execution of the instruction is not allowed.

In this embodiment, the threshold of the quantity of cumulative-operation terminals may be understood as a maximum quantity of single-operation terminals that are accumulated in a period of time. The definition of the single-operation terminal is the same as the above. In two or more operations, if operation types corresponding to the same terminal are the same, a cumulative quantity of single-operation terminals that corresponds to the terminal is not one but is equal to a count of operations. In other words, the single-operation terminal may be repeatedly counted. For example, if a tag 3 is inventoried three times in a period of time, the quantity of cumulative-operation terminals is 3. In two or more operations, if the operation types corresponding to the same terminal are different, the quantity of cumulative-operation terminals may be counted according to the operation types, or may not be counted according to the operation types. For example, the tag 3 is inventoried three times and read twice in a period of time. If not counted according to the operation types, the quantity of cumulative-operation terminals is 5. If counted according to the operation types, the quantity of cumulative-operation terminals that corresponds to the inventory operation is 3, and the quantity of cumulative-operation terminals that corresponds to the read operation is 2.

In this embodiment, the threshold of the quantity of terminals subjected to an operation may be understood as a maximum quantity of terminals subjected to the operation in a period of time. One terminal subjected to the operation is counted as 1. Even if the terminal is subjected to the operation a plurality of times in the period of time, the terminal is still counted as 1. In other words, the terminal is not repeatedly counted. For example, a terminal 3 is inventoried three times, but is counted as one terminal.

In this embodiment, optionally, a quantity of terminals subjected to an operation may be determined based on identifier information of the terminals. In a possible implementation, the quantity of terminals subjected to an operation is equal to a quantity of pieces of identifier information of the terminals. For example, if an inventory result includes N pieces of identifier information of the terminals, it is determined that the quantity of terminals subjected to an operation is N. In this implementation, no deduplication operation is performed. In another possible implementation, a deduplication operation is performed. Deduplication is performed on the obtained identifier information of the terminals, and the identifier information of the terminals obtained after the deduplication is used as the quantity of terminals subjected to the operation.

The deduplication may be understood as removing identifier information of a terminal that repeatedly appears in an operation result, and a count of operations that corresponds to the terminal is 1. Not performing the deduplication may be understood as not removing the identifier information of the terminal that repeatedly appears in the operation result, and the count of operations that corresponds to the terminal includes a count of repeated appearances. For example, the reader periodically inventories tags in an inventory operation procedure, and obtains two operation results: an operation result 1 {inventory operation, tag 1, tag 3, tag 4} and an operation result 2 {inventory operation, tag 1, tag 2, tag 3, tag 5}. If no deduplication is performed, identifier information of terminals subjected to the inventory operation includes {tag 1, tag 3, tag 4, tag 1, tag 2, tag 3, tag 5}, and a quantity of the terminals subjected to the inventory operation is 7. If deduplication is performed, the reader removes the tag 1 and the tag 3 that are repeatedly counted in the two operation results, the identifier information of the terminals subjected to the inventory operation includes {tag 1, tag 2, tag 3, tag 4, tag 5}, and the quantity of terminals subjected to the inventory operation is 5.

In this embodiment, the identifier information of the terminal may be used to identify the terminal. The identifier information of the terminal may be understood as identifier information of a tag. The identifier information may be permanent identifier information, globally unique identifier information, temporary identifier information, or non-globally unique identifier information. For example, the identifier information of the tag may include an EPC of the tag, and the identifier information of the terminal may also be understood as identifier information of the tag used as a terminal (or understood as a terminal in which the tag is located or a terminal corresponding to the tag). The identifier information of the terminal may include a subscription permanent identifier (SUPI), a subscription concealed identifier (SUCI), a 5G globally unique temporary identity (5G-GUTI), a generic public subscription identifier (GPSI), a 5G temporary mobile subscriber identity (5G-TMSI), a temporary mobile subscriber identity (TMSI), an international mobile subscriber identity (IMSI) or an international mobile equipment identity (IMEI), or a permanent equipment identifier (PEI).

In this embodiment, the threshold of the cumulative count of operations may be understood as a maximum count of operations that the operation requester requests to perform on the terminal in a period of time. In a possible implementation, the cumulative count of operations may not be calculated according to the operation types, or may be calculated according to the operation types. For example, the operation requester requests to perform three inventory operations and two read operations on the terminal 3 in a period of time. If not calculated according to the operation types, the cumulative count of operations is 5. If calculated according to the operation types, the cumulative count of operations that corresponds to the inventory operation is 3, and the cumulative count of operations that corresponds to the read operation is 2. In another possible implementation, the cumulative count of operations may include only a count of successful operations, or may include a count of successful operations and a count of failed operations. For example, the operation requester requests to perform five inventory operations on the terminal 3 in a period of time, and the terminal 3 is successfully inventoried only three times. If the cumulative count of operations includes only the count of successful operations, the cumulative count of operations is 3. If the cumulative count of operations includes the count of successful operations and the count of failed operations, the cumulative count of operations is 5.

It should be understood that, whether the cumulative count of operations needs to be calculated according to the operation types and whether only the count of successful operations is calculated are not limited in this embodiment. Whether the cumulative count of operations is calculated according to the operation types and whether the cumulative count of operations includes only the count of successful operations may be mutually decoupled and independent or may be mutually combined. That is, the cumulative count of operations may be calculated only according to the operation types, or the cumulative count of operations may be obtained only according to the count of successful operations, or the cumulative count of operations that corresponds to the operation type may be obtained according to the operation type and the count of successful operations of the operation type.

In this embodiment, the operation frequency threshold may be understood as a maximum value of an operation frequency. The operation frequency may refer to a quantity of times for which the operation requester delivers in a period of time an instruction to instruct to perform an operation on the terminal, or refer to a ratio of a quantity of times for which the operation requester delivers in a period of time an instruction to instruct to perform an operation on the terminal to a total duration of the period of time.

In this embodiment, the identifier information of the terminal allowed to be operated may be understood as identifier information of a terminal on which performance of an operation indicated by the server is allowed, and the identifier information of the terminal may be used to identify the terminal. In contrast, the identifier information of the terminal forbidden to be operated may be understood as identifier information of a terminal on which performance of an operation indicated by the server is not allowed or forbidden. For example, the management rule may include the identifier information of the terminal allowed to be operated and does not include the identifier information of the terminal forbidden to be operated. In this case, other identifier information of a terminal other than the identifier information of the terminal allowed to be operated is by default the identifier information of the terminal forbidden to be operated. Alternatively, the management rule includes the identifier information of the terminal forbidden to be operated and does not include the identifier information of the terminal allowed to be operated. In this case, other identifier information of a terminal other than the identifier information of the terminal forbidden to be operated is by default the identifier information of the terminal allowed to be operated. Alternatively, the management rule includes the identifier information of the terminal allowed to be operated and the identifier information of the terminal forbidden to be operated.

In a possible implementation, the identifier information of the terminal allowed to be operated and the identifier information of the terminal forbidden to be operated are specified at a granularity of an operation type. In other words, the identifier information of the terminal allowed to be operated and the identifier information of the terminal forbidden to be operated correspond to a specific operation type (for example, the inventory operation). In this case, the identifier information of the terminal allowed to be operated and/or the identifier information of the terminal forbidden to be operated and the operation type are correspondingly included in the management rule. In another possible implementation, the identifier information of the terminal allowed to be operated and the identifier information of the terminal forbidden to be operated are not specified at a granularity of an operation type. In this case, the terminal allowed to be operated may be a set of all terminals allowed to be operated, and the terminal forbidden to be operated may be a set of all terminals forbidden to be operated. The operation herein is a broad concept, including one or more of the inventory operation, the read operation, the write operation, the locating operation, and the revocation operation, and is not a specific operation.

For example, if an operation is allowed on terminals with terminal IDs of 1, 2, 3, 4, . . . , k, identifier information of terminals allowed to be operated is {terminal 1, terminal 2, terminal 3, terminal 4, . . . , terminal k}, and other identifier information of terminals other than the identifier information of these terminals may be understood as identifier information of terminals forbidden to be operated. Alternatively, assuming that an operation is not allowed or forbidden on terminals with terminal IDs of 1, 2, 3, 4, . . . k, identifier information of terminals not allowed or forbidden to be operated is {terminal 1, terminal 2, terminal 3, terminal 4, . . . , terminal k}, and other identifier information of terminals other than the identifier information of these terminals may be understood as identifier information of terminals allowed to be operated.

For example, the inventory operation is allowed on terminals with terminal IDs of 1, 2, and 3, and the read operation is allowed on terminals with terminal IDs of 4, 5, and 6. In this case, identifier information of terminals allowed to be operated is {inventory operation: terminal 1, terminal 2, terminal 3; read operation: terminal 4, terminal 5, terminal 6}. In this case, identifier information of other terminals other than the terminal 1, the terminal 2, and the terminal 3 may be understood as identifier information of terminals on which performance of the inventory operation is forbidden, and identifier information of other terminals other than the terminal 4, the terminal 5, and the terminal 6 may be understood as identifier information of terminals on which performance of the read operation is forbidden. Alternatively, it is assumed that the inventory operation is not allowed or forbidden on terminals with terminal IDs of 1, 2, and 3, and the read operation is not allowed or forbidden on terminals with terminal IDs of 4, 5, and 6. In this case, identifier information of terminals not allowed or forbidden to be operated is {inventory operation: terminal 1, terminal 2, terminal 3; read operation: terminal 4, terminal 5, terminal 6}. In this case, identifier information of other terminals other than the terminal 1, the terminal 2, and the terminal 3 may be understood as identifier information of terminals on which performance of the inventory operation is allowed, and identifier information of other terminals other than the terminal 4, the terminal 5, and the terminal 6 may be understood as identifier information of terminals on which performance of the read operation is allowed.

In this embodiment, the quantity of readers allowed to perform an operation on the terminal may be understood as a quantity of readers allowed to perform an operation on the terminal among readers capable of performing an operation on the terminal. Alternatively, the quantity of readers allowed to perform an operation on the terminal may be understood as a quantity of readers allowed to perform an operation in a single operation requested by the operation requester. Assuming that there are 50 readers, and only 20 of the 50 readers are allowed to perform the inventory operation on the terminal, the quantity of readers allowed to perform an operation on the terminal is 20. Alternatively, assuming that there are 50 readers, and the quantity of readers allowed to perform an operation on the terminal is 20, a quantity of readers performing an operation that is indicated in the instruction sent by the operation requester needs to be less than or equal to 20. If the quantity of readers performing an operation is greater than or equal to 20, some readers may be selected according to the management rule to perform an operation, so that the quantity of readers performing an operation on the terminal is less than or equal to 20; or it may be determined, according to the management rule, that the performance of the operation is not allowed.

In another example, the management rule is configured at a granularity of an operation requester. The management rule corresponds to one or more specific operation requesters. The management rule may be different for different operation requesters, and is not a general management rule. For example, the management rule may include information about an allowed operation requester and/or information about a forbidden operation requester, and whether to perform an operation indicated in the instruction is determined based on the related information of the operation requester. For example, when the information about the operation requester matches the information about the forbidden operation requester, it is determined that the performance of the operation indicated by the operation requester is not allowed; or when the information about the operation requester does not match the information about the allowed operation requester, it is determined that the performance of the operation indicated by the operation requester is not allowed. When the information about the operation requester matches the information about the allowed operation requester, it is determined that the performance of the operation indicated by the operation requester is allowed, and the target terminal subjected to the operation is further determined based on other information; or when the information about the operation requester does not match the information about the forbidden operation requester, it is determined that the performance of the operation indicated by the operation requester is allowed, and the target terminal subjected to the operation is further determined based on other information.

Further, optionally, in this example, the management rule further includes one or more of the following: an allowed operation type, a forbidden operation type, a time period in which an operation is allowed, a time period in which an operation is forbidden, location information in which an operation is allowed, location information in which an operation is forbidden, a threshold of a quantity of single-operation terminals, a threshold of a quantity of cumulative-operation terminals, a threshold of a quantity of terminals subjected to an operation, a threshold of a cumulative count of operations, an operation frequency threshold, identifier information of a terminal allowed to be operated, identifier information of a terminal forbidden to be operated, or a quantity of readers allowed to perform an operation on a terminal. The information may be used to select the target terminal capable of being subjected to the operation requested by the operation requester. For description of the information, reference may be made to the foregoing description, and details are not described again.

In this embodiment, the information about the operation requester may indicate the operation requester and/or a terminal that can be managed by the operation requester. For example, the information about the operation requester may include: name information (such as a company/enterprise/third-party name) of the operation requester, identifier information (such as a company/enterprise/third-party code name or code) of the operation requester, data network name (DNN) information corresponding to the operation requester, address information of a server corresponding to the operation requester, port information (such as a port ID and/or port status information) of the server corresponding to the operation requester, or identifier information of a terminal corresponding to the operation requester. The data network name information may indicate a data network (DN) corresponding to the operation requester. The address information of the server may include, but is not limited to, an internet protocol (IP) address or a media access control (MAC) address of the server. The terminal corresponding to the operation requester may include a terminal belonging to the operation requester or a terminal managed by the operation requester, or include a terminal on which the performance of the operation indicated by the operation requester is allowed.

In this embodiment, the operation requester may be referred to as a requester for short, and the operation requester may include an enterprise, a tenant, a third party, a company, or the like. This is not limited. The allowed operation requester may be an operation requester that is allowed to send an instruction to the reader to instruct the reader to perform an operation on the terminal. Correspondingly, the forbidden operation requester may be an operation requester that is not allowed or forbidden to send an instruction to the reader to instruct the reader to perform an operation on the terminal. For example, the management rule may include the allowed operation requester and does not include the forbidden operation requester. In this case, another requester other than the allowed operation requester is by default the forbidden operation requester. Alternatively, the management rule includes the forbidden operation requester but does not include the allowed operation requester. In this case, another requester other than the forbidden operation requester is by default the allowed operation requester. Alternatively, the management rule includes the allowed operation requester and the forbidden operation requester. It should be understood that, if the operation requester is the forbidden operation requester, the operation requester performs For example, Table 1 shows enterprises and management rules corresponding to the enterprises. As shown in Table 1, it is pre-specified that an enterprise 1 may perform an inventory operation only on a terminal 1, a terminal 2, . . . , a terminal 50; it is specified that an enterprise 2 may perform an inventory operation only on a terminal 50, a terminal 51, . . . , a terminal 100; and it is specified that an enterprise 3 may perform a read operation only on the terminal 1, the terminal 2, . . . , the terminal 50. It may be specified that the enterprise 1 and the enterprise 2 are allowed operation requesters. By default, the enterprise 3 is a forbidden operation requester.

TABLE 1

| Enterprise name | Management rule |
| --- | --- |
| Enterprise 1 | Identifier information of terminals allowed to be operated {terminal 1, terminal 2, . . . terminal 50}; Allowed operation type: inventory operation |
| Enterprise 2 | Identifier information of terminals allowed to be operated {terminal 50, terminal 51, . . . terminal 100}; Allowed operation type: inventory operation |
| Enterprise 3 | Identifier information of terminals allowed to be operated {terminal 1, terminal 2, . . . terminal 50}; Allowed operation type: read operation |

It should be understood that the name of the management rule is not limited in this embodiment, and the management rule may also be named as a first rule, a terminal management rule, or the like.

S703: The server obtains first information.

The server may be a server deployed by the operation requester. For example, the server may be the AF or the server (which may be referred to as a P-IoT server) in FIG. 3.

In this embodiment, the first information may be used to determine a third device that receives the first instruction, and the first information may be replaced by information about the third device. In the application scenario shown in FIG. 4, the third device may be the UPF, the reader, or the control plane network element (the AMF, the SMF, or the like). Optionally, the first information obtained by the server in S703 includes information about one or more devices, the one or more devices include the third device, and an area in which the one or more devices are located may be understood as an operation-allowed area or an operation-allowed area of an operation requester corresponding to the server. If there is no limitation on an operation area for the operation requester, the operation-allowed area may be understood as a global area. In other words, there is no limitation on which areas are operation-allowed areas and which areas are areas in which an operation is not allowed or forbidden.

In this embodiment, the first information may include one or more of the following information: information about the third device, information about a mapping relationship between the third device and one or more readers served by the third device, and information about the one or more readers served by the third device. In this embodiment, the information about the third device may indicate the third device, and the information about the third device may include one or more of location information of the third device, address information of the third device, port information of the third device, and identifier information of the third device. The information about the reader may indicate the reader, and the information about the reader may include one or more of location information of the reader, address information of the reader, port information of the reader, and identifier information of the reader.

In this embodiment, the first instruction may instruct to perform a first operation on one or more terminals. The terminal herein may be the terminal described above. The first operation may include one or more of the inventory operation, the read operation, the write operation, the locating operation, and the revocation operation. Details are not described again. The first instruction may include one or more of identifier information of the terminal, location information of the terminal, information about an operation requester of the first operation, information about the reader, and an operation type of the first operation.

In this embodiment, the location information of the third device may indicate a location of the third device. For example, the location information of the third device may include, but is not limited to, a cell identifier of a cell in which the third device is located, a tracking area identifier (TAI) of a tracking area in which the third device is located, a registration area in which the third device is located, a network identifier (PLMN ID or PLMN ID+NID) of a network in which the third device is located, a longitude and latitude identifier corresponding to the third device, a coordinate value corresponding to the third device, or the like. For example, the third device is the reader. The location information of the reader may indicate a location of the reader. The location information of the reader may include, but is not limited to, a cell identifier of a cell in which the reader is located, a tracking area identifier (TAI) of a tracking area in which the reader is located, a registration area in which the reader is located, a network identifier (PLMN ID or PLMN ID+NID) of a network in which the reader is located, a longitude and latitude identifier corresponding to the reader, a coordinate value corresponding to the reader, or the like.

In this embodiment, the address information of the third device may include, but is not limited to, an IP address of the third device, an N6 interface IP address corresponding to the third device, or a MAC address of the third device. The address information of the reader may include, but is not limited to, an IP address of the reader, N6 interface address information (for example, an N6 interface IP address and/or an N6 interface MAC address) corresponding to the reader, or a MAC address of the reader. It should be understood that, the address information of the reader described in this embodiment may be static address information, which does not change in a specific period of time, or that the address information of the reader is dynamic address information. This is not limited. The N6 interface address information corresponding to the reader in this embodiment is used to establish an N6 connection (or referred to as an N6 tunnel) between the UPF corresponding to the reader and the server. There is a mapping relationship between the N6 connection and an N3 tunnel (or a general packet radio service tunneling protocol (general packet radio service tunneling protocol, GTP) tunnel) corresponding to the reader.

In this embodiment, the identifier information of the third device may include an ID of the third device. The identifier information of the reader may include an ID of the reader. The identifier of the reader may include a subscription permanent identifier (SUPI), a subscription concealed identifier (SUCI), a 5G globally unique temporary identifier (5G-GUTI), a generic public subscription identifier (GPSI), a 5G temporary mobile subscriber identity (, 5G-TMSI), a temporary mobile subscriber identity (TMSI), an international mobile subscriber identity (IMSI), or a device identifier corresponding to the reader. The device identifier includes an international mobile equipment identity (IMEI) or a permanent equipment identity (PEI). For example, if the reader is deployed on the RAN or the reader is the access network device, the identifier information of the reader may include an identifier (for example, a RAN node ID) of the access network device.

For example, the third device is the reader, and S703 may be replaced by obtaining, by the server, the information about the reader, where the information about the reader may be referred to as the first information. The information about the reader may be used to determine a reader that receives the first instruction. For example, the information about the reader may include one or more of the following information: the location information of the reader, the address information of the reader, the port information of the reader, and the identifier information of the reader.

In a possible implementation, the server obtains the first information from a fourth device. The fourth device and the third device may be the same device, or may be different devices. For example, the third device may be a device managed or served by the fourth device. In the scenario shown in FIG. 4, the fourth device may include, but is not limited to, the reader or the core network device. The core network device may include the UPF, the SMF, and the NEF.

For example, it is assumed that the third device is the reader, and the first information includes the information about the reader. The fourth device is the reader. The reader may establish an IP connection to the server based on the address information of the server corresponding to the operation requester, and send the information about the reader to the server through the IP connection. The address information of the server corresponding to the operation requester may be included in the management rule in S702, and the reader may obtain the address information of the server corresponding to the operation requester from the management rule.

For another example, it is assumed that the third device is the reader, and the first information includes the information about the reader. The fourth device is the SMF. The server is the AF. The SMF may obtain the information about the reader from the reader, and send the information about the reader to the AF via the NEF. The SMF may obtain the information about the reader in a process of establishing a session by the reader. The session may be a PDU session.

For another example, it is assumed that the third device is the reader, and the first information includes the information about the reader. The fourth device is the UPF. The UPF may obtain the information about the reader from the reader, and send the information about the reader to the server through an established connection to the server. The UPF may obtain the information about the reader in a process of establishing a session by the reader. The session may be a PDU session.

In another possible implementation, the server may obtain the first information through a subscription procedure. For example, the server may send a subscription request to the fourth device to request to subscribe to information about one or more devices, where the one or more devices include the third device. The server receives a subscription response from the fourth device, where the subscription response includes the information about the one or more devices that is requested by the server. The subscription response may also be referred to as an event notification (event exposure_notify) message.

The subscription request may be understood as an event subscription request (event exposure_subscribe request) message. The subscription request may be used to subscribe to the information about the one or more devices, where the one or more devices include the third device. As described above, the area in which the one or more devices are located may be understood as the operation-allowed area or the operation-allowed area of the operation requester corresponding to the server. In a possible implementation, if there is no limitation on an operation area for the operation requester, the operation-allowed area may be understood as a global area. In other words, there is no limitation on which areas are operation-allowed areas and which areas are areas in which an operation is not allowed or forbidden. In this case, the subscription request corresponds to the global area, and information about one or more devices in the global area is requested. In another possible implementation, if the operation requester has an operation area, that is, the operation-allowed area is a specific area, the subscription request in this case corresponds to the specific area, and is used to request information about one or more devices in the specific area.

In this embodiment, the subscription request may include information about the fourth device, so that the subscription request is sent to the fourth device to request the fourth device to send, to the server, the first information including information about one or more devices (for example, the third device) corresponding to or managed or served by the fourth device. It should be understood that, if the operation-allowed area corresponding to the server is a specific area, the subscription request may further include information about the operation-allowed area, to request to obtain the information about the third device in the operation-allowed area. The subscription response may include the information about the one or more devices that is requested by the subscription request, for example, may include one or more of the information about the third device, information about a reader managed or served by the third device, and the information about the operation requester. For the related description of the information about the third device and the information about the reader, refer to the foregoing description. Details are not described again.

For example, the fourth device may include one or more of the core network device, the reader, or the user plane device. In a possible implementation, in a scenario in which the subscription request does not necessarily correspond to a specific area, the subscription request may include information about the core network device, the information about the reader (for example, the address information of the reader), and the information about the operation requester. In another possible implementation, in a scenario in which the subscription request necessarily corresponds to a specific area (for example, the operation-allowed area), the subscription request may include one or more of the following information: information about the core network device in the operation-allowed area, information about the reader in the operation-allowed area (for example, the address information of the reader), and the information about the operation requester. The core network device may include the control plane device (for example, the AMF, the SMF, or the NEF) and the user plane device (for example, the UPF).

In this embodiment, the information about the core network device may indicate the core network device or indicate a mapping relationship or an association relationship between the core network device and the third device (for example, the reader) managed or served by the core network device. The information about the core network device may include one or more of the following information: identifier information of the core network device, address information of the core network device, port information of the core network device, and location information of the core network device.

For example, it is assumed that the fourth device is the SMF, and the third device is the reader. The first information includes the information about the reader. The server may send a subscription request to the SMF, to request to subscribe to information about a reader that is managed or served by the SMF and that is located in the operation-allowed area. The SMF receives the subscription request, finds a mobility management device (such as the AMF) corresponding to the reader located in the operation-allowed area, obtains the information about the reader via the AMF, and sends a subscription response including the information about the reader to the server.

Further, the server may store the obtained first information, so as to subsequently send the first instruction to the third device based on the stored first information. In a possible implementation, in a scenario in which there is no limitation on an operation area for the operation requester, the server may consider, by default, that the stored first information corresponds to the global area. In another possible implementation, in a scenario in which there is a limitation on an operation area for the operation requester, a correspondence between the first information and the operation-allowed area may be stored, so as to learn, according to the correspondence, which third devices in which areas receive the first instruction. It should be understood that the global area described in this embodiment may correspond to or may be applied to a scenario in which the operation requester does not limit an area. The global area herein may be an entire network, or may be any area in the network by default.

For example, it is assumed that the first information is the information about the reader. In the scenario in which there is a limitation on an operation area for the operation requester, the server may store a correspondence between the obtained information about the reader and the operation-allowed area. For example, the following Table 2 shows the information about the reader that is stored by the server and the area corresponding to the information. As shown in Table 2, an area A corresponds to information about a reader_1 and information about a reader 2. An area B corresponds to information about a reader_3 and information about a reader 4. It should be understood that Table 2 is merely an example table. The information about the reader may be shown in Table 2, including the identifier information of the reader, the address information of the reader, and the port information of the reader. Alternatively, some of the identifier information of the reader, the address information of the reader, and the port information of the reader may be included, which is not limited. In addition, in the scenario in which there is no limitation on the operation area for the operation requester, the operation-allowed area in Table 2 is a global area by default.

TABLE 2

| Operation-allowed area | Identifier information of the reader | Location information of the reader | Address information of the reader | Port information of the reader |
|---|---|---|---|---|
| Area A | Reader_1 | Longitude and latitude 1/Coordinate 1/Cell identifier 1 | Reader address 1 | Reader port 1 |
| | Reader_2 | Longitude and latitude 2/Coordinate 2/Cell identifier 1 | Reader address 2 | Reader port 2 |
| Area B | Reader_3 | Longitude and latitude 3/Coordinate 3/Cell identifier 2 | Reader address 3 | Reader port 3 |
| | Reader_4 | Longitude and latitude 4/Coordinate 4/Cell identifier 3 | Reader address 4 | Reader port 4 |

S704: The server sends the first instruction to the third device based on the first information. Correspondingly, the third device receives the first instruction, and sends the first instruction to the reader. Correspondingly, the reader receives the first instruction.

The related description of the first instruction is described above, and details are not described again.

For example, the sending, by the server, the first instruction to the third device based on the first information may include: if the server determines that the third device and/or the reader served by the third device is located in a target area, sending, by the server based on the first information, the first instruction to the third device located in the target area.

The target area may be an area in which the first operation is to be performed. The target area may be included in the operation-allowed area (that is, an area in which an operation can be performed and that is defined by the operation requester). Optionally, the server may determine, according to the correspondence between the information about the third device and the operation-allowed area that is stored in S702, information about the third device located in the target area.

For example, in a case in which the operation requester needs to inventory a terminal in the area A, the operation requester may determine information about the readers in the area A by querying Table 2: the information about the reader_1 and the information about the reader 2. The operation requester determines, based on the information about the reader 1, the reader 1 located in the target area, and sends an instruction to instruct to inventory a terminal to the reader_1; and determines, based on the information about the reader_2, the reader_2 located in the target area, and sends an instruction to instruct to perform the inventory operation on one or more terminals to the reader 2.

It should be understood that, if the third device is the reader, and the first information includes the information about the reader, S704 may be replaced by sending, by the server, the first instruction to the reader based on the information about the reader. For example, the first instruction is sent to the reader through a control plane channel, or the first instruction is sent to the reader through the user plane connection of the reader.

If the third device is the control plane device (for example, the AMF, the SMF, the NEF, the TMF, the PCF, the UDM, or the UDR), the server may send the first instruction to the third device based on the first information, and the third device sends the first instruction to the reader through the control plane channel.

For example, it is assumed that the third device is the SMF. The first information includes the information about the reader, for example, includes the identifier information of the reader. After receiving the first instruction, the SMF may send the first instruction to the reader based on the identifier information of the reader. Alternatively, in a scenario in which the first information does not include the information about the reader, the SMF sends the first instruction to a reader managed or served by the SMF. For the related description of the identifier information of the reader, refer to the foregoing description. Details are not described again.

If the third device is the user plane device (for example, the UPF), the server may send the first instruction to the third device based on the first information, and the third device sends the first instruction to the reader through the user plane connection between the reader and the third device.

For example, the first information may include N6 interface address information corresponding to the reader. The server may send the first instruction to the UPF through the N6 connection based on the N6 interface address information corresponding to the reader, and the UPF sends the first instruction to the reader through the N3 tunnel corresponding to the reader.

S705: In response to the first instruction, the reader determines, according to the management rule, whether performance of the first operation indicated by the first instruction is allowed, and/or determines a target terminal (for example, a target tag) to be subjected to the first operation.

It should be understood that the determining, according to the management rule, whether performance of the first operation indicated by the first instruction is allowed may include: determining, according to the management rule, that the performance of the first operation is allowed, or determining, according to the management rule, that the performance of the first operation is not allowed. In this case, the target terminal subjected to the first operation is not judged or determined according to the management rule. The target terminal subjected to the first operation may be all terminals or some terminals indicated by the first instruction, or may be other terminals other than the terminals indicated by the first instruction.

For example, the determining, by the reader according to the management rule, whether performance of the first operation indicated by the first instruction is allowed may include: determining whether the first operation meets an operation attribute included in the management rule, and if the first operation meets the operation attribute, determining that the performance of the first operation is allowed; or determining whether one or more terminals indicated by the first instruction meet a terminal attribute included in the management rule, and if the one or more terminals meet the terminal attribute, determining that the performance of the first operation is allowed; or determining whether the first operation meets an operation attribute included in the management rule and whether one or more terminals indicated by the first instruction meet a terminal attribute included in the management rule, and if the first operation meets the operation attribute and the one or more terminals meet the terminal attribute, determining that the performance of the first operation is allowed; otherwise, determining that the performance of the first operation is not allowed.

In a possible implementation, when a first condition is met, it is determined that the performance of the first operation is not allowed, where the first condition is one or more of the following conditions: an operation type of the first operation belongs to the operation type of the forbidden operation, a time of performing the first operation falls within the time period in which an operation is forbidden, location information of performing the first operation indicated by the first instruction belongs to the location information in which an operation is forbidden, a quantity of terminals subjected to the first operation and indicated by the first instruction is greater than or equal to the threshold of the quantity of single-operation terminals, a quantity of cumulative-operation terminals is greater than or equal to the threshold of the quantity of cumulative-operation terminals, a quantity of terminals subjected to an operation is greater than or equal to the threshold of the quantity of terminals subjected to an operation, a cumulative count of operations is greater than or equal to the threshold of the cumulative count of operations, a statistical value of operation frequency is greater than or equal to the operation frequency threshold, the one or more terminals are not included in the terminal identified by the identifier information of the terminal allowed to be operated, and the one or more terminals are included in the terminal identified by the identifier information of the terminal forbidden to be operated.

In another possible implementation, the determining, by the reader according to the management rule, whether performance of the first operation is allowed includes: when a second condition is met, determining, by the reader, that the performance of the first operation is allowed, where the second condition is one or more of the following conditions: an operation type of the first operation belongs to the operation type of the allowed operation, a time of performing the first operation falls within the time period in which an operation is allowed, location information of performing the first operation indicated by the first instruction belongs to the location information in which an operation is allowed, a quantity of terminals subjected to the first operation and indicated by the first instruction is less than or equal to the threshold of the quantity of single-operation terminals, a quantity of cumulative-operation terminals is less than or equal to the threshold of the quantity of cumulative-operation terminals, a quantity of terminals subjected to an operation is less than or equal to the threshold of the quantity of terminals subjected to an operation, a cumulative count of operations is less than or equal to the threshold of the cumulative count of operations, a statistical value of operation frequency is less than or equal to the operation frequency threshold, the one or more terminals are included in the terminal identified by the identifier information of the terminal allowed to be operated, and the one or more terminals are not included in the terminal identified by the identifier information of the terminal forbidden to be operated.

It should be understood that "A belongs to B" in this embodiment may be understood as "A is included by B", "A is included in B", or "a part or all of A is included in B".

In this embodiment, the quantity of cumulative-operation terminals may be a total quantity of terminals subjected to an operation that are accumulated before the first device receives the first instruction. Alternatively, the first device may estimate, according to the first instruction, the quantity of cumulative-operation terminals after the first instruction is executed. For example, a sum of the total quantity of the terminals subjected to an operation that are accumulated before the first device receives the first instruction and the quantity of terminals subjected to the first operation and indicated by the first instruction is determined as the cumulative quantity of terminals. Similarly, the counting rule may be applied to scenarios such as the cumulative count of operations and the quantity of terminals subjected to an operation. For example, the cumulative count of operations may be a total quantity of operations that have been performed before the first device receives the first instruction. Alternatively, the first device may estimate the cumulative count of operations according to the first instruction. For example, a sum of the total quantity of operations that have been performed before the first device receives the first instruction and the quantity of first operations indicated by the first instruction is determined as the cumulative count of operations. The quantity of the terminals subjected to an operation may be a total quantity of terminals that have been subjected to an operation before the first device receives the first instruction. Alternatively, the first device may estimate, according to the first instruction, the quantity of terminals subjected to an operation after the first instruction is performed. For example, the first device may determine a sum of the total quantity of terminals that have been subjected to an operation before the first instruction is received and the quantity of terminals subjected to the first operation and indicated by the first instruction as the quantity of terminals subjected to an operation. Herein, when the quantity of terminals subjected to an operation is counted, one terminal repeatedly subjected to operations of the same type is counted as 1, that is, the quantity of terminals is not counted repeatedly. When the quantity of cumulative-operation terminals is counted, one terminal repeatedly subjected to operations of the same type is counted as a repetition number, that is, the quantity of cumulative-operation terminals may be repeatedly counted.

For example, it is assumed that the first device is the reader, and the first instruction includes {time period 9:00-9:30, terminal 1 to terminal 100, inventory operation} and {time period 10:00-10:30, terminal 51 to terminal 100, inventory operation}. In this case, the reader estimates, according to the first instruction, that the quantity of cumulative-operation terminals is 150, and that the cumulative count of operations is 150. Because the terminal 51 to the terminal 100 are repeatedly subjected to two inventory operations, in a scenario in which the quantity of terminals subjected to an operation is not repeatedly counted, the quantity of terminals subjected to an operation is 100.

In this embodiment, that the one or more terminals are included in the terminal identified by the identifier information of the terminal forbidden to be operated may be understood as that some of the one or more terminals are included in the terminal identified by the identifier information of the terminal forbidden to be operated, or that the one or more terminals are all included in the terminal identified by the information about the terminal forbidden to be operated.

In this embodiment, that the one or more terminals are not included in the terminal identified by the identifier information of the terminal allowed to be operated may be understood as that some of the one or more terminals are not included in the terminal identified by the identifier information of the terminal allowed to be operated, or that none of the one or more terminals are included in the terminal identified by the identifier information of the terminal allowed to be operated.

For example, it is assumed that the first device is the reader, the terminal is the terminal, and the first instruction includes {terminal 1 to terminal 100, inventory operation}. When the identifier information of the terminal allowed to be operated includes {terminal 1 to terminal 50}, and the identifier information of the terminal forbidden to be operated includes {terminal 51 to terminal 100}, some terminals indicated by the first instruction are included in the terminals allowed to be operated, some terminals are included in the terminals forbidden to be operated, and a condition for allowing the performance of the inventory operation is met.

In still another possible implementation, the reader determines, based on the information about the allowed operation requester and/or the information about the forbidden operation requester, whether the performance of the first operation is allowed. For example, when the information about the operation requester of the first operation matches the information about the forbidden operation requester, the reader determines that the performance of the first operation is not allowed; or when the information about the operation requester of the first operation does not match the information about the allowed operation requester, the reader determines that the performance of the first operation is not allowed; or when the information about the operation requester of the first operation matches the information about the allowed operation requester, the reader determines that the performance of the first operation is allowed; or when the information about the operation requester of the first operation does not match the information about the forbidden operation requester, determining, by the reader, that the performance of the first operation is allowed.

It should be understood that "A matches B" in this embodiment may be understood as "A is the same as B".

For example, it is assumed that the first device is the reader, and the first instruction includes {enterprise 1, terminal 1 to terminal 100, inventory operation}. The operation requester allowed in the management rule includes the enterprise 1, which matches the operation requester indicated by the first instruction, it is determined that the performance of the inventory operation is allowed.

For example, the determining, according to the management rule, a target terminal (for example, a target tag) to be subjected to the first operation may include: in a case in which the operation type of the allowed operation in the management rule is the first operation, determining the terminal identified by the identifier information of the terminal allowed to be operated in the management rule as the target terminal. In this case, the determined target terminal may be included in the one or more terminals indicated by the first instruction, or may not be included in the one or more terminals indicated by the first instruction; or determining a terminal that is identified by the identifier information of the terminal allowed to be operated in the management rule and that is included in the terminal indicated by the first instruction as the target terminal. The target terminal meets one or more of the following: an operation type corresponding to the target terminal belongs to the first operation, a time of performing the first operation belongs to the time period in which an operation is allowed, the location information of performing the first operation belongs to the location information in which an operation is allowed, a quantity of target terminals is less than or equal to the threshold of the quantity of single-operation terminals, the quantity of cumulative-operation terminals is less than or equal to the threshold of the quantity of cumulative-operation terminals, a quantity of target terminals subjected to an operation is less than or equal to the threshold of the quantity of terminals subjected to an operation, the target terminal is included in the terminal identified by the identifier information of the terminal allowed to be operated, and the target terminal is not included in the terminal identified by the identifier information of the terminal forbidden to be operated.

It should be understood that the two processes, such as determining, according to the management rule, whether the performance of the first operation indicated by the first instruction is allowed and determining, according to the management rule, the target terminal (for example, the target tag) to be subjected to the first operation, may be decoupled and separately performed or may be performed in combination. For example, either of determining whether the performance of the first operation is allowed or determining, according to the rule, the target terminal to be subjected to the first operation may be performed. Alternatively, whether the performance of the first operation is allowed may be determined first, and after it is determined that the performance of the first operation is allowed, the target terminal to be subjected to the first operation is determined. Alternatively, the target terminal to be subjected to the first operation is determined first, and then it is checked whether the target terminal is included in the terminal indicated by the first instruction. If the target terminal is included in the terminal indicated by the first instruction (for example, the target terminal and the terminal indicated by the first instruction have an intersection), it is determined that the performance of the first operation is allowed on the target terminal; otherwise, if the target terminal is not included in the terminal indicated by the first instruction (for example, the target terminal and the terminal indicated by the first instruction have no intersection), it is determined that the performance of the first operation is not allowed.

For example, assuming that the management rule includes {identifier information of terminals allowed to be operated: terminal 1 to terminal 100, allowed operation type: inventory operation}, it may be understood, according to the management rule, that terminals to be subjected to the inventory operation are the terminal 1 to the terminal 100, and the terminal 1 to the terminal 100 may be determined as target terminals (or referred to as target terminals).

For another example, it is assumed that the first device is the reader, the terminal is the terminal, and the first instruction includes {enterprise 1, terminal 1 to terminal 100, inventory operation}. It can be understood from Table 1 that the allowed operation requester in the management rule includes the enterprise 1, and the operation requester indicated by the first instruction is included in the allowed operation requester. It is determined that the performance of the inventory operation is allowed. Further, it can be understood from Table 1 that, the enterprise 1 can perform the inventory operation only on the terminal 1 to the terminal 50, and the terminal 51 to the terminal 100 are not managed by the enterprise 1, but are managed by the enterprise 2. In this case, the reader may determine, according to the management rule, that target terminals to be subjected to the inventory operation are {terminal 1 to terminal 50}, perform the inventory operation on the terminal 1 to the terminal 50, and do not perform the inventory operation on the terminal 51 to the terminal 100 that do not belong to the enterprise 1.

Further, if the reader determines that the performance of the first operation is allowed, S706 to S708 are performed; otherwise, if the reader determines that the performance of the first operation is not allowed, S709 is performed.

S706: The reader performs the first operation on the target terminal according to a second instruction.

The second instruction may be used to perform the first operation on the target terminal. It can be understood from S705 that the reader may determine, according to the management rule, the target terminal to be subjected to the first operation. It may be understood that, in a possible implementation, the reader may determine the second instruction according to the management rule.

In a possible implementation, the target terminal is all terminals indicated by the first instruction, the terminal indicated by the first instruction is the same as the target terminal, and a function of the second instruction is the same as that of the first instruction. It may be understood that the second instruction is the first instruction.

In another possible implementation, the terminal indicated by the first instruction is different from the target terminal. For example, if the target terminal is some of the one or more terminals indicated by the first instruction, the second instruction is an instruction obtained by modifying the first instruction. For example, the second instruction may be an instruction obtained by deleting identifier information of other terminals other than the target terminal included in the first instruction. Alternatively, if the terminal indicated by the first instruction is a subset of the target terminal, the first instruction may be changed to the second instruction to instruct to perform the first operation on the target terminal; or the first instruction remains unchanged, that is, the second instruction is the first instruction.

For example, it is assumed that the terminal 1 to the terminal 100 are determined, according to the management rule, as the target terminals (or referred to as the target terminals) to be subjected to the inventory operation, and the first instruction includes {terminal 1 to terminal 100, inventory operation} and instructs to perform the inventory operation on the terminal 1 to the terminal 100. In this case, the target terminals are the same as the terminals indicated by the first instruction, the instruction remains unchanged, and the inventory operation is performed on the terminal 1 to the terminal 100 according to the first instruction.

For another example, it is assumed that the terminal 1 to the terminal 100 are determined, according to the management rule, as the target terminals (or referred to as the target terminals) to be subjected to the inventory operation, and the first instruction includes {terminal 1 to terminal 50, inventory operation}. In this case, the instruction remains unchanged, and the inventory operation is performed on the terminal 1 to the terminal 50 according to the first instruction; or the instruction is changed to a second instruction {terminal 1 to terminal 100, inventory operation} to instruct to perform the inventory operation on the terminal 1 to the terminal 100.

For still another example, it is assumed that the terminal 1 to the terminal 50 are determined, according to the management rule, as the target terminals (or referred to as the target terminals) to be subjected to the inventory operation, and the first instruction includes {terminal 1 to terminal 100, inventory operation}. In this case, the target terminals are some of the terminals indicated by the first instruction, and the first instruction is changed to a second instruction, where the second instruction includes {terminal 1 to terminal 50, inventory operation} to instruct to perform the inventory operation on the terminal 1 to the terminal 100.

That the reader performs the first operation on the target terminal according to the second instruction may be understood as that the reader performs the first operation on the target terminal as instructed by the second instruction. For a process of performing the first operation on the target terminal, refer to the conventional technology. Details are not described again. For example, for the inventory operation, refer to the description of FIG. 2b. For the read operation or the write operation, refer to the description of FIG. 2c. Details are not described again.

S707: The reader sends an operation result to the server. Correspondingly, the server receives the operation result.

The operation result may include the information about the operation requester and/or terminal data. The information about the operation requester is described above, and details are not described again. The terminal data may include data collected in the process of performing the first operation on the target terminal, for example, information about a terminal (for example, a tag) inventoried after the performance of the inventory operation, data information obtained from a terminal (for example, a tag) and successfully read information about the terminal after the performance of the read operation, information about a terminal to which information is successfully written after the performance of the write operation, information about a revoked terminal after the performance of the revocation operation, location information of a terminal obtained after the performance of the locating operation, and the like.

S708: The reader obtains statistical data based on the operation result and/or the management rule, and sends the statistical data to the core network device. Correspondingly, the core network device receives the statistical data.

The core network device receiving the statistical data may include any one or more of the UPF, the AMF, the SMF, the NEF, the TMF, the UDR, the UDM, and the CHF. The reader may send the statistical data periodically, or may send the statistical data immediately after each operation is performed.

The statistical data may include one or more of the following information: the operation type of the first operation, the quantity of terminals subjected to the first operation, the quantity of cumulative-operation terminals, the quantity of terminals subjected to an operation, the statistical value of the operation frequency, the cumulative count of operations, the time of performing the first operation, a duration of performing the first operation, or the location of performing the first operation. The statistical data may be used to calculate a cumulative count of operations performed and/or a cumulative quantity of single-operation terminals, or calculate a quantity of operations initiated by the server in a period of time. An operation frequency or the like is calculated based on the quantity of operations initiated.

In a possible implementation, the obtaining, by the reader, statistical data based on the operation result and/or the management rule may include one or more of the following: When the management rule includes the information about the operation type or the reader obtains indication information indicating that statistics on the operation type need to be collected, where the information about the operation type includes the allowed operation type and/or the forbidden operation type, the reader collects statistics on the operation type based on the operation result, where the indication information indicating that statistics on the operation type need to be collected may be included in the management rule or may be obtained by the reader from another device.

When the management rule includes the threshold of the quantity of single-operation terminals or the reader obtains indication information indicating that the quantity of single-operation terminals needs to be counted, the reader counts the quantity of single-operation terminals based on the operation result, where the indication information indicating that the quantity of single-operation terminals needs to be counted may be included in the management rule or may be obtained by the reader from another device.

When the management rule includes the threshold of the quantity of cumulative-operation terminals or the reader obtains indication information indicating that the quantity of cumulative-operation terminals needs to be counted, the reader counts the quantity of cumulative-operation terminals based on the operation result, where the indication information indicating that the quantity of cumulative-operation terminals needs to be counted may be included in the management rule or may be obtained by the reader from another device.

When the management rule includes the threshold of the quantity of terminals subjected to an operation or the reader obtains indication information indicating that the quantity of terminals subjected to an operation needs to be counted, the reader counts the quantity of terminals subjected to an operation based on the operation result, where the indication information indicating that the quantity of terminals subjected to an operation needs to be counted may be included in the management rule or may be obtained by the reader from another device.

When the management rule includes the threshold of the cumulative count of operations or the reader obtains indication information indicating that the cumulative count of operations needs to be calculated, the reader calculates the cumulative count of operations based on the operation result, where the indication information indicating that the cumulative count of operations needs to be calculated may be included in the management rule or may be obtained by the reader from another device.

When the management rule includes the operation frequency threshold or the reader obtains indication information indicating that the operation frequency threshold needs to be calculated, the reader calculates the operation frequency based on the operation result, where the indication information indicating that the operation frequency threshold needs to be calculated may be included in the management rule or may be obtained by the reader from another device.

When the management rule includes the time information of performing the first operation or the reader obtains indication information indicating that statistics on the time information of performing the first operation need to be collected, the reader collects statistics on the time information of performing the first operation based on the operation result, where the time information includes one or more of a start time, a duration or an end time, a time period in which an operation is allowed, and a time period in which an operation is forbidden, and the indication information indicating that statistics on the time information of performing the first operation need to be collected may be included in the management rule or may be obtained by the reader from another device.

When the management rule includes the location information of performing the first operation or the reader obtains indication information indicating that statistics on the location information of performing the first operation need to be collected, the reader collects statistics on the location information of performing the first operation based on the operation result, where the location information includes one or more of a longitude and latitude, a coordinate value, a cell identifier, a tracking area identifier, a network identifier, a registration area identifier, a slice identifier, the location information in which an operation is allowed, and the location information in which an operation is forbidden. The indication information indicating that statistics on the location information of performing the first operation need to be collected may be included in the management rule or may be obtained by the reader from another device.

For example, it is assumed that the management rule includes the information about the operation type, the threshold of the quantity of single-operation terminals, and the threshold of the quantity of terminals subjected to an operation. In this case, after the reader performs the inventory operation on the terminal 1 to the terminal 100, an operation result {inventory operation, information about the terminal 1, information about the terminal 2, . . . , information about the terminal 100} is obtained, and the reader collects statistics according to the management rule: the operation type is the inventory operation; the quantity of single-operation terminals is 100 at this time; and the quantity of terminals subjected to an operation is 100 at this time.

Further, the core network device generates charging information and/or updates or modifies the management rule based on the received statistical data.

S709: The reader sends a response message to the server, and correspondingly, the server receives the response message.

The response message may include at least one of an operation failure indication, a failure cause, and information about an operation requester. The response message may indicate that the performance of the first operation on one or more terminals fails.

Based on the method shown in FIG. 7A and FIG. 7B, the information about the reader is provided to the server, so that before sending an instruction, the server can determine the reader that performs the first operation, and send the instruction to the reader. In addition, after receiving the instruction, the reader performs terminal (for example, tag) management according to the management rule, for example, determines whether execution of the instruction is allowed and/or determines the target terminal to be subjected to the operation. In this way, operation requesters perform corresponding operations on the terminal in an orderly manner under the management rule, thereby preventing an operation requester from continuously occupying a network resource or performing an operation beyond permissions.

FIG. 7A and FIG. 7B are described by using an example in which the reader manages the terminal according to the management rule. It should be noted that, in the embodiments, the terminal is not necessarily managed by the reader according to the management rule, and the terminal that needs to be subjected to the first operation may also be managed by another network element/device according to the management rule. For example, in the cellular integrated system shown in FIG. 5, a terminal that needs to be subjected to a first operation may also be managed by the UPF according to a management rule. The UPF receives, from the server, a first instruction instructing to perform the first operation on one or more terminals, and then the UPF determines, according to the management rule, whether performance of the first operation is allowed, and/or determines a target terminal to be subjected to the first operation. For the process, refer to FIG. 8A and FIG. 8B or FIG. 9A and FIG. 9B.

Figure 8A:
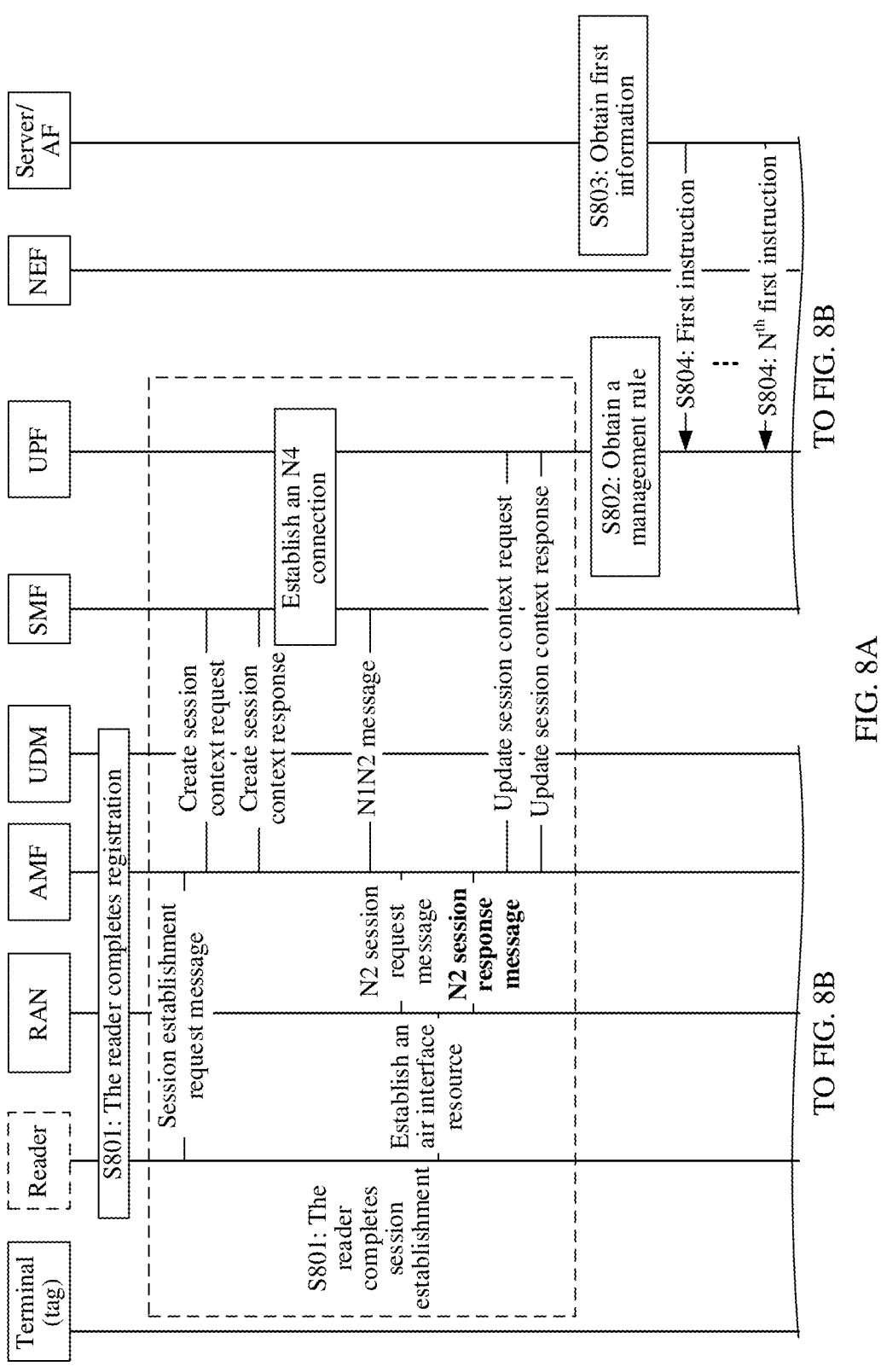
Figure 7:
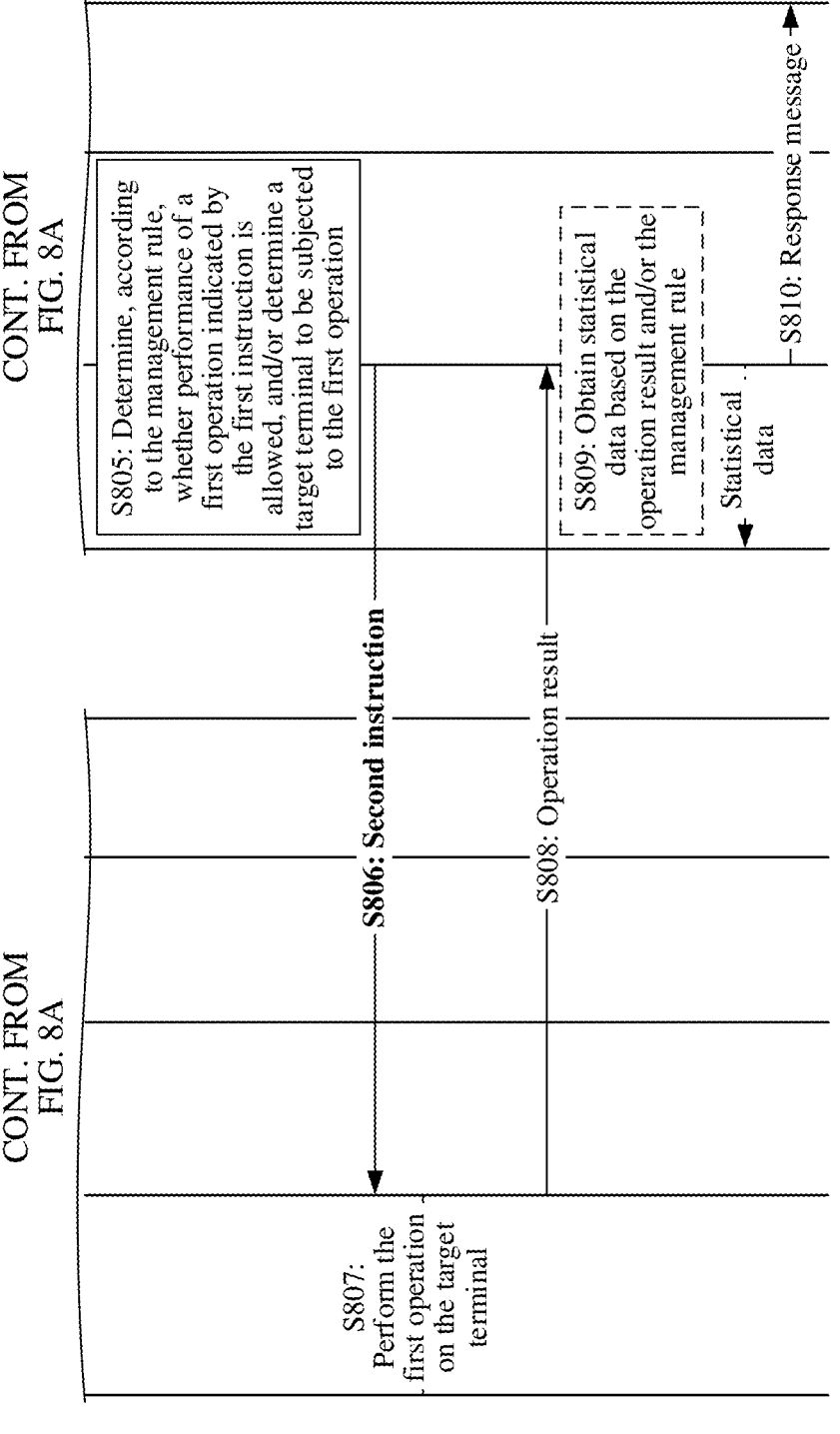

FIG. 8A and FIG. 8B are a flowchart of a terminal management method according to an embodiment. A UPF determines, according to a management rule, whether performance of a first operation is allowed, and/or determines a target terminal to be subjected to the first operation. The embodiment shown in FIG. 8A and FIG. 8B is applicable to the cellular integrated architecture of FIG. 5. As shown in FIG. 8A and FIG. 8B, the method includes the following steps.

S801: Optionally, a reader completes registration and session establishment.

S801 is the same as S701, and details are not described again.

S802: The UPF obtains the management rule.

For the related description of the management rule, refer to the description in S702.

For a manner in which the UPF obtains the management rule, refer to the manner in which the reader obtains the management rule in S702.

For example, the UPF may obtain the management rule from the second device. The second device may include, but is not limited to, any one of the UDM, the UDR, the PCF, the NEF, the TMF, or the AMF. For example, the second device is an SMF. The management rule may be preconfigured on the SMF. The SMF may locally obtain the management rule during a session establishment procedure of the reader or after the reader completes the session establishment procedure, and send the management rule to the UPF serving the reader. Alternatively, the SMF may obtain the management rule from the second device, and send the obtained management rule to the UPF during the session establishment procedure of the reader or after the reader completes the session establishment procedure. The session establishment procedure may be a PDU session establishment procedure.

For another example, the management rule may be preconfigured on the UPF, and the UPF may locally obtain the management rule.

S803: A server obtains first information.

As described in S703, the first information is used to determine a third device that receives a first instruction, and the first information may be replaced by information about the third device. In the application scenario shown in FIG. 5, the third device may be the UPF.

For the related description and obtaining manner of the first information, refer to the description in S703. Details are not described again.

S804: The server sends the first instruction to the UPF based on the first information. Correspondingly, the UPF receives the first instruction.

In a possible implementation, the first information includes information about the UPF, and the information about the UPF may include one or more of location information of the UPF, address information of the UPF, port information of the UPF, and identifier information of the UPF. The server sends the first instruction to the UPF based on the information about the UPF.

In another possible implementation, the first information includes information about a reader managed or served by the UPF. For the related description of the information about the reader, refer to the description in S703. Details are not described again. The server sends, based on the information about the reader managed or served by the UPF, the first instruction to the UPF through an N6 connection corresponding to the reader.

For example, the information about the reader includes N6 interface address information corresponding to the reader, the N6 interface address information corresponding to the reader is used to establish the N6 connection, and there is a mapping relationship between the N6 connection and an N3 tunnel corresponding to the reader. The server may send the first instruction to the UPF through the N6 connection based on the N6 interface address information corresponding to the reader.

In S804, each reader has its corresponding N6 connection, and each N6 connection has corresponding N6 interface address information. The N6 interface address information may be static address information and does not change within a specific time. When there are a plurality of readers to receive the first instruction, the server may send the first instruction to the UPF separately through N6 connections corresponding to the plurality of readers, that is, the server sends the first instruction to the UPF in a unicast manner.

S805: The UPF determines, according to the management rule, whether performance of a first operation is allowed, and/or determines a target terminal (for example, a target tag) to be subjected to the first operation.

S805 is the same as the action performed by the reader in S705, and details are not described again.

Further, if the UPF determines that the performance of the first operation is allowed, S806 to S809 are performed; otherwise, if the UPF determines that the performance of the first operation is not allowed, S810 is performed.

S806: The UPF sends a second instruction to the reader, and correspondingly, the reader receives the second instruction.

The related description of the second instruction is the same as that in S706, and details are not described again.

For example, the UPF may send the second instruction to the reader through the N3 tunnel corresponding to the reader.

S807: The reader performs the first operation on the target terminal according to the second instruction.

S807 is the same as S706, and details are not described again.

S808: The reader sends an operation result to the UPF, and the UPF sends the received operation result to the server. Correspondingly, the server receives the operation result.

For the related description of the operation result, refer to the description in S707. Details are not described again.

S809: The UPF obtains statistical data based on the operation result and/or the management rule, and sends the statistical data to a core network device. Correspondingly, the core network device receives the statistical data.

The related description of the statistical data and the process of performing S809 are the same as those of S708, and details are not described again.

S810: The UPF sends a response message to the server, and correspondingly, the server receives the response message.

The response message may include at least one of an operation failure indication, a failure cause, and information about an operation requester. The response message may indicate that the performance of the first operation on one or more terminals fails.

Based on the method shown in FIG. 8A and FIG. 8B, the server may obtain the information about the UPF or the information about the reader managed or served by the UPF, so that the server sends the instruction to the UPF based on the information about the UPF or the information about the reader managed or served by the UPF. After receiving the instruction, the UPF performs terminal (for example, tag) management according to the management rule, for example, determines whether execution of the instruction is allowed and/or determines the target terminal to be subjected to the operation. In this way, operation requesters perform corresponding operations on the terminal in an orderly manner under the management rule, thereby preventing an operation requester from continuously occupying a network resource or performing an operation beyond permissions.

It should be noted that, in the embodiment described in FIG. 8A and FIG. 8B in which the UPF manages the terminal, the UPF receives, from the server in a unicast manner, the instruction instructing to perform an operation on the terminal. Alternatively, to improve resource utilization, different from FIG. 8A and FIG. 8B, the server may also send the instruction to the UPF in a multicast manner. In other words, the UPF may receive, from the server in a multicast manner, the instruction instructing to perform an operation on the terminal. This process is shown in FIG. 9A and FIG. 9B.

Figure 9A:
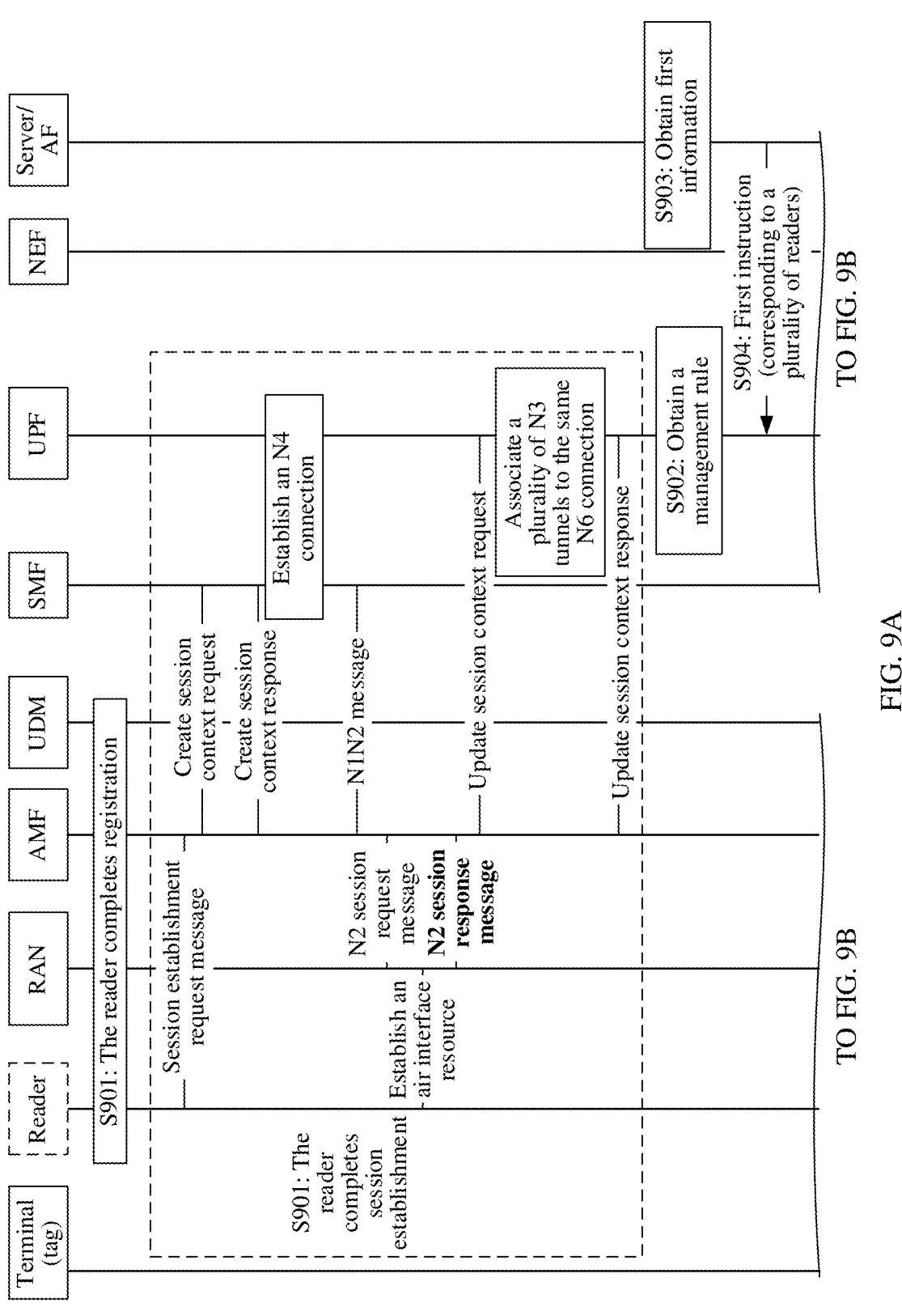
FIG. 9A and FIG. 9B are a flowchart 3 of a terminal management method according to an embodiment.
Figure 9B:
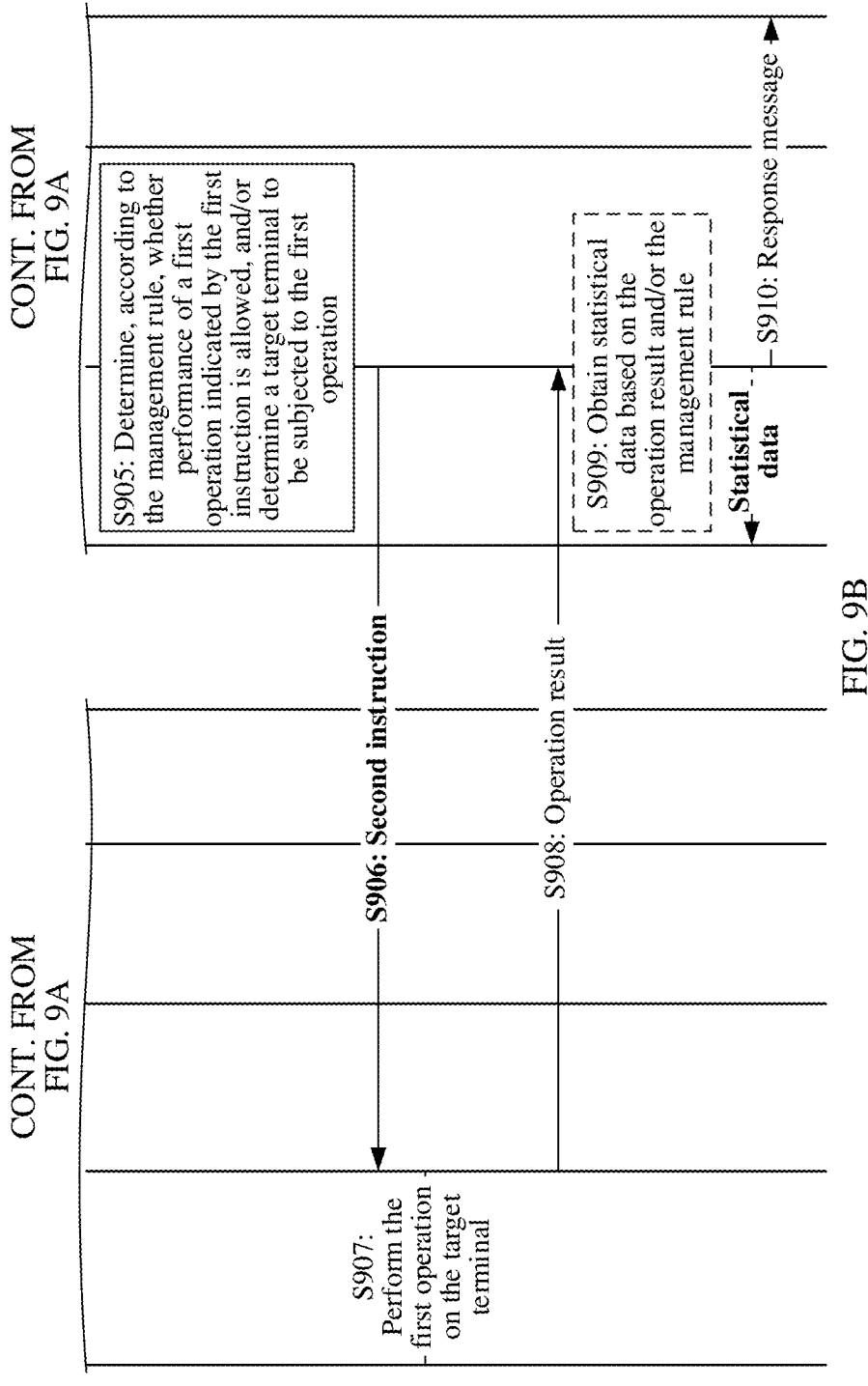

FIG. 9A and FIG. 9B are a flowchart of a terminal management method according to an embodiment. Same as the method described in FIG. 8A and FIG. 8B, FIG. 9A and FIG. 9B also show that a UPF determines, according to a management rule, whether performance of a first operation is allowed, and/or determines a target terminal to be subjected to the first operation. The embodiment shown in FIG. 9A and FIG. 9B may also be applicable to the cellular integrated architecture of FIG. 5. However, different from FIG. 8A and FIG. 8B, in the method shown in FIG. 9A and FIG. 9B, a server sends an instruction to the UPF in a multicast manner. As shown in FIG. 9A and FIG. 9B, the method includes the following steps.

S901: Optionally, a reader completes registration and session establishment.

For the registration procedure of the reader, reference may be made to an existing procedure, and details are not described.

For the session establishment procedure, refer to the description in S701. A difference from the session establishment procedure in S701 is that the same N6 interface address information is configured for different readers. An SMF sends configuration information to the UPF, and configures a plurality of N3 tunnels corresponding to the plurality of readers to correspond to the same N6 interface address information, that is, associates the N3 tunnels corresponding to the different readers with the same N6 interface, so that the UPF can forward, to different readers through the plurality of N3 tunnels, a first instruction received through the N6 interface address information, thereby improving resource utilization.

S902: The UPF obtains the management rule.

S902 is the same as S802, and details are not described again.

S903: The server obtains first information.

S903 is the same as S803, and details are not described again.

S904: The server sends the first instruction to the UPF based on the first information. Correspondingly, the UPF receives the first instruction.

Different from S804, in S905, the N6 interface address information corresponding to the plurality of readers is the same, that is, the plurality of readers share the same N6 connection, and there is a mapping relationship between the N6 connection and the N3 tunnels corresponding to the plurality of readers. The server may send the first instruction to the UPF through the N6 connection, that is, the server sends the first instruction to the UPF in a multicast manner (or referred to as a groupcast manner), so that after receiving the first instruction, the UPF sends the first instruction or a second instruction to the plurality of readers through the plurality of N3 tunnels.

For example, it is assumed that one UPF serves N readers, where Nis an integer greater than or equal to 2. When the server is to send an instruction to these readers, the instruction needs to be sent to the readers via the UPF. If the unicast manner is used, the server actually sends six same instructions to the same UPF through N N6 connections. If the multicast manner is used, the server needs to send only one instruction to the UPF through one N6 connection, and network resource overheads can be further reduced.

S905: The UPF determines, according to the management rule, whether the performance of the first operation is allowed, and/or determines the target terminal (for example, a target tag) to be subjected to the first operation.

S905 is the same as S805, and details are not described herein again.

S906: The UPF sends a second instruction to the reader, and correspondingly, the reader receives the second instruction.

The related description of the second instruction is the same as that in S706, and details are not described again.

For example, the UPF may send the second instruction to the reader through the N3 tunnel corresponding to the reader.

S907: The reader performs the first operation on the target terminal according to the second instruction.

S907 is the same as S706, and details are not described herein again.

S908: The reader returns an operation result to the UPF, and the UPF sends the received operation result to the server. Correspondingly, the server receives the operation result.

For the related description of the operation result, refer to the description in S707. Details are not described again.

S909: The UPF obtains statistical data based on the operation result and/or the management rule, and sends the statistical data to a core network device. Correspondingly, the core network device receives the statistical data.

The related description of the statistical data and the process of performing S909 are the same as those of S708, and details are not described again.

S910: The UPF sends a response message to the server, and correspondingly, the server receives the response message.

The response message may include at least one of an operation failure indication, a failure cause, and information about an operation requester. The response message may indicate that the performance of the first operation on one or more terminals fails.

Based on the method shown in FIG. 9A and FIG. 9B, the server may obtain the information about the UPF or the information about the reader managed or served by the UPF, so that the server sends, through the same N6 connection (or referred to as a shared N6 connection), the instruction to the UPF based on the information about the UPF or the information about the reader managed or served by the UPF. After receiving the instruction, the UPF performs terminal (for example, tag) management according to the management rule, for example, determines whether execution of the instruction is allowed and/or determines the target terminal to be subjected to the operation. In this way, operation requesters perform corresponding operations on the terminal in an orderly manner under the management rule, thereby preventing an operation requester from continuously occupying a network resource or performing an operation beyond permissions.

FIG. 7A and FIG. 7B are described by using an example in which the reader manages the terminal according to the management rule. FIG. 8A and FIG. 8B or FIG. 9A and FIG. 9B are described by using an example in which the UPF manages the terminal according to the management rule. It should be noted that, in the embodiments, the terminal is not necessarily managed by the reader or the UPF according to the management rule, and the terminal that needs to be subjected to the first operation may also be managed by another network element/device according to the management rule. For example, in the cellular integrated system shown in FIG. 6, a terminal that needs to be subjected to a first operation may also be managed by the AMF according to a management rule. The AMF receives, from the server, a first instruction instructing to perform the first operation on one or more terminals, and then the AMF determines, according to the management rule, whether performance of the first operation is allowed, and/or determines a target terminal to be subjected to the first operation. For the process, refer to FIG. 10.

Figure 10:
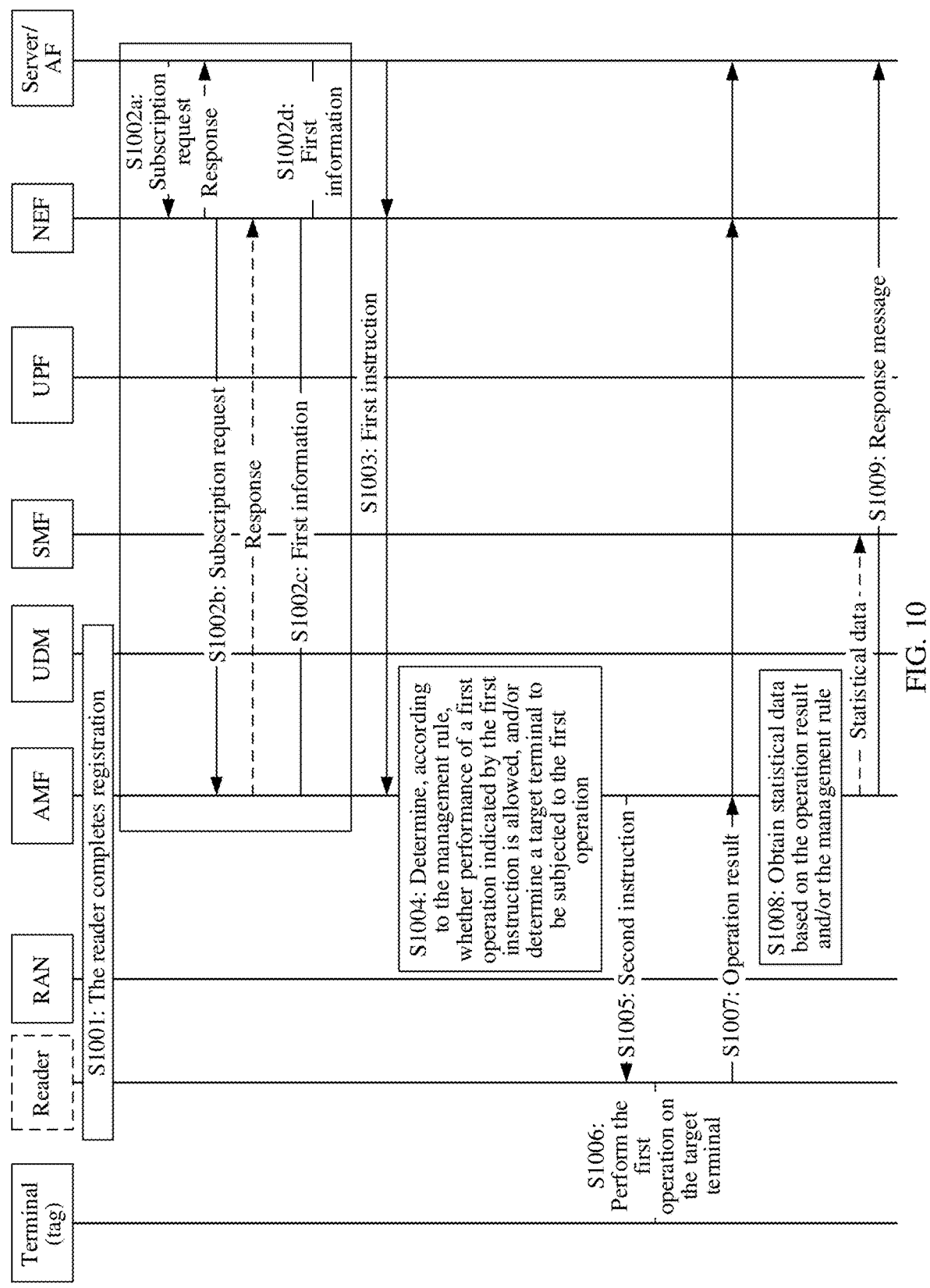
FIG. 10 is a flowchart 4 of a terminal management method according to an embodiment.

FIG. 10 is a flowchart of a terminal management method according to an embodiment. An AMF determines, according to a management rule, whether performance of a first operation is allowed, and/or determines a target terminal to be subjected to the first operation. The embodiment shown in FIG. 10 is applicable to the cellular integrated architecture of FIG. 6. As shown in FIG. 10, the method includes the following steps.

S1001: Optionally, a reader completes registration and session establishment.

S1001 is the same as S701, and details are not described again.

It should be understood that, in the method shown in FIG. 10, a server sends a first instruction to the AMF through a control plane, and the AMF performs a terminal management action. The instruction does not need to be sent through a user plane. Therefore, the session establishment procedure in S1001 may be performed or may not be performed, which is not limited.

S1002: The server obtains first information.

As described in S703, the first information is used to determine a third device that receives the first instruction, and the first information may be replaced by information about the third device. In the application scenario shown in FIG. 6, the third device may be any one of the AMF, an NEF, or an SMF. In the embodiments, the AMF is used as an example for description. For an execution process of another device, refer to the method shown in FIG. 10.

In the application scenario shown in FIG. 6, for example, the third device is the AMF, and the first information may include information about the AMF and/or information about a reader managed or served by the AMF. As described above, the information about the AMF indicates the AMF, and the information about the AMF may include one or more of location information of the UPF, address information of the UPF, port information of the UPF, and identifier information of the UPF.

For a manner of obtaining the first information, refer to the description in S703. For example, the server may obtain the first information from a fourth device through a subscription procedure. In the application scenario shown in FIG. 6, the fourth device may include the NEF, the AMF, the SMF, the TMF, the PCF, the UDM, the UDR, or the like.

For example, the fourth device is the AMF, and the third device is the AMF. A manner of obtaining the first information is shown as S1002a to S1002d in FIG. 10. The server sends a subscription request (Nnef_event exposure_subscribe request) to the NEF. For the related description of the subscription request, refer to the description in S703. The NEF receives the subscription request and sends the subscription request (Namf_EventExposure_Subscribe Request) to the AMF. Optionally, the NEF further sends a response (for example, Nnef_EventExposure_Subscribe Response) to the server. The AMF receives the subscription request (Nnef_event exposure_subscribe request) and sends a response (for example, Namf_EventExposure_Subscribe Response) to the NEF. After obtaining information about a reader that is managed by the AMF and that completes registration, the AMF sends an event notification (Namf_EventExposure_Notify) to the NEF, where the event notification message may include information about an operation requester, information about the reader, and/or information about the AMF. After receiving the event notification sent by the AMF, the NEF sends the event notification (Nnef_EventExposure_Notify) including the information about the operation requester, the information about the reader, and/or the information about the AMF to the server.

It should be understood that, the subscription request sent by the server to the NEF and the subscription request sent by the NEF to the AMF include the same information, except that English names of the subscription requests are different because the subscription requests are sent through different interfaces. Similarly, the event notification sent by the AMF to the NEF and the event notification sent by the NEF to the server include the same information, except that English names of the event notifications are different because the event notifications are sent through different interfaces.

S1003: The server sends the first instruction to the third device based on the first information. Correspondingly, the third device receives the first instruction, and sends the first instruction to the AMF. Correspondingly, the AMF receives the first instruction.

For example, as shown in FIG. 10, it is assumed that the third device is the NEF. The server sends the first instruction to the NEF based on the first information. The NEF receives the first instruction, and then forwards the first instruction to the AMF. Correspondingly, the AMF receives the first instruction via the NEF.

For another example, it is assumed that the third device is the AMF. The server sends the first instruction to the AMF based on the first information, for example, sends the first instruction to the AMF via the NEF or the SMF. The AMF receives the first instruction via the NEF or the SMF.

Optionally, the server further sends other control plane information to the NEF. For example, the information about the reader and/or the information about the AMF may be further sent to the NEF, so that the NEF sends, based on the information about the reader, the first instruction to the AMF serving the reader, or sends the first instruction to the AMF based on the information about the AMF. The information about the reader and/or the information about the AMF may be obtained in the subscription procedure in S1003.

For another example, the server may send the information about the operation requester to the NEF, and the NEF sends, based on the information about the operation requester (for example, a DNN in which the operation requester is located), the first instruction to the AMF corresponding to the DNN.

Further, optionally, the NEF may alternatively send the information about the operation requester to the AMF.

S1004: The AMF determines, according to the management rule, whether the performance of the first operation is allowed, and/or determines the target terminal (for example, a target tag) to be subjected to the first operation.

For the related description of the management rule, refer to the description in S702.

For a manner in which the AMF obtains the management rule, refer to the manner in which the reader obtains the management rule in S702.

For example, the AMF may obtain the management rule from the second device. The second device may include, but is not limited to, any one of the UDM, the UDR, the PCF, the NEF, the TMF, or the SMF. For example, the second device is the SMF. The management rule may be preconfigured on the SMF. The SMF may send the management rule to the AMF before, during, or after the registration procedure of the reader, or may send the management rule to the AMF during or after the session establishment procedure of the reader.

For another example, the management rule may be preconfigured on the AMF, and the AMF may locally obtain the management rule.

S1004 is the same as the action performed by the reader in S705, and details are not described again.

Further, if the AMF determines that the performance of the first operation is allowed, S1006 to S1009 are performed; otherwise, if the AMF determines that the performance of the first operation is not allowed, S1010 is performed.

S1005: The AMF sends a second instruction to the reader, and correspondingly, the reader receives the second instruction.

For the related description of the second instruction, refer to the description in S706, and details are not described again.

Optionally, the AMF may further send the information about the operation requester or an event identifier (reference ID or event ID) to the reader. The event identifier corresponds to the operation requester. For example, there is a mapping relationship between the event identifier and the information about the operation requester, and the event identifier indicates an operation requester that sends an operation instruction. Further, the AMF may store a correspondence between the event identifier and the information about the operation requester.

S1006: The reader performs the first operation on the target terminal according to the second instruction.

S1006 is the same as S706, and details are not described again.

S1007: The reader sends an operation result to the AMF, and the AMF returns the operation result to the server via the NEF. Correspondingly, the server receives the operation result.

For the related description of the operation result, refer to the description in S707. Details are not described again.

If the AMF further sends the information about the operation requester to the reader in S1005, the reader further sends the information about the operation requester to the AMF in S1007, for example, sends the operation result and the information about the operation requester together to the AMF. Further, the AMF sends the information about the operation requester and the operation result to the NEF. The NEF determines the operation requester based on the information about the operation requester, and sends the operation result to a server corresponding to the operation requester.

If the AMF further sends the event identifier to the reader in S1005, the reader further sends the event identifier to the AMF, for example, sends the operation result and the event identifier together to the AMF, so as to instruct the AMF to determine, based on the event identifier, the information about the operation requester corresponding to the event. Further, after receiving the operation result and the event identifier, the AMF obtains the information about the operation requester according to the correspondence between the event identifier and the information about the operation requester, and sends the information about the operation requester and the operation result to the NEF. The NEF determines the operation requester based on the information about the operation requester, and sends the operation result to the server corresponding to the operation requester.

S1008: The AMF obtains statistical data based on the operation result and/or the management rule, and optionally, the AMF may send the statistical data to a core network device. Correspondingly, the core network device receives the statistical data. In a possible implementation, when the core network device is the AMF, sending, by the AMF, the statistical data to the core network device after obtaining the statistical data is an internal implementation. In another possible implementation, after obtaining the statistical data, the AMF may process the statistical data, for example, record information about terminals subjected to an operation and a quantity of terminals. The processing of the statistical data may be an internal implementation.

The related description of the statistical data and the process of performing S1008 are the same as those of S708, and details are not described again.

S1009: The AMF sends a response message to the server, and correspondingly, the server receives the response message.

The response message may include at least one of an operation failure indication, a failure cause, and information about an operation requester. The response message may indicate that the performance of the first operation on one or more terminals fails.

Based on the method shown in FIG. 10, the server may obtain the information about the AMF or the information about the reader managed or served by the AMF, so that the server sends the instruction to the AMF based on the information about the AMF or the information about the reader managed or served by the AMF. After receiving the instruction, the AMF performs terminal (for example, tag) management according to the management rule, for example, determines whether execution of the instruction is allowed and/or determines the target terminal to be subjected to the operation. In this way, operation requesters perform corresponding operations on the terminal in an orderly manner under the management rule, thereby preventing an operation requester from continuously occupying a network resource or performing an operation beyond permissions.

Embodiments shown in FIG. 4 to FIG. 10 are described by using examples in which different devices manage the terminal (for example, the terminal 101 in FIG. 1) according to the management rule. It should be noted that, in the foregoing embodiments, the terminal may be replaced by a passive terminal or a semi-passive terminal, the reader may be replaced by an access network device, the UPF may be replaced by a user plane network element, the server may be replaced by an AF or the like, and the AMF may be replaced by a control plane network element, for example, may be replaced by another device such as an SMF. The inventory operation in the foregoing embodiments may be replaced by a stocktaking operation. The two are equivalent concepts and can be used interchangeably.

In addition, some terminals (for example, the terminal 101 or a P-IoT terminal in FIG. 1) are devices with very simple functions. They have relatively low design complexity and have relatively low costs. Such terminals may be referred to as passive terminals (for example, passive terminals). When such terminals interact with the core network device by using a non-access stratum (non-access stratum, NAS) message, the NAS message does not need to be of so many types, the NAS message does not need to carry so many information elements, and a length of a required information element does not need to be so long. Therefore, to meet the requirements of relatively low design complexity and relatively low costs of the passive terminal, a NAS message used when the passive terminal interacts with the core network device may be pruned, to reduce complexity of the NAS message, thereby reducing design complexity of the passive terminal.

For example, a method for pruning a NAS message may include one or more of the following: 1. Functions indicated by a plurality of NAS messages are combined into one NAS message, so as to reduce a quantity of NAS messages, and implement a plurality of functions by using one NAS message. 2. An information element in the NAS message is pruned. For example, a length of the information element in the NAS message is truncated, and/or an information element not required in the NAS message is directly deleted. 3. Fixed values are configured for information elements in the NAS message. These fixed values may be preconfigured on the passive terminal. In this way, the passive terminal may directly ignore the information elements corresponding to these fixed values, without parsing and logically determining these information elements. Therefore, design complexity of the passive terminal is reduced.

However, pruning the NAS message may cause the following problem: Some existing NAS messages are mandatory, and some information elements in these messages are also mandatory. If the NAS message received by the core network device is not a mandatory NAS message or a mandatory information element, the core network device considers that an error occurs in the received NAS message, and therefore feeds back a reject message, affecting a communication behavior (for example, data transmission) of the passive terminal. For example, an information element has a specific format or length, and the information element is 8 bits (bits). If an information element in the NAS message received by the core network device (for example, the AMF) is not 8 bits, it is considered that an error occurs in the information element. For another example, for a mandatory information element, the AMF checks whether the information element is included in the NAS message. If the NAS message does not include the mandatory information element, the AMF considers that the received NAS message is incomplete, and therefore rejects a request initiated by the passive terminal by using the NAS message. For example, when registration is requested by using the NAS message, registration of the passive terminal is rejected; or when session establishment is requested by using the NAS message, session establishment of the passive terminal is rejected.

To resolve the problem caused by pruning a NAS message, an embodiment further provides a method for communicating a NAS message. In the method, a corresponding NAS protocol is configured for a passive terminal. After receiving a NAS message, a core network device may first identify that the NAS message is a NAS message sent by the passive terminal device, and then check the received NAS message based on the NAS protocol corresponding to the passive terminal. For example, a check of some mandatory NAS messages and/or a first information element in the received NAS message is ignored. For example, no error occurs even if the mandatory NAS message is not received, or the mandatory NAS message is not checked. For another example, when it is detected that the NAS message does not include the first information element, it is not considered that an error occurs, or whether the NAS message includes the first information element is not checked.

In this embodiment, the mandatory NAS message may be a NAS message that needs to be used for interaction between an active terminal and the core network device. The first information element may be a mandatory information element in the NAS message used for interaction between the active terminal and the core network device, and is an information element necessarily present in the NAS message used for interaction between the active terminal and the core network device. The first information element may be referred to as a mandatory information element in the NAS message of the active terminal, an active terminal information element, or the like. The first information element cannot be deleted from the NAS message of the active terminal, or the first information element needs to be included in the NAS message of the active terminal, and an error occurs if the first information element is not included. For the passive terminal, the first information element is not a mandatory information element in the NAS message of the passive terminal. For example, the first information element may be not present in the NAS message of the passive terminal; or the first information element may be present in the NAS message of the passive terminal, but a length of the first information element in the NAS message of the passive terminal may be truncated, or may be configured as a fixed value. It should be understood that the active terminal and the passive terminal in the embodiments are opposite concepts. The active terminal may be a terminal that works with a battery or a wired power supply. For example, the active terminal may be a mobile phone or a computer. The passive terminal may be a terminal that works with energy generated from solar energy or an induced current.

In this embodiment, a NAS protocol corresponding to the active terminal may be referred to as an active terminal NAS protocol, a NAS protocol in an existing mechanism, or the like. The NAS protocol corresponding to the passive terminal may be referred to as a passive terminal NAS protocol. The NAS protocol corresponding to the passive terminal may specify one or more of a function integrated into the NAS message of the passive terminal, no longer carrying the first information element, ignoring a check of the first information element, and the like. It should be understood that the name of the NAS protocol corresponding to the passive terminal is not limited in the embodiments, and may also be referred to as a first protocol, a NAS protocol with another name, or the like. This is not limited.

In this embodiment, the first information element may include one or more of the following: a security header type, a spare half octet, a registration request message identity, a registration accept message identity, a 5GS registration result, a 5GS registration type, a key set identifier (ngKSI), a terminal identity (5GS mobile identity), a PDU session identity, a procedure transaction identity, a PDU session establishment request identity, an integrity protection maximum rate, an extended protocol discriminator, a mobility management cause (5GMM cause), a registration reject message identity, a PDU session establishment accept message identity, a session management cause (5GSM cause), a PDU session establishment reject message identity, authorized QoS rules, a selected PDU session type, a session aggregate maximum bit rate (session AMBR), a selected session and service continuity mode (selected SSC mode), a security mode command message identity, a replayed terminal security capability (replayed UE security capability), a selected security algorithm (selected NAS security algorithm), a security mode complete message identity, an uplink non-access stratum transport message identity (UL NAS transport message identity), a downlink non-access stratum transport message identity (DL NAS transport message identity), an authentication request message identity, antibidding down (ABBA), an authentication response message identity, an authentication result message identity, an authentication failure message identity, and an authentication reject message identity.

A method for communicating a NAS message provided in an embodiment is described below with reference to FIG. 11 and FIG. 12A and FIG. 12B. The method for communicating a NAS message provided in this embodiment may be applied to the communication system shown in any one of FIG. 3 to FIG. 6.

Figure 11:
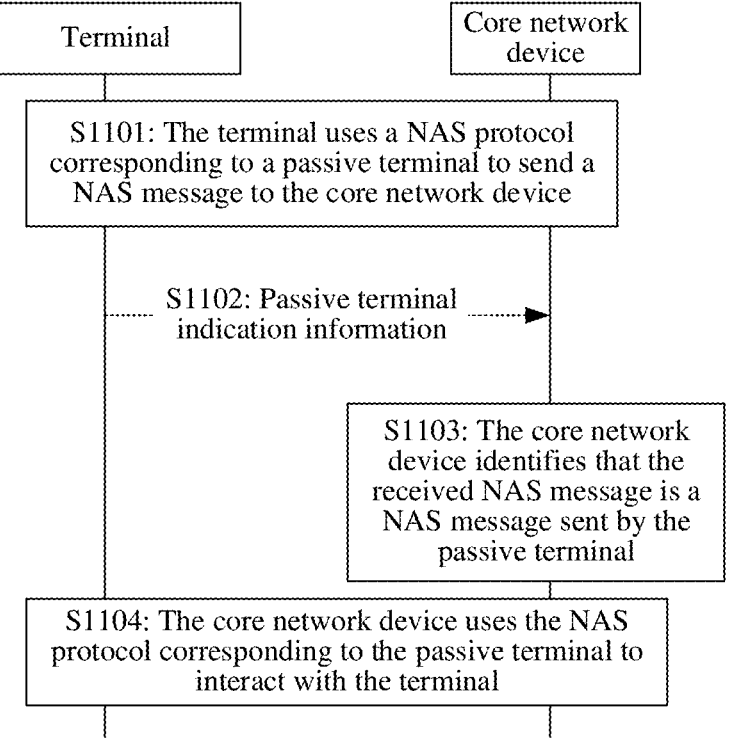
FIG. 11 is a flowchart 1 of a NAS message transmission method according to an embodiment.

FIG. 11 is a flowchart of a method for communicating a NAS message according to an embodiment. As shown in FIG. 11, the method includes the following steps.

S1101: A terminal uses a NAS protocol corresponding to a passive terminal to send a NAS message to a core network device. Correspondingly, the core network device receives the NAS message from the terminal.

The terminal may be a passive terminal. The core network device may be an AMF or another core network device (for example, a device with a tag management function or an IoT terminal management function, such as a TMF). This is not limited.

The NAS message sent by the terminal to the core network device may be used to request to implement one or more functions, for example, may be used to request to perform one or more of network registration, security authentication, session establishment, and session modification.

For example, the using, by a terminal, a NAS protocol corresponding to a passive terminal to send a NAS message to a core network device may include: performing, by the terminal based on the NAS protocol corresponding to the passive terminal, one or more of the following operations to generate a NAS message: integrating a plurality of functions into one NAS message, deleting a first information element from the NAS message, truncating a length of an information element, and setting a fixed value; and sending the generated NAS message to the core network device.

For example, the NAS message may be a registration request message. The registration request message may be used to request to perform network registration and security authentication. For example, in addition to an information element used to request network registration, the registration request message may further include first information. The first information may include one or more of a first security parameter value, a first check parameter value, and an identifier of the terminal. The first information may be used for a first network device to perform security authentication on the terminal. Alternatively, the first information may be used for a first network device to derive a first encryption key or a first integrity protection key.

In this embodiment, the first security parameter value may be a random value, a random number, access type information, or another security parameter value obtained by the terminal. The first check parameter value may be a token (Token) or a message authentication code (MAC) value.

In this embodiment, the identifier of the terminal may be used to identify the terminal. The identifier of the terminal may be understood as identifier information of the terminal. For example, the identifier of the terminal may be an IP address of the terminal, a media access control (MAC) address of the terminal, an international mobile subscriber identity (IMSI) of the terminal, permanent identifier information (SUPI) of the terminal, 5G global user equipment temporary identifier information (5G-GUTI), an electronic product code (EPC), or a transponder identifier (transponder ID, TID).

In this embodiment, the first encryption key may be used to perform, by using an encryption algorithm, encryption on information communicated between the terminal and the core network device. The encryption algorithm may include an SM7 authentication protocol, a stream cipher algorithm, a block cipher algorithm, a Chaskey cipher algorithm, an advanced encryption algorithm (AES), a hash encryption algorithm, or an authentication and key agreement (AKA) algorithm.

In this embodiment, the first integrity protection key may be used to perform, by using an integrity protection algorithm, integrity protection on information communicated between the terminal and the core network device. The integrity protection algorithm may include a cipher block chaining message authentication code (CBC-MAC) integrity check algorithm, a hash integrity protection algorithm, a hash message authentication code (HMAC) integrity check algorithm, or the like.

In this embodiment, the first network device may be understood as an authentication device, which is configured to perform security authentication. For example, the first network device may be the core network device, an authentication server (for example, an authentication server function (AUSF) or a unified data management network element (for example, unified data management (UDM)), an authentication authorization and accounting (AAA) server, or an enterprise authentication device.

S1102: Optionally, the terminal sends passive terminal indication information to the core network device. It should be understood that the passive terminal indication herein may also be sent in step S1101.

The passive terminal indication information may indicate the core network device to use the NAS protocol corresponding to the passive terminal to interact with the terminal; or the passive terminal indication information may indicate that the NAS message sent by the terminal is a NAS message sent by the passive terminal. The passive terminal indication information may be an explicit indication, for example, may be a binary bit. The binary bit "1" indicates that the NAS protocol corresponding to the passive terminal is used for interaction. The binary bit "0" indicates that the NAS protocol corresponding to the passive terminal is not used for interaction. Alternatively, the passive terminal indication information may be a registration type or a device type, and the registration type or the device type may indicate that the NAS protocol corresponding to the passive terminal is used.

It should be understood that the passive terminal indication information is an example name, and may also be named as a first indication or another name.

For example, the terminal may send the passive terminal indication information to the core network via an access network device. For example, the terminal sends the passive terminal indication information to the access network device, and the access network device forwards the received passive terminal indication information to the core network device. Alternatively, the terminal may directly send the passive terminal indication information to the core network device, for example, send the NAS message including the passive terminal indication information to the core network device.

It should be understood that S1102 is an optional step. The terminal may not send the passive terminal indication information to the core network device, but the core network device learns the passive terminal indication information from subscription information of the terminal, so as to identify that the received NAS message is a NAS message sent by the passive terminal.

S1103: The core network device identifies that the received NAS message is a NAS message sent by the passive terminal.

In an example, the NAS message carries the passive terminal indication information, and the core network device learns, based on the passive terminal indication information carried in the NAS message, that the NAS message is the NAS message sent by the passive terminal.

In another example, the core network device learns, based on the subscription information of the terminal, that the NAS message is the NAS message sent by the passive terminal. For example, the subscription information of the terminal carries a correspondence between an identifier of the terminal and a terminal type. The core network device may query the subscription information of the terminal, learn that the terminal is a passive terminal, identify that the NAS message from the passive terminal is received, and use the NAS protocol corresponding to the passive terminal to interact with the terminal.

In still another example, the core network device receives the passive terminal indication information from the access network device, and learns, based on the passive terminal indication information, that the NAS message is the NAS message sent by the passive terminal.

S1104: The core network device uses the NAS protocol corresponding to the passive terminal to interact with the terminal.

For example, that the core network device uses the NAS protocol corresponding to the passive terminal to interact with the terminal may include: using, by the core network device, the NAS protocol corresponding to the passive terminal to check the received NAS message. For example, a format check or a length check on the first information element in the NAS message is ignored; and/or a presence check on the first information element in the NAS message is ignored.

In this embodiment, ignoring the format check or the length check on the first information element in the NAS message may be understood as that even if the format or the length of the first information element in the NAS message does not comply with the specification, it is not considered that an error occurs, or the format or the length of the first information element in the NAS message is not checked. Ignoring the presence check on the first information element in the NAS message may be understood as that even if the NAS message does not include the first information element, it is not considered that an error occurs.

It should be understood that the format of the first information element in the embodiments may include a bit position occupied by the first information element in the NAS message, and may further include a length of the first information element, and the like.

For example, the first information element has a specific format or length, and the first information element is 8 bits (bits). After receiving the NAS message, the core network device (for example, the AMF) ignores the format or length check on the first information element in the NAS message. Even if the first information element is not 8 bits and the length is truncated, it is not considered that an error occurs in the first information element. For another example, for a first information element, the AMF checks whether the first information element is included in the NAS message. If the NAS message does not include the first information element, the AMF does not consider that the received NAS message is incomplete, and accepts a request initiated by the passive terminal by using the NAS message. For example, when registration is requested by using the NAS message, a registration request of the passive terminal is accepted; or when session establishment is requested by using the NAS message, a session establishment request of the passive terminal is accepted.

Further, after using the NAS protocol corresponding to the passive terminal to check the received NAS message, the core network device performs a corresponding function based on the NAS message. For example, the core network device uses the NAS protocol of the passive terminal to identify that the received NAS message is the registration request message. In addition to requesting to perform network registration, the NAS message is further used to request to perform security authentication on the terminal. The NAS message includes the first information including one or more of the first security parameter value, the first check parameter value, and the identifier of the terminal. The core network device performs the processes of network registration and security authentication on the terminal based on the received NAS message.

The process of security authentication on the terminal in this embodiment may include: authenticating, by the core network device, the terminal based on the first information, or deriving, by the core network device, the first encryption key or the first integrity protection key based on the first information; or sending, by the core network device, the first information to the first network device, so that the first network device authenticates the terminal based on the first information, or derives the first encryption key or the first integrity protection key based on the first information.

Further, after the network registration and the security authentication on the terminal are completed, the method further includes: sending, by the core network device, a registration accept message to the terminal, where the registration accept message may indicate that the network registration is completed. The registration accept message may include second information. The second information may include at least one of a second security parameter value and a second check parameter value. The second information may be used for the terminal to authenticate a network, or the second information is used for the terminal to derive a second encryption key or a second integrity protection key.

In this embodiment, the second security parameter value may be a random value, a random number, access type information, or another security parameter value obtained by the core network device. The second check parameter value may be a token (Token) or a MAC value.

In this embodiment, the second encryption key may be used for the terminal to perform, by using an encryption algorithm, encryption on information communicated between the terminal and the core network device.

In this embodiment, the second integrity protection key may be used for the terminal to perform, by using an integrity protection algorithm, integrity protection on information communicated between the terminal and the core network device.

Optionally, after using the NAS protocol corresponding to the passive terminal to check the received NAS message, and performing the corresponding function (such as network registration and security authentication) based on the NAS message, the core network device may use the NAS protocol corresponding to the passive terminal to return a response message to the terminal. For example, the registration accept message is the response message. The core network device may use the NAS protocol corresponding to the passive terminal to send the NAS message including the registration accept message to the terminal.

The NAS message returned by the core network device to the terminal may be a pruned NAS message, where the NAS message ignores some or all first information elements, or includes some or all length-pruned first information elements, or includes some or all first information elements configured with fixed values.

Based on the method described in FIG. 11, the core network device receives the NAS message, and can identify whether the received NAS message is the NAS message sent by the passive terminal. If the received NAS message is the NAS message sent by the passive terminal, the NAS protocol corresponding to the passive terminal is used to check the received NAS message, to avoid the problem that an error occurs in a check by the core network device according to the active terminal NAS protocol (which may be referred to as an existing NAS protocol) due to the pruned NAS message sent by the passive terminal to the core network device, affecting terminal communication.

It should be noted that the terminal in FIG. 11 may be a passive terminal, a semi-passive terminal, a semi-active terminal, or an active terminal. The active terminal may be, for example, an active tag. The first network device in FIG. 11 may be a core network device, an AUSF, a UDM, an AAA server, an enterprise authentication device, or the like. The core network device in FIG. 11 may be an AMF, an SMF, a TMF, or the like. The NAS message sent by the terminal to the core network device in FIG. 11 may be a registration request message, and the NAS message sent by the core network device to the terminal may be a registration accept message. In addition, the name of the passive terminal indication information is not limited in the embodiments, and there may also be another name, for example, first indication information. In addition, the parameter for security authentication in the embodiments may be referred to as a security authentication parameter. For example, the security parameter value, the check parameter value, the encryption key, or the first integrity protection key in FIG. 11 may all be referred to as the security authentication parameter.

With reference to a process shown in FIG. 12A and FIG. 12B, the method shown in FIG. 11 is described below by assuming that the terminal is a passive terminal, the first network device is an AAA server, the core network device is an AMF, and the security authentication parameter is included in a registration request message, that is, network registration and security authentication are implemented by using one NAS message.

Figure 12A:
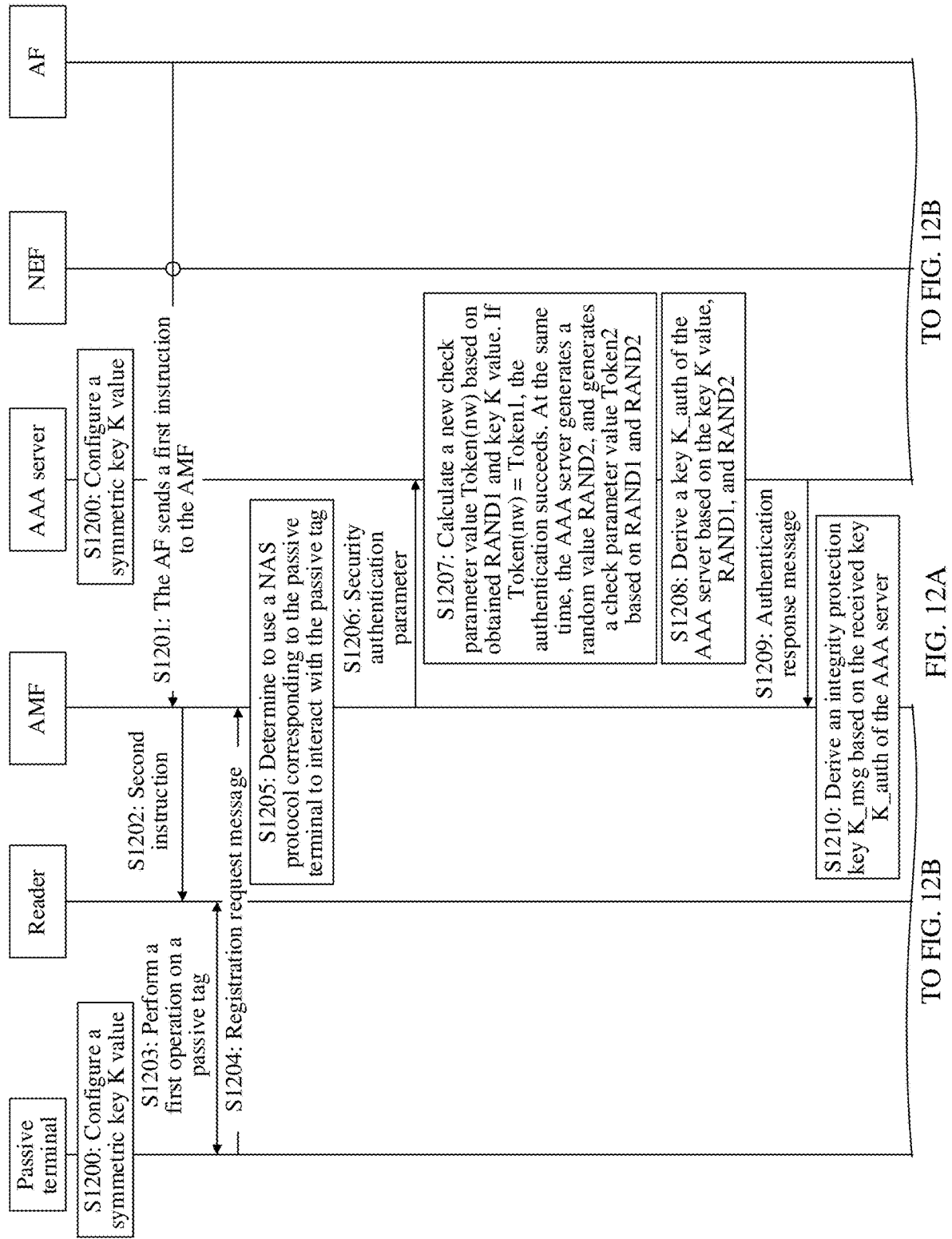

FIG. 12A and FIG. 12B show a method for communicating a NAS message according to this application. As shown in FIG. 12A and FIG. 12B, the method includes the following steps.

S1200: The passive terminal and the AAA server configure a symmetric key K value.

The passive terminal may be the terminal 101 shown in FIG. 1.

The AAA server may also be replaced by another device, for example, may be an AUSF, a UDM, an enterprise authentication device, or a core network device.

The symmetric key K value may be stored on the AAA server in a correspondence to an identifier of the passive terminal.

S1201: An AF sends a first instruction to the AMF. Correspondingly, the AMF receives the first instruction.

The first instruction may instruct to perform a first operation on one or more passive terminals. As described above, the first operation may include one or more of an inventory operation, a read operation, a write operation, a locating operation, a revocation operation, or another interaction operation with a passive terminal (for example, a passive tag).

Optionally, the AF further sends a management rule and other information to the AMF. The management rule may be used for the AMF to determine whether performance of the operation indicated by the instruction sent by the AF is allowed, and/or determine a passive terminal subjected to the operation indicated by the instruction sent by the AF. For the related description of the management rule, refer to the foregoing description. Details are not described again.

For example, the AF obtains information about the AMF, and sends the instruction and the management rule to the AMF via a network exposure function (for example, the NEF) based on the information about the AMF. The AF may obtain the information about the AMF by performing S1002a and S1002d in the method shown in FIG. 10. Details are not described again.

S1202: The AMF sends a second instruction to a reader. Correspondingly, the reader receives the second instruction.

The reader may be the reader in FIG. 3, and the reader may be integrated into a RAN or UE. When the reader is integrated into the RAN, the reader may be understood as the RAN, that is, the RAN performs a function performed by the reader. When the reader is integrated into the UE, the reader may be understood as the UE, that is, the UE performs a function performed by the reader.

The second instruction may instruct to perform the first operation on the passive terminal. The second instruction may be obtained by the AMF according to the first instruction and the management rule. The passive terminal is a passive terminal that is filtered or selected by the AMF according to the management rule from one or more passive terminals indicated by the first instruction and on which performance of the first operation is allowed.

It should be understood that, when it is determined, according to the management rule, that the passive terminal subjected to the first operation is the passive terminal indicated by the first instruction, the second instruction is the first instruction.

S1203: The reader performs the first operation on the passive terminal according to the second instruction. For example, an inventory operation is performed on the passive terminal.

S1204: The passive terminal sends a registration request message to the AMF. Correspondingly, the AMF receives the registration request message.

The registration request message may be carried in a NAS message, and the registration request message may be generated by the passive terminal by using the NAS protocol corresponding to the passive terminal. The registration request message may include the identifier of the passive terminal, the security authentication parameter, and passive terminal indication information, that is, the security parameter is carried in the registration request message, thereby reducing a quantity of NAS messages.

The security authentication parameter may be used to perform security authentication on the passive terminal, so as to verify validity of the passive terminal. The security authentication parameter may include a random value RAND1, a check parameter value Token1, or a first MAC value and the identifier of the passive terminal. The check parameter value Token1 or the first MAC value may be generated by the passive terminal based on the RAND1 and the symmetric key K value.

The passive terminal indication information indicates the AMF to use the NAS protocol corresponding to the passive terminal to interact with the passive terminal.

S1205: The AMF determines, based on the received passive terminal indication information, to use the NAS protocol corresponding to the passive terminal to interact with the passive terminal. For example, the AMF determines to use the NAS protocol corresponding to the passive terminal to check the received NAS message. The AMF ignores a format check and/or a length check on a first information element in the NAS message. The AMF ignores a presence check on the first information element in the NAS message.

Optionally, after using the NAS protocol corresponding to the passive terminal to check the received NAS message, the AMF may learn, from the received NAS message, that network registration and security authentication need to be performed on the passive terminal.

S1206: The AMF sends the security authentication parameter to the AAA server. The AAA server receives the security authentication parameter.

For example, the AMF sends the received RAND1, Token1, or first MAC value and the identifier of the passive terminal to the AAA server.

S1207: The AAA server finds the key K value based on the identifier of the passive terminal, and calculates a new check parameter value Token (nw) or MAC (nw) based on the obtained RAND1 and the key K value. If Token (nw)=Token1 or MAC (nw)=MAC, the authentication succeeds. At the same time, the AAA server generates a random value RAND2, and generates a check parameter value Token2 or a second MAC value based on RAND1 and RAND2.

S1208: The AAA server derives a key K_auth of the AAA server based on the key K value, RAND1, and RAND2. For the derivation process, refer to an existing process. Details are not described again.

S1209: The AAA server sends an authentication response message to the AMF. Correspondingly, the AMF receives the authentication response message.

The authentication response message may include RAND1, RAND2, Token2, or the second MAC value and the key K_auth of the AAA server.

S1210: The AMF generates a random number RAND3, and derives an integrity protection key K_msg based on the received key K_auth of the AAA server.

S1211: The AMF starts an uplink counter Count_UL and a downlink counter Count_DL, and uses count values of the uplink counter and the downlink counter as freshness parameters.

S1212: The AMF uses the NAS protocol corresponding to the passive terminal to send a registration accept message to the passive terminal. Correspondingly, the passive terminal receives the registration accept message.

The registration accept message may include the identifier of the passive terminal, the RAND1, the RAND2, and the Token2 or the second MAC value. In other words, the parameter used for the terminal to perform security authentication on the network is carried in the registration accept message, reducing a quantity of NAS messages.

The registration accept message is carried in the NAS message. In the NAS message, some or all first information elements may be ignored, or fixed values may be configured for some or all first information elements, to reduce design complexity of the NAS message, thereby reducing complexity of processing the NAS message by the passive terminal.

S1213: The passive terminal calculates a check parameter value Token (terminal) or MAC (terminal) of the passive terminal based on the obtained RAND1, RAND2, and the symmetric key K value. If Token (terminal) is equal to Token2 received by the passive terminal, or MAC (terminal) is equal to the second MAC value received by the passive terminal, the authentication succeeds.

S1214: The passive terminal starts the uplink counter Count_UL and the downlink counter Count_DL, and uses the count values of the uplink counter and the downlink counter as the freshness parameters.

S1215: The passive terminal derives an integrity protection key K_msg based on the symmetric key K value, RAND1, and RAND2. The integrity protection key derived by the passive terminal is the same as the integrity protection key K_msg in S1210.

S1216: Optionally, the reader performs a read or write operation on the passive terminal.

S1217: The passive terminal sends a session establishment request (PDU session establishment request) message to the AMF. Correspondingly, the AMF receives the session establishment request message.

The session establishment request message may be a NAS message, and the session establishment request message may carry the identifier of the passive terminal, a read/write result of the passive terminal, a message authentication code (message authentication code, MAC) value, and a count value "count value". The passive terminal indication information and other information may further be carried.

The MAC value is used to perform integrity verification on a message exchanged between the passive terminal and the network side.

The information carried in the session establishment request message may be information obtained after the passive terminal performs integrity protection by using an integrity algorithm based on K_msg and the count value.

S1218: The AMF determines, based on the passive terminal indication information, to use the NAS protocol corresponding to the passive terminal to interact with the passive terminal. This step is the same as step S1205. For example, the AMF ignores a format check or a length check on a first information element in the NAS message. The AMF ignores a presence check or the like on the first information element in the NAS message.

Further, after checking the received NAS message, the AMF triggers the SMF to perform a session establishment procedure.

S1219: The AMF sends an inventory or read/write result of the passive terminal to the AF. Correspondingly, the AF receives the inventory or read/write result of the passive terminal.

Based on the method shown in FIG. 12A and FIG. 12B, the AMF receives the NAS message, and may identify whether the received NAS message is the NAS message sent by the passive terminal. If the received NAS message is the NAS message sent by the passive terminal, the NAS protocol corresponding to the passive terminal is used to check the received NAS message, to avoid the problem that an error occurs in a check by the AMF according to the active terminal protocol due to the pruned NAS message sent by the passive terminal to the AMF, affecting terminal communication. In addition, the security authentication parameter is carried in the registration request message or registration accept message. In other words, security authentication is implemented through the registration procedure, thereby reducing the quantity of NAS messages and reducing overheads of the NAS messages.

In the method shown in FIG. 12A and FIG. 12B, the passive terminal sends the NAS message including the passive terminal indication information to the AMF, so that the AMF identifies, based on the passive terminal indication information carried in the received NAS message, that the received NAS message is the NAS message sent by the passive terminal, and then uses the NAS protocol corresponding to the passive terminal to interact with the passive terminal. Alternatively, the passive terminal may not send the NAS message including the passive terminal indication information to the AMF. In this case, the AMF may alternatively identify, in any one of the following possible implementations, that the NAS message is the NAS message sent by the passive terminal.

In a possible implementation, the passive terminal sends the passive terminal indication information to the reader (which may be the RAN), for example, sends the passive terminal indication information to the reader in S1203. The reader sends the passive terminal indication information to the AMF. For example, in S1204, the reader sends the passive terminal indication information to the AMF. The AMF identifies, based on the passive terminal indication information from the reader, that the received NAS message is the NAS message sent by the passive terminal.

In another possible implementation, the reader sends the identifier of the passive terminal to the AMF. For example, in S1204, the reader sends the identifier of the passive terminal to the AMF. After receiving the identifier of the passive terminal, the AMF sends an obtaining request used to request to obtain subscription information of the passive terminal to the UDM, where the obtaining request carries the identifier of the passive terminal. After receiving the obtaining request, the UDM finds the subscription information of the passive terminal, and sends the subscription information of the passive terminal to the AMF, where the subscription information of the passive terminal carries the passive terminal indication information, so that the AMF learns, based on the subscription information of the passive terminal, that the received NAS message is the NAS message sent by the passive terminal.

The solutions provided in embodiments are described above from the perspective of interaction between network elements. Correspondingly, an embodiment further provides a communication apparatus. The communication apparatus may be the first device, the server, the core network device, the user plane device, or the terminal in the foregoing method embodiments, or an apparatus including a function of the first device, the server, the core network device, the user plane device, or the terminal, or a component that can be used for the foregoing device. It may be understood that, to implement the foregoing functions, the communication apparatus includes a hardware structure and/or a software module for performing a corresponding function. A person skilled in the art should easily be aware that, in combination with units and algorithm steps of the examples described in embodiments, the embodiments may be implemented by hardware or a combination of hardware and computer software. Whether a function is performed by hardware or hardware driven by computer software depends on particular applications and design constraints of the solutions. A person skilled in the art may use different methods to implement the described functions for each particular application, but it should not be considered that the implementation goes beyond the scope of the embodiments.

Figure 13:
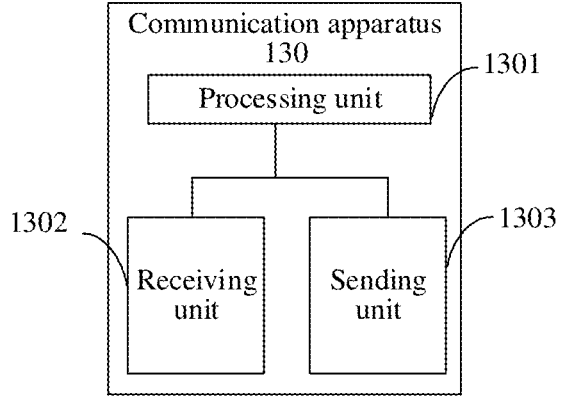
FIG. 13 is a diagram 1 of composition of a communication apparatus according to an embodiment.

FIG. 13 is a diagram of a communication apparatus according to an embodiment. The communication apparatus includes a processing unit 1301, a receiving unit 1302, and a sending unit 1303. The processing unit 1301 is configured to implement data processing by the communication apparatus. The receiving unit 1302 is configured to receive content between the communication apparatus and another unit or network element, and the sending unit 1303 is configured to send content between the communication apparatus and the another unit or network element. It should be understood that the processing unit 1301 in this embodiment may be implemented by a processor or a processor-related circuit assembly (or referred to as a processing circuit), and the receiving unit 1302 may be implemented by a receiver or a receiver-related circuit assembly. The sending unit 1303 may be implemented by a transmitter or a transmitter-related circuit assembly.

For example, the communication apparatus may be a communication apparatus device, or may be a chip used in the communication apparatus device, or another combined device or component that has a function of the communication apparatus device.

For example, the communication apparatus may be the first device, the server, the core network device, the user plane device, or the terminal in any one of FIG. 4 to FIG. 12A and FIG. 12B.

When the communication apparatus is the first device, the processing unit 1301 is configured to obtain, by using the receiving unit 1302, a first instruction used to perform a first operation on one or more terminals, and determine, according to a management rule, whether performance of the first operation is allowed, and/or determine a target terminal to be subjected to the first operation.

When the communication apparatus is the server, the processing unit 1301 is configured to obtain, by using the receiving unit 1302, first information used to determine a third device that receives the first instruction, where the first information is used to determine the third device that receives the first instruction; and the processing unit 1301 is configured to send, to the third device based on the first information, a first instruction used to perform a first operation on one or more terminals.

When the communication apparatus is the core network device, the receiving unit 1302 is configured to obtain address information of the user plane device, and send the address information to a first reader, so that the first reader establishes a first connection to the user plane device based on the address information. The address information is sent to a second reader, so that the second reader establishes a second connection to the user plane device based on the address information. The processing unit 1301 is configured to instruct the user plane device to establish a third connection to the server, and the core network device instructs the user plane device to associate the first connection with the third connection, and the second connection with the third connection.

When the communication apparatus is the user plane device, the receiving unit 1302 is configured to establish a first connection to a first reader, and establish a second connection to a second reader; and the processing unit 1301 is configured to associate the first connection with a third connection, and the second connection with the third connection, where the third connection is a connection established between the user plane device and the server.

When the communication apparatus is the terminal, the receiving unit 1302 is configured to use a NAS protocol corresponding to the passive terminal to send a NAS message to the core network device, and send, to the core network device, passive terminal indication information indicating the core network device to use the NAS protocol corresponding to the passive terminal to interact with the terminal.

When the communication apparatus is the core network device, the receiving unit 1302 is configured to receive a NAS message from the terminal; and the processing unit 1301 is configured to identify that the NAS message is a NAS message sent by the passive terminal, and use a NAS protocol corresponding to the passive terminal to interact with the terminal.

In addition, the foregoing units may be further configured to support another process of the technology described in the embodiments. For beneficial effects, refer to the foregoing descriptions. Details are not described herein again.

Figure 14:
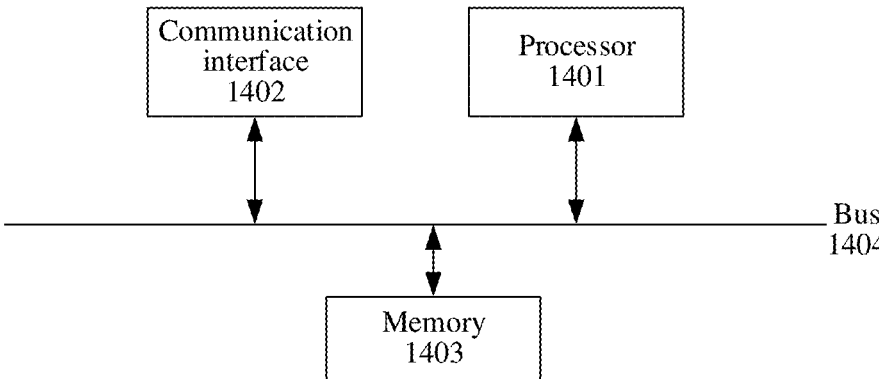
FIG. 14 is a diagram 2 of composition of a communication apparatus according to an embodiment.

FIG. 14 is a diagram of another communication apparatus according to an embodiment. The communication apparatus includes a processor 1401, a communication interface 1402, and a memory 1403. The processor 1401, the communication interface 1402, and the memory 1403 may be connected to each other through a bus 1404. The bus 1404 may be a peripheral component interconnect (peripheral component interconnect, PCI) bus, an extended industry standard architecture (extended industry standard architecture, EISA) bus, or the like. The bus 1404 may be classified into an address bus, a data bus, a control bus, and the like. For ease of indication, the bus is indicated by only one line in FIG. 14. However, it does not indicate that there is only one bus or only one type of bus. The processor 1401 may be a central processing unit (central processing unit, CPU), a network processor (network processor, NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory 1403 may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), which is used as an external cache.

For example, the communication apparatus may be the first device, the server, the core network device, the user plane device, or the terminal in any one of FIG. 4 to FIG. 12A and FIG. 12B. The processor 1401 is configured to implement a data processing operation of the communication apparatus, and the communication interface 1402 is configured to implement a receiving operation and a sending operation of the communication apparatus.

When the communication apparatus is the first device, the processor 1401 is configured to obtain, through the communication interface 1402, a first instruction used to perform a first operation on one or more terminals, and determine, according to a management rule, whether performance of the first operation is allowed, and/or determine a target terminal to be subjected to the first operation.

When the communication apparatus is the server, the processor 1401 is configured to obtain, through the communication interface 1402, first information used to determine a third device that receives the first instruction, where the first information is used to determine the third device that receives the first instruction; and the server sends, to the third device based on the first information, a first instruction used to perform a first operation on one or more terminals.

When the communication apparatus is the core network device, the communication interface 1402 is configured to obtain address information of the user plane device, and send the address information to a first reader, so that the first reader establishes a first connection to the user plane device based on the address information. The address information is sent to a second reader, so that the second reader establishes a second connection to the user plane device based on the address information. The processor 1401 is configured to instruct the user plane device to establish a third connection to the server, and the core network device instructs the user plane device to associate the first connection with the third connection, and the second connection with the third connection.

When the communication apparatus is the user plane device, the communication interface 1402 is configured to establish a first connection to a first reader, and establish a second connection to a second reader; and the processor 1401 is configured to associate the first connection with a third connection, and the second connection with the third connection, where the third connection is a connection established between the user plane device and the server.

When the communication apparatus is the terminal, the communication interface 1402 is configured to use a NAS protocol corresponding to the passive terminal to send a NAS message to the core network device, and send, to the core network device, passive terminal indication information indicating the core network device to use the NAS protocol corresponding to the passive terminal to interact with the terminal.

When the communication apparatus is the core network device, the communication interface 1402 is configured to receive a NAS message from the terminal; and the processor 1401 is configured to identify that the NAS message is a NAS message sent by the passive terminal, and use a NAS protocol corresponding to the passive terminal to interact with the terminal.

In addition, the foregoing modules may be further configured to support another process of the technology described. For beneficial effects, refer to the foregoing descriptions. Details are not described herein again.

An embodiment provides a communication system, including the foregoing first device and server. The first device performs the method performed by the first device in any one of the embodiments shown in FIG. 7A and FIG. 7B to FIG. 10, and the server performs the method performed by the server in any one of the embodiments shown in FIG. 7A and FIG. 7B to FIG. 10.

An embodiment further provides a communication system, including a core network device and a user plane device. The core network device performs the method performed by the core network device in FIG. 9A and FIG. 9B, and the user plane device performs the method performed by the user plane device in FIG. 9A and FIG. 9B.

An embodiment further provides a communication system, including a terminal and a core network device. The terminal performs the method performed by the terminal in any one of the embodiments in FIG. 11 and FIG. 12A and FIG. 12B. The core network device performs the method performed by the core network device in any one of the embodiments in FIG. 11 and FIG. 12A and FIG. 12B.

An embodiment further provides a non-transitory computer-readable storage medium. The non-transitory computer-readable storage medium stores a computer program. When the computer program is executed by a computer, the computer may implement the method in any one of the embodiments shown in FIG. 7A and FIG. 7B to FIG. 12A and FIG. 12B.

An embodiment further provides a computer program product. The computer program product is configured to store a computer program. When the computer program is executed by a computer, the computer may implement the method in any one of the embodiments shown in FIG. 7A and FIG. 7B to FIG. 12A and FIG. 12B.

This application further provides a chip, including a processor. The processor is configured to read and run a computer program stored in a memory, to perform the corresponding operations and/or procedures of the first device, the server, the core network device, the user plane device, or the terminal in the methods provided in the embodiments. Optionally, the chip further includes a memory, the memory and the processor are connected to the memory over a circuit or a wire, and the processor is configured to read and execute a computer program in the memory. Further, optionally, the chip further includes a communication interface, and the processor is connected to the communication interface. The communication interface is configured to receive data and/or information to be processed, and the processor obtains the data and/or information from the communication interface and processes the data and/or information. The communication interface may be an input/output interface, an interface circuit, an output circuit, an input circuit, a pin, a related circuit, or the like on the chip. The processor may alternatively be embodied as a processing circuit or a logic circuit.

The chip may alternatively be replaced by a chip system, and details are not described herein again.

The terms "include", "contain" and any other variants thereof in the embodiments are intended to cover non-exclusive inclusion. For example, a process, method, system, product, or device that includes a series of steps or units are not limited to those steps or units that are clearly listed, but may include other steps or units that are not explicitly listed or are inherent to such a process, method, system, product, or device.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the embodiments, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual conditions to achieve the objectives of the solutions in embodiments.

In addition, functional units in embodiments may be integrated into one processing unit, each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the solutions of the embodiments essentially, or the part contributing to the prior art, or some of the solutions may be implemented in the form of a software product. The software product is stored in a storage medium, and includes several instructions for instructing a computer device (which may be a personal computer, a server, or a network device) to perform all or some of the steps of the methods described in embodiments. The foregoing storage medium includes any medium that can store program code, such as a USB flash drive, a removable hard disk, a read-only memory (ROM), a random access memory (RAM), a magnetic disk, or an optical disc.

In addition, the terms "first", "second", and the like in the embodiments and accompanying drawings are intended to distinguish between different objects, but are not intended to describe a specific order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Although is described with reference to specific features and embodiments thereof, it is clear that various modifications and combinations may be made to them without departing from the spirit and scope of the embodiments. Correspondingly, the embodiments and accompanying drawings are merely example descriptions, and are considered as any of or all modifications, variations, combinations or equivalents that cover the scope of the embodiments. A person skilled in the art can make various modifications and variations to the embodiments without departing from their spirit and scope. The embodiments are intended to cover these modifications and variations of the embodiments.

What is claimed is:

1. A method performed by a first device, or by a chip of the first device, comprising:

obtaining a first instruction, wherein the first instruction is used to perform a first operation on one or more terminals; and determining according to a management rule whether performance of the first operation is allowed, wherein the management rule comprises an allowed operation type, location information in which an operation is allowed, and identifier information of a terminal allowed to be operated; and determining a target terminal to be subjected to the first operation.

2. The method according to claim 1, wherein, when the first device determines that the performance of the first operation is not allowed, the method further comprises:

sending, by the first device, a response message, wherein the response message comprises at least one of an operation failure indication, a failure cause, or information about an operation requester.

3. The method according to claim 1, wherein the first instruction comprises one or more of:

identifier information or location information of the one or more terminals, information about an operation requester of the first operation, information about the reader, and information about an operation type of the first operation.

4. The method of claim 1, wherein the first device is a reader, a user plane device, a control plane device, a device having a tag management function, or a server.

5. The method of claim 1, wherein the management rule is preconfigured on the first device.

6. The method of claim 1, wherein the management rule is obtained by the first device from a second device.

7. The method of claim 1, wherein the first operation comprises one or more of the following: an inventory operation, a read operation, a write operation, a locating operation, and a revocation operation.

8. A communication apparatus comprising a processor, wherein the processor is configured to read a program from a memory and run the program, to implement a method of:

obtaining a first instruction, wherein the first instruction is used to perform a first operation on one or more terminals; and determining, according to a management rule, whether performance of the first operation is allowed, wherein the management rule comprises an allowed operation type, location information in which an operation is allowed, and identifier information of a terminal allowed to be operated; and determining a target terminal to be subjected to the first operation.

9. The communication apparatus of claim 8, wherein the first device is a reader, a user plane device, a control plane device, a device having a tag management function, or a server.

10. The communication apparatus of claim 8, wherein the management rule is preconfigured on the first device.

11. The communication apparatus of claim 8, wherein the management rule is obtained by the first device from a second device.

12. The communication apparatus of claim 8, wherein the first operation comprises one or more of the following: an inventory operation, a read operation, a write operation, a locating operation, and a revocation operation.

13. A non-transitory computer-readable medium storing a program that is configured to be executed by a processor, the non-transitory computer-readable medium comprising instructions for:

obtaining, a first instruction, wherein the first instruction is used to perform a first operation on one or more terminals; and determining, according to a management rule, whether performance of the first operation is allowed, wherein the management rule comprises an allowed operation type, location information in which an operation is allowed, and identifier information of a terminal allowed to be operated; and determining a target terminal to be subjected to the first operation.

14. The non-transitory computer-readable medium of claim 13, wherein the first device is a reader, a user plane device, a control plane device, a device having a tag management function, or a server.

15. The non-transitory computer-readable medium of claim 13, wherein the management rule is preconfigured on the first device.

16. The non-transitory computer-readable medium of claim 13, wherein the management rule is obtained by the first device from a second device.

17. The non-transitory computer-readable medium of claim 13, wherein the first operation comprises one or more of the following: an inventory operation, a read operation, a write operation, a locating operation, and a revocation operation.

* * * * *